US 8,243,790 B2

(12) United States Patent
Leontaris et al.

(10) Patent No.: US 8,243,790 B2
(45) Date of Patent: Aug. 14, 2012

(54) TREATING VIDEO INFORMATION

(75) Inventors: Athanasios Leontaris, Burbank, CA (US); Alexandros Tourapis, Burbank, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 953 days.

(21) Appl. No.: 12/206,477

(22) Filed: Sep. 8, 2008

(65) Prior Publication Data

US 2009/0086814 A1  Apr. 2, 2009

Related U.S. Application Data

(60) Provisional application No. 60/976,241, filed on Sep. 28, 2007.

(51) Int. Cl.
*H04N 7/12* (2006.01)
(52) U.S. Cl. .................... 375/240.02; 382/162; 382/224; 375/240.12; 375/240.16; 375/240.08; 375/E7.243
(58) Field of Classification Search ............. 375/240.12, 375/16, 8, E07.243; 382/162, 224
See application file for complete search history.

(56) References Cited

U.S. PATENT DOCUMENTS

| | | | |
|---|---|---|---|
| 6,178,265 | B1 | 1/2001 | Haghighi |
| 6,463,100 | B1 | 10/2002 | Cho et al. |
| 2002/0047936 | A1 | 4/2002 | Tojo |
| 2006/0271947 | A1 | 11/2006 | Lienhart et al. |

OTHER PUBLICATIONS

Predictive motion-field segmentation for image sequence coding, Orchard, M.T. Circuits and Systems for Video Technology, IEEE Transactions on (1051-8215) 1993. vol. 3,Iss.1;p. 54-70.*
Multiview Video Compression, Flierl, M.; Girod, B.Signal Processing Magazine, IEEE (1053-5888), 2007. vol. 24,Iss.6;p. 66-76.*
International Search Report and The Written Opinion of the International Searching Authority issued in PCT/US2008/075600 on Aug. 4, 2010, 21 pages.
Gerek, Omer N. and Altunbasak, Yucel, "Key Frame Selection from MPEG Video Data,"Proceedings of the International Society for Optical Engineering (SPIE), USA, vol. 3024, No. Part 02, Feb. 12, 2002, pp. 920-925.
Liu, Zhu, et al., "AT&T Research at TRECVID 2006," retrieved from the internet on Jul. 21, 2010: URL: http://www-nlpir.nist.gov/projects/tvpubs/tv6.paper/att.pdf, 15 pages.
Tong, H.Y and Venetsanopoulos, Anastasios N., "A Perceptual Model for JPEG Applications Based on Block Classification, Texture Masking, and Luminance Masking," Image Processing, 1998, ICIP 98, Proceedings, 1998 International Conference in Chicago, IL, US, Oct. 4-7, 1998, Los Alamitos, CA, IEEE Comput. Soc, US, vol. 3, Oct. 4, 1998, pp. 428-432.
"A Feature-Based Algorithm for Detecting and Classifying Scene Breaks", Ramin Zabih et al., Computer Science Department, Cornell University, Ithaca, NY 14853, 12 pages.
"A New MPEG-2 Rate Control Scheme Using Scene Change Detection", Sanggyu Park et al., ETRI Journal, vol. 18, No. 2, Jul. 1996, 14 pages.

(Continued)

*Primary Examiner* — Taghi Arani
*Assistant Examiner* — Angela Holmes
(74) *Attorney, Agent, or Firm* — Fish & Richardson P.C.

(57) ABSTRACT

Systems, methods, and techniques for treating video information are described. In one implementation, a method includes receiving video information, classifying one or more frames in the received video information as a scene, adjusting one or more coding parameters based on the classification of the frames, and coding the video information in accordance with the adjusted coding parameters.

38 Claims, 28 Drawing Sheets

OTHER PUBLICATIONS

"A Novel Scheme for Fast and Efficient Video Sequence Matching Using Compact Signatures", Milind R. Naphade et al., Department of Electrical and Computer Engineering, University of Illinois at Urbana-Champaign, Urbana, IL 61801, USA; Microcomputer Research Labs, Intel Corporation, 2200 Mission College, Santa Clara, CA 95952, USA, 9 pages.

"A Unified Approach to Scene Change Detection in Uncompressed and Compressed Video", W.A.C. Fernando et al., Image Communications Group, Centre for Communications Research, University of Bristol, Merchant Ventures Building, Bristol BS8 IUB, United Kingdom, 11 pages.

"Automatic Partitioning of Full-Motion Video", HongJiang Zhang et al., Institute of Systems Science, National University of Singapore, Heng Mui Keng Terrace, Kent Ridge, Singapore 0511, Republic of Singapore, Received Jan. 19, 1993/Accepted Apr. 10, 1993, 19 pages.

"Comparison of Sequence Matching Techniques for Video Copy Detection", Arun Hampapur et al., IBM T.J. Watson Research Center, 30 Saw Mill River Road, Hawthorne, NY 10532, USA, School of Computer and Information Eng, YoungSan University, 150, Junamri, Kyongman, Korea 626-840, 8 pages.

"Compressed Domain Video Indexing Techniques Using DCT and Motion Vector Information in MPEG Video", Vikrant Kobla et al., Center for Automation Research, University of Maryland, College Park, MD 20742-3275; King-Ip (David) Lin et al., Dept. of Computer Science, Inst. for Systems Research, University of Maryland, College Park, MD 20742, 12 pages.

"Fast Scene Change Detection Using Direct Feature Extraction from MPEG Compressed Videos", Seong-Whan Lee et al., IEEE Transactions on Multimedia, vol. 2, No. 4, Dec. 2000, 15 pages.

"Finding Pirated Video Sequences on the Internet", Piotr Indyk et al., 24 pages.

"Knowledge Guided Parsing in Video Databases", Deborah Swanberg et al., Artificial Intelligence Laboratory, University of Michigan, Ann Arbor, MI 48109-2110, 12 pages.

"Motion Pattern-Based Video Classification and Retrieval", Yu-Fei Ma et al., EURASIP Journal on Applied Signal Processing 2003:2, 199-208, © 2003 Hindawi Publishing Corporation, 11 pages.

"Overview of the MPEG-7 Standard", Shih-Fu Chang et al., IEEE Transactions on Circuits and Systems for Video Technology, vol. 11, No. 6, Jun. 2001, 8 pages.

"Project Plan for Visual Scene Analysis", Eric Gsell & Hyung-Suk Kim, 16 pages.

"Rapid Scene Analysis on Compressed Video", Boon-Lock Yeo et al., IEEE Transactions on Circuits and Systems for Video Technology, vol. 5, No. 6, Dec. 1995, 12 pages.

"Scene Change Detection and Content-Based Sampling of Video Sequences", Behzad Shahraray, Machine Perception Research Department, AT&T Bell Laboratories, Holmdel, NJ 07733-3030, 12 pages.

"Scene Change Detection in a MPEG Compressed Video Sequence", Jianhao Meng et al., Department of Electrical Engineering & Center for Telecommunication Research, Columbia University, Hitachi America, Ltd., 12 pages.

"Statistical Models of Video Structure for Content Analysis and Characterization", Nuno Vasconcelos et al., IEEE Transactions on Image Processing, vol. 9, No. 1, Jan. 2000, 17 pages.

"Temporal Segmentation of MPEG Video Streams", Janko Calic et al., EURASIP Journal on Applied Signal Processing 2002:6, 561-565, © 2002 Hindawi Publishing Corporation, 6 pages.

"Two-Pass MPEG-2 Variable-Bit-Rate Encoding", P.H. Westerink et al., IBM J. Res. Develop., vol. 43, No. 4, Jul. 1999, 18 pages.

"Video Classification Using Transform Coefficients", Andreas Girgensohn et al., FX Palo Alto Laboratory, 3400 Hillview Avenue, Palo Alto, CA 94304, 0-7803-5041-3/99 © 1999 IEEE, 4 pages.

"Video Indexing Using Motion Estimation", Sarah Porter et al., Department of Computer Science, University of Bristol, Bristol, BS8 1UB, UK, 10 pages.

"Video Indexing Using Motion Vectors", Akihito Akutsu et al., 1522 / SPIE, vol. 1818, Visual Communications and Image Processing, '92, 9 pages.

"Video Indexing Using MPEG Motion Compensation Vectors", E. Ardizzone et al., Dipartimento di Ingegneria Elettrica, University of Palermo, Italy, 0-7695-0253-9/99 © 1999 IEEE, 5 pages.

"Video Retrieval Based on Scene Change Detection in Compressed Streams", Eung Kwan Kang et al., Department of Electrical Engineering, University, 221 Huksuk-Dong, Tongjak-Ku, Seoul 156-756, Korea, 5 pages.

"Video Sequence Matching", Rakesh Mohan, IBM T.J. Watson Research Center, P.O. Box 704, Yorktown Heights, NY 10598, 4 pages.

"Line Transmission of Non-Telephone Signals", Video Codec for Audiovisual Services at px64 kbits, ITU-T Recommendation H.261 (Mar. 1993), 29 pages.

"Line Transmission of Non-Telephone Signals", Video Codec for Audiovisual Services at px64 kbits, ITU-T Recommendation H.261, 32 pages.

"Transmission of Non-Telephone Signals", Information Technology—Generic Coding of Moving Pictures and Associated Audio Information: Video, ITU-T Recommendation H.262 (Jul. 1995), 211 pages.

"Transmission of Non-Telephone Signals", Video Coding for Low Bit Rate Communication, ITU-T Recommendation H.263 (Mar. 1996), 52 pages.

"Series H: Audiovisual and Multimedia Systems, Infrastructure of Audiovisual Services—Coding of Moving Video", Video Coding for Low Bit Rate Communication, ITU-T Recommendation H.263 (Feb. 1998), 167 pages.

"Series H: Audiovisual and Multimedia Systems, Infrastructure of Audiovisual Services—Coding of Moving Video", Advanced Videio Coding for Generic Audiovisual Services, ITU-T Recommendation H.264 (May 2003), 282 pages.

Aigrain, Philippe. et al., "The Automatic Real-Time Analysis of Film Editing and Transition Effects and its Applications", Computers and Graphics, Elsevier, GB, LNKD-DOI:10.1016/0097-8493(94)90120-1, vol. 18, No. 1, Jan. 1, 1994, p. 93-103.

Emme, Raoul, Invitation to Pay Additional Fees and, Where Applicable, Protest Fee, including Partial International Search Report issued in PCT/US2008/075600, on May 4, 2010, 9 pages.

* cited by examiner

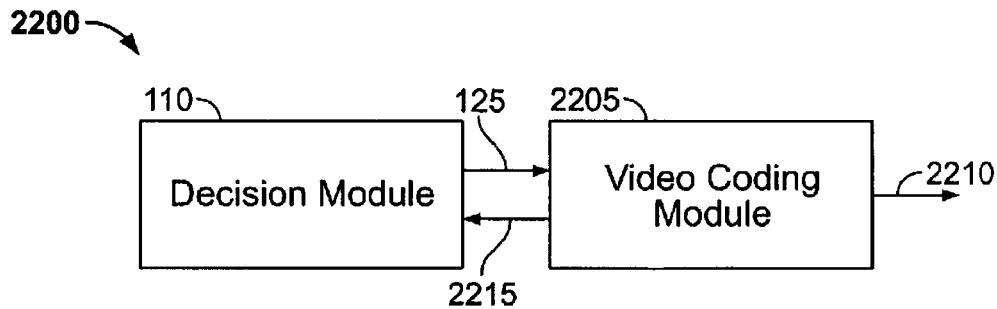
FIG. 22
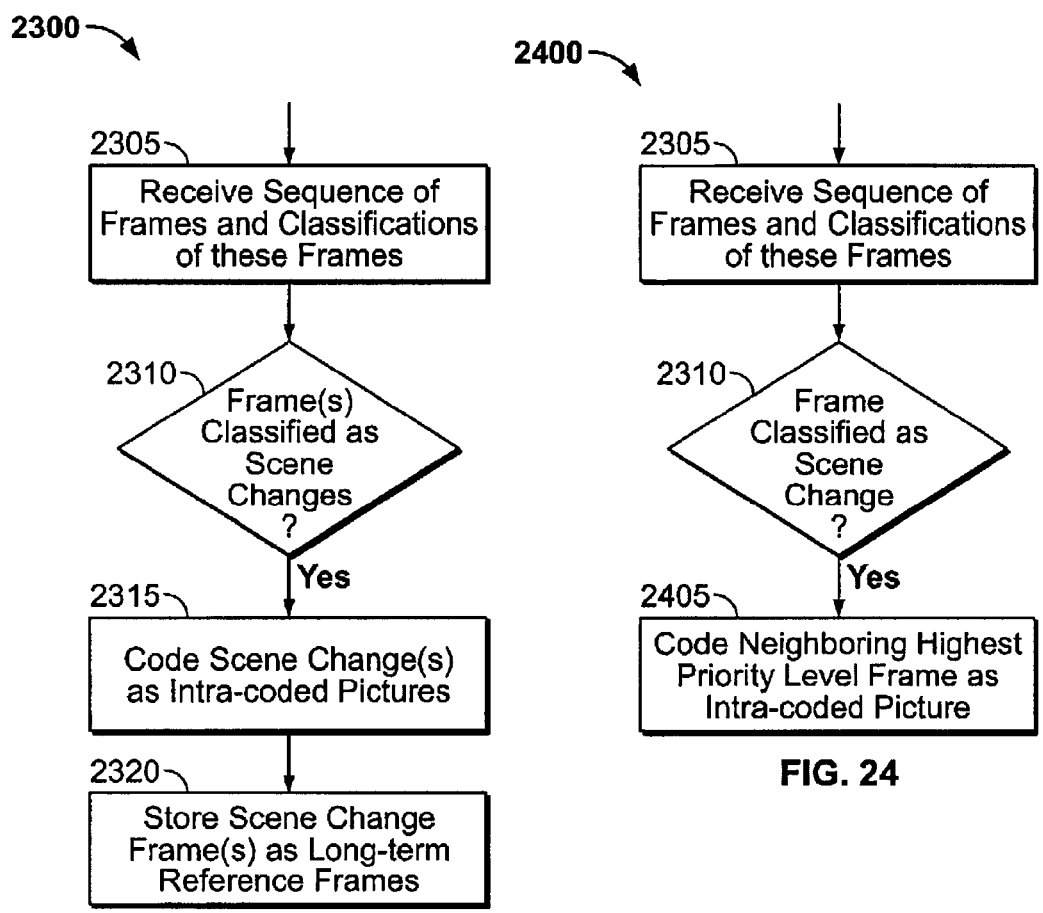
FIG. 23
FIG. 24

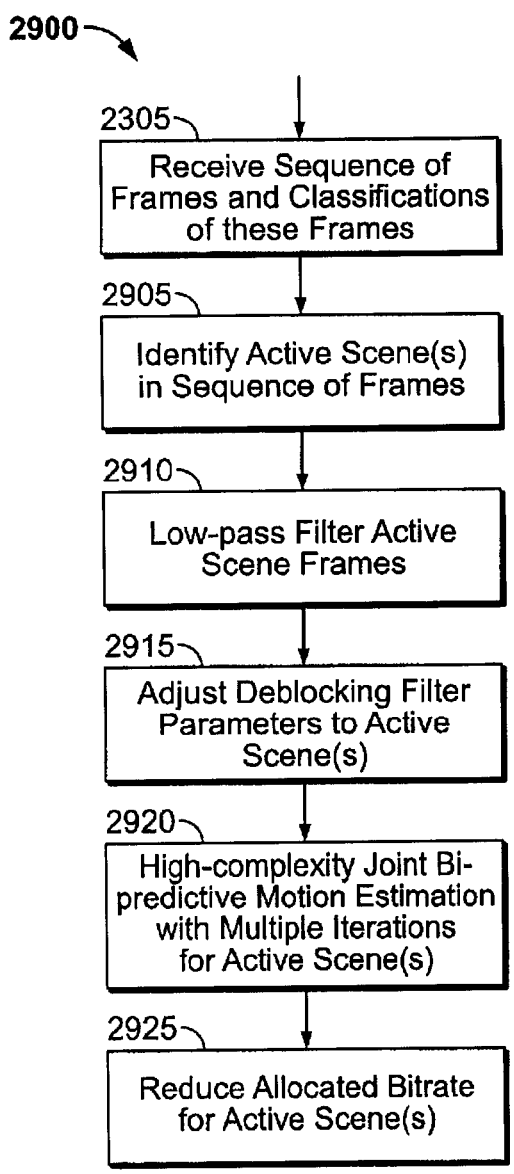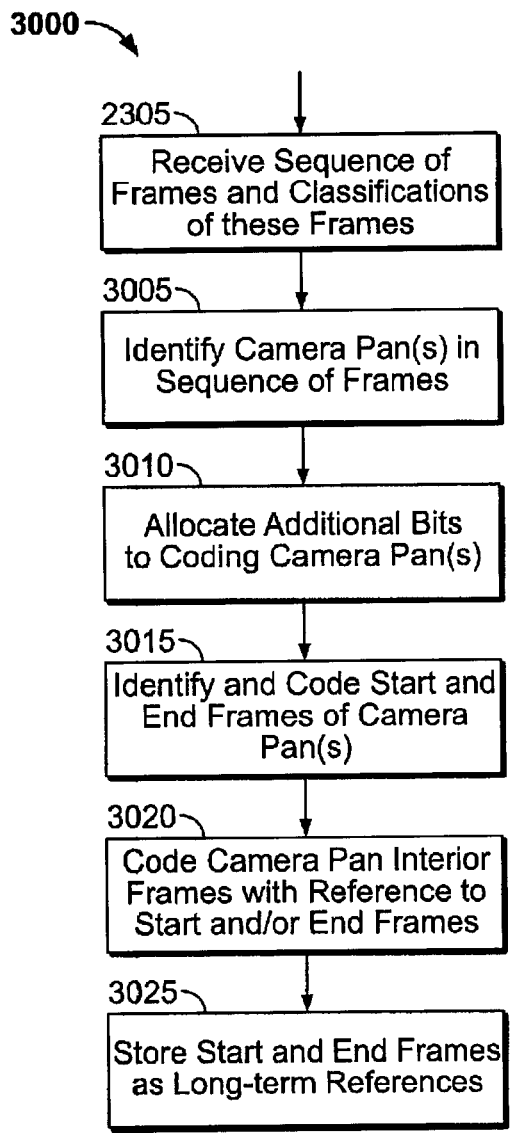
FIG. 29
FIG. 30

TREATING VIDEO INFORMATION

CROSS REFERENCE TO RELATED APPLICATIONS

This application claims the benefit of priority to U.S. Provisional Application entitled "TREATING VIDEO INFORMATION", Application No. 60/976,241, filed Sep. 28, 2007, the disclosure of which is incorporate by reference.

TECHNICAL FIELD

This disclosure relates to the treatment of video information.

BACKGROUND

Video information represents dynamic visual imagery. Typically, the visual imagery is represented using a collection of still images (e.g., frames, pictures, field pictures (interlace) and the like) that are presented to a viewer in sequence. The sequential presentation can represent dynamic fields of view on display devices such as television screens, movie screens, computer monitors, and the like.

BRIEF SUMMARY OF EXAMPLE EMBODIMENTS

The following paragraphs present a brief, simplified summary for providing a basic understanding of some aspects of example embodiments of the present invention. It should be noted that this brief summary is not an extensive overview of aspects of the example embodiment. Moreover, it should be noted that this brief summary is not intended to be understood as identifying any particularly significant aspects or elements, nor delineating any scope of the example embodiment in particular, nor of the invention in general. The following brief summary merely presents some concepts that relate to the example embodiment in a condensed and simplified format. This brief summary should thus be understood as merely a conceptual prelude to a more detailed description of one of the example embodiments that follow below.

Systems and techniques for treating video information are described. In one implementation, a method includes receiving video information, classifying one or more frames in the received video information as a scene, adjusting one or more coding parameters based on the classification of the frames, and coding the video information in accordance with the adjusted coding parameters.

This and other aspects can include one or more of the following features. The frames can be classified as one or more of a camera zoom scene or a fade scene. For example, the frames can be classified as a cross-fade scene or as a flash scene. The frames can be classified as a flash scene by identifying a low prediction error between frames preceding the flash scene and frames subsequent to the flash scene. Adjusting one or more coding parameters can include specifying that certain frames be coded as intra-coded frames.

Classifying one or more frames can include identifying at least one of a start frame and an end frame of the scene. Adjusting one or more coding parameters can include specifying that at least one of the start frame and the end frame be coded as intra-coded frames and/or specifying that interior frames in the scene be coded with reference to at least one of the start frame and the end frame.

In another aspect, a method includes receiving video information, performing motion estimation and compensation on the video information to generate a collection of motion estimation and compensation parameters, and classifying one or more frames in the video information as a scene based on the motion estimation and compensation parameters.

This and other aspects can include one or more of the following features. One or more frames can be classified as a pan scene based on a component of a representative motion estimation and compensation parameter.

The one or more frames can be classified by identifying motion vectors for blocks in two or more frames, determining that the motion vectors for the blocks are relatively small in magnitude, determining that the motion vectors for collocated blocks are correlated in direction and continuous over successive frames, and classifying the two or more frames as a camera zoom scene.

The one or more frames can be classified as a scene by comparing a prediction error metric for a current frame with a threshold and identifying a scene change based on the prediction error metric for the current frame exceeding the threshold. For example, the prediction error metric for the current frame can be compared with the threshold by comparing the prediction error metric for the current frame with a long term threshold relating to prediction error metric over a relatively large number of frames and comparing the prediction error metric for the current frame with a short term threshold relating to prediction error metric over a relatively small number of frames. Comparing the prediction error metric for the current frame with the threshold can include comparing a difference in prediction error metric for a current frame and an adjacent frame with a threshold.

A bit rate for coding the frames can be changed based on a lack of support for a motion model by a video encoding module. Changing the motion estimation and compensation parameters can include excluding certain frames from use as reference frames, changing a weight of a preliminary prediction frame in a final prediction frame, and/or allocating additional computational resources to predictive motion estimation.

The method can also include adjusting one or more coding parameters based on the scene classifications and coding frames in the scene in accordance with the adjusted coding parameters. For example, it can be specified that certain frames be coded as intra-coded frames. As another example, a bit allocation for coding the scene can be increased.

In another aspect, a method includes receiving video information, classifying a region in one or more frames in the received video information, adjusting one or more coding parameters based on the classification of the region, and coding the region in accordance with the adjusted coding parameters. The region is smaller than the frame in which the region appears.

This and other aspects can include one or more of the following features.

One or more coding parameters can be adjusted by increasing a bit allocation for coding the region and/or reducing filtering of the region. The region can be classified as a dark region and a bit allocation for coding the dark region can be increased.

In another aspect, a method includes receiving video information, identifying a scene change in the received video information, classifying a scene based on a discrepancy between a prediction error with weighted prediction and a prediction error without weighted prediction, and making a classification of the scene available.

In another aspect, a method includes receiving video information, identifying a scene change in the received video information, classifying a scene based on a position of the scene change, and making a classification of the scene available.

This and other aspects can include one or more of the following features. A fingerprint of the video information can be made using the classification of the scene. Coding parameters used in coding the video information can be adjusted based on the classification of the scene. The scene can be classified based on feedback from an encoding module.

Identifying the scene change can include identifying a fade scene and classifying a frame at an end of the fade scene as a scene change. Identifying the scene change can also include detecting a fade scene based on weighted prediction parameters from reference frames preceding a current frame and weighted prediction parameters from reference frames subsequent to the current frame. Identifying the scene change can also include identifying that a current scene includes a flash and excluding the current scene from being identified as a scene change based on the identification that the current scene includes the flash.

In another aspect, a method can include receiving a characterization of luminance in a sequence of frames of video information, classifying one or more frames in the sequence of frames as a scene based on the characterization of the luminance, and making one or more scene classifications available.

This and other aspects can include one or more of the following features. The one or more frames can be classified as a fast fade or a slow fade based on an amount of change in the luminance between the one or more frames. The method can also include adjusting one or more coding parameters based on the scene classifications and coding the video information in accordance with the adjusted coding parameters. The method can also include classifying one or more frames as a dark scene and coding the video information comprises increasing a bit allocation to the dark scene based.

In another aspect, a method includes receiving a sequence of frames of video information, determining dominant motion vectors for each of the frames in the sequence, and identifying a scene change based on the dominant motion vectors of the frames in the sequence.

This and other aspects can include one or more of the following features. The dominant motion vectors can be determined by forming a multi-dimensional motion vector histogram that embodies frequencies with which motion vectors appear and selecting the dominant motion vectors based on the frequency at which motion vectors appear in the histogram.

In another aspect, a method includes receiving a characterization of luminance in a sequence of frames of video information, based on the characterization of the luminance, identifying one or more of the frames in the sequence as including a flash, and excluding the frames including the flash from use as motion-compensation reference frames.

In another aspect, a system includes a motion estimation and motion prediction module to generate a collection of parameters characterizing motion in a collection of video information and a decision module to classify one or more scenes in the collection of video information based at least in part on the parameters characterizing the motion in the collection of video information.

This and other aspects can include one or more of the following features. The system can also include a luminance module to generate a collection of parameters characterizing luminance in the collection of video information. The decision module can classify the one or more scenes based at least in part on the parameters characterizing the luminance in the collection of video information. The system can also include a spatial analysis module to generate a collection of parameters characterizing texture and edge effects in the collection of video information. The decision module can classify the one or more scenes based at least in part on the parameters characterizing the texture and edge effects in the collection of video information. The system can also include a data path to carry feedback from the decision module to the motion estimation motion prediction module.

The system can also include a video fingerprinting module to generate a video fingerprint of the collection of video information based at least in part on the classifications of the one or more scenes and/or a coding module to generate coded video information based at least in part on the classifications of the one or more scenes. The system can also include a data path to carry feedback from the coding module to the motion estimation motion prediction module.

The term "algorithm" can refer to steps, methods, processes, schemes, procedures, operations, programs, guidelines, techniques, sequences, and/or a set of rules or instructions. For example, an algorithm can be a set of video processing instructions for a hardware and/or software video processor. The algorithms may be stored, generated, and processed by one or more computing devices and/or machines (e.g., without human interaction). The disclosed algorithms can be related to video and can be generated, implemented, associated, and/or employed in video-related systems and/or any devices, machines, hardware, and/or articles of manufacture for the processing, compression, storage, transmission, reception, testing, calibration, display, and/or any improvement, in any combination, for video data. These algorithms and techniques are not limited to a particular coding standard, but can be used outside or in addition to a coding standard. Also, coding dependencies can be investigated between coding schemes in a video coding system to improve coding performance.

The term "image feature" may refer to one or more picture elements (e.g., one or more pixels) within a field. The term "source field" may refer to a field from which information relating to an image feature may be determined or derived. The term "intermediate field" may refer to a field, which may temporally follow or lead a source field in a video sequence, in which information relating to an image feature may be described with reference to the source field. The term "disparity estimation" may refer to techniques for computing motion vectors or other parametric values with which motion, e.g., between two or more fields of a video sequence, or other differences between an image, region of an image, block, or pixel and a prediction signal may efficiently be predicted, modeled or described. An example of disparity estimation can be motion estimation. The term "disparity estimate" may refer to a motion vector or another estimated parametric prediction related value. The term "disparity compensation" may refer to techniques with which a motion estimate or another parameter may be used to compute a spatial shift in the location of an image feature in a source field to describe the motion or some parameter of the image feature in one or more intermediate fields of a video sequence. An example of disparity compensation can be motion compensation. The above terms may also be used in conjunction with other video coding concepts (e.g., intra prediction and illumination compensation).

Any of the methods and techniques described herein can also be implemented in a system with one or more components, an apparatus or device, a machine, a computer program product, in software, in hardware, or in any combination thereof. For example, the computer program product can be tangibly encoded on a computer-readable medium, and can include instructions to cause a data processing apparatus (e.g., a data processor) to perform one or more operations for any of the methods described herein.

The details of one or more implementations are set forth in the accompanying drawings and the description below. Other features and advantages will be apparent from the description and drawings, and from the claims.

DESCRIPTION OF DRAWINGS

FIG. 22 is a schematic representation of an example of a video coding system.

FIGS. 23-32 are flowcharts of example processes for video coding.

Like reference symbols in the various drawings indicate like elements.

DESCRIPTION OF EXAMPLE EMBODIMENTS

Figure 1:
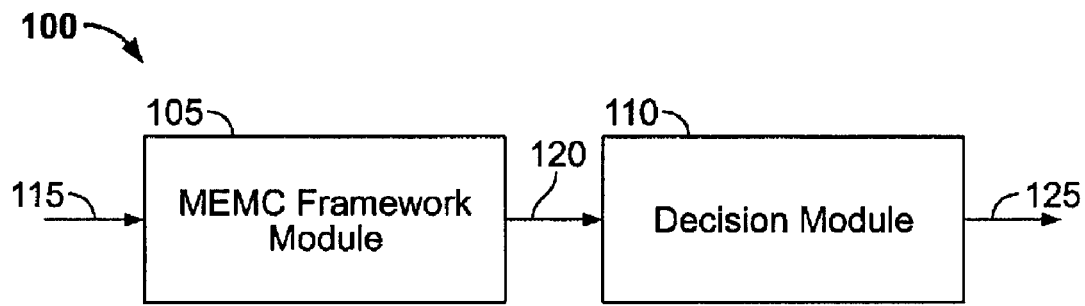
FIG. 1 is a schematic representation of an example of a video characterization system.

FIG. 1 is a schematic representation of a video characterization system 100. Video characterization system 100 includes a motion estimation and motion compensation framework (MEMC) module 105 and a decision module 110. Video characterization system 100 receives video information 115 and generates scene classifications 125. As discussed further below, a scene is a sequence of frames, pictures, and field pictures that share characteristic properties. Pictures can be in progressive or interlace (field mode). In this disclosure, the terms "frame" and "picture" are used interchangeably to refer to frames, pictures, and/or field pictures. Scene classifications 125 can be used for activities such as video fingerprinting and video coding, as discussed further below.

MEMC module 105 is a video information processing device that generates information 120 characterizing frames of video information. MEMC module 105 can process video information in accordance with the logic of a set of machine-readable instructions. The machine-readable instructions can be tangibly embodied in hardware and/or software. For example, MEMC module 105 can include a computer that operates in accordance with the logic of motion estimation and motion compensation software.

Motion compensation characterizes a frame in a set of video information based on the movement of one or more blocks in the frame with respect to some reference frame. Motion estimation is the process of representing such movement for use in characterizing a frame. Motion estimation can include the analysis of previous or future frames to identify blocks that change (or do not change) location and the representation of any changes in location using, e.g., motion vectors. The blocks can encompass the entire frame (e.g., global motion compensation) and/or discrete regions of a frame. The size of blocks can also be variable (e.g., variable block-size motion compensation). The shape of the block can be arbitrary (e.g., mesh based motion compensation).

A variety of information 120 can be output by MEMC module 105. For example, descriptions of the blocks and representations of any changes in location of the block (e.g., motion vectors) can be output by MEMC module 105. In some implementations, a quantification of the error between the predicted and actual pixel values of a motion-compensated block can also be output. Such prediction errors can be expressed, e.g., as a mean squared error (MSE), a sum of absolute differences (SAD), a sum of squared errors (SSE), a sum of absolute transformed differences (SATD), a Minkowski norm, and/or a mean absolute difference (MAD).

Decision module 110 is a data processing device that generates scene classifications 125. Decision module 110 can process information such as frame characterization information in accordance with the logic of a set of machine-readable instructions to generate scene classifications 125. The machine-readable instructions can be tangibly embodied in hardware and/or software. For example, decision module 110 can include a computer that operates in accordance with the logic of motion estimation and motion compensation software.

As discussed above, a scene is a sequence of frames that share characteristic properties. Scenes can be classified based on characteristic motion that occurs in a sequence of frames. In some implementations, the motion in a sequence of frames can be classified based on adjustments to a camera during the sequence. Examples of such scene classifications include camera pan scenes, zoom-in scenes, and zoom-out scenes. Additional details regarding the classification of these and other scenes are provided below.

The scene classifications 125 output by decision module 110 can include an identification of the scene class, along with a description of the start and/or end times of one or more scenes. In some implementations, additional details regarding the classified scenes can also be provided, such as the rate at which a camera is panned during a camera pan scene, an estimate of the change in magnification during a zoom-out scenes, and the like.

Figure 2:
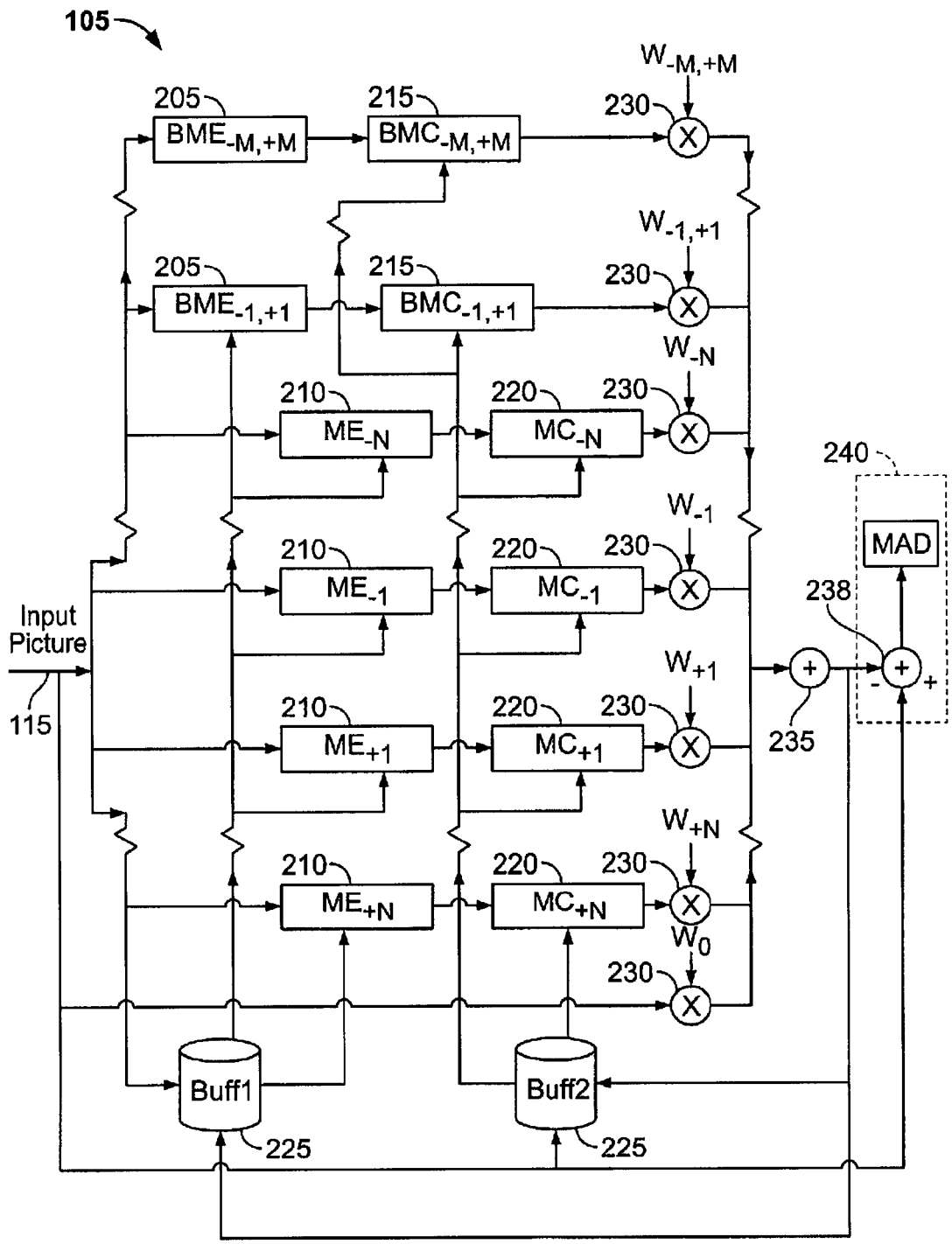
FIG. 2 is a schematic representation of an example of a motion estimation and motion compensation (MEMC) framework module.

FIG. 2 is a schematic representation of one implementation of MEMC module 105. The represented implementation of MEMC module 105 includes a collection of bipredictive motion estimation modules 205, a collection of unipredictive motion estimation modules 210, a collection of bipredictive motion compensation modules 215, a collection of unipredictive motion compensation modules 220, a collection of buffers 225, a collection of multipliers 230, an adder 235, and an error prediction module 240.

Bipredictive motion estimation modules 205 represent movement of one or more blocks in a current frame from multiple (e.g., two) reference frames. In the illustrated implementation, one reference frame precedes the current frame (e.g., frames −1, −M) and one reference frame follows the current frame (e.g., frames +1, +M). The subscripts in each bipredictive motion estimation module 205 thus denote the relative positioning of a reference frame and the current frame. Bipredictive motion estimation modules 205 can operate using any of a variety of different estimation techniques, including weighted prediction, translational, affine, or parabolic motion models, and overlapped block motion estimation techniques.

Unipredictive motion estimation modules 210 represent movement of one or more blocks in a current frame from a single reference frame. In the illustrated implementation, the reference frame precedes (e.g., frames −1, −M, −N) or follows (e.g., frames +1, +M, +N) the current frame. The subscripts in each unipredictive motion estimation module 210 thus denote the relative positioning of the reference frame and the current frame. Unipredictive motion estimation modules 210 can operate using any of a variety of different estimation techniques, including weighted prediction, translational, affine, or parabolic motion models, and overlapped block motion estimation techniques.

Bipredictive motion compensation modules 215 each perform bipredictive motion-compensation using motion vectors received from a respective bipredictive motion estimation module 205. In particular, the set $B_n$ shown in Equation 1 below contains two reference frames—one preceding the current frame and one following the current frame.

$$\tilde{p}_n(i,j) = \sum_{\forall k \in B_n} (\alpha_k \times p_k(i+v_{x,k}, j+v_{y,k})) + o \quad \text{Equation 1}$$

Here, $\tilde{P}_n(i,j)$ represents the prediction of the current pixel in frame n at position (i, j). Set $B_n$ contains the indices to all available reference frames for frame n. Assuming a translational only model, each prediction is generated from an available reference k using pixel $P_k(i+v_{x,k}, j+v_{y,k})$. The terms $(v_{x,k}, v_{y,k})$ represents a displacement from position (i, j) of frame k and could take fractional values. Term $a_k$ corresponds to the weighting factor for reference k respectively. The parameters $\alpha_k$ and o are commonly referred to as illumination change or weighting parameters and respectively represent weighting factors and offsets reflecting illumination changes within a scene. In some implementations, illumination change parameters are not characterized and o=0 and $$\sum_{\forall k \in B_n} \alpha_k = 1,$$

while $\alpha_k = a_i$, $\forall k \neq i$.

Unipredictive motion compensation modules 220 each perform unipredictive motion-compensation using motion vectors received from a respective unipredictive motion estimation module 210. In particular, the set $B_n$ shown in Equation 1 contains a single reference frame.

Buffers 225 are temporary data stores that include previous and future spatially and temporally filtered frames. Each multiplier 230 multiplies the preliminary prediction frames output of bipredictive motion compensation modules 215 and unipredictive motion compensation modules 220 by a weight w. The weighted predictive characterizations are combined by an adder 235 to generate a final prediction frame 238. Final prediction frame 238 is provided to an error prediction module 240. Error prediction module 240 is configured to provide a prediction error metric. In some implementations, weights w can be adjusted by a feedback from error prediction module 240 in order to minimize the prediction error provided by error prediction module 240 (not shown).

In operation, movement in each input frame is estimated in bipredictive motion estimation modules 205 and unipredictive motion estimation modules 210 based on one or more reference frames to yield motion-compensated predictions of the input frame. In particular, the input frame is divided into overlapping or non overlapping blocks of pixels. Such blocks are generally rectangular and can have an arbitrary size. For example, the block can be 16×16 pixels or 8×8 pixels in size. In some implementations, the input frame is divided into regions of varying and/or arbitrary sizes and shapes based on the characteristics and objects of the image in the input frame.

A block in the current input frame n can be matched with one or more prediction blocks that are generated from one or more reference frames. Bipredictive motion estimation modules 205 and unipredictive motion estimation modules 210 can determine motion parameters based on relative positions of the block in the current input frame n and the prediction block(s).

In general, a block $b_n^m$, within a frame m can be predicted from a block within a different frame k, i.e., $\hat{b}_n^{m,k}$. Frame k can precede or follow a frame m within a sequence of frames. Multiple reference frames, i.e. all frames within a reference buffer $B_m$, can be used to create a final prediction for $b_n^m$ as $$\bar{b}_n^m = \sum_{\forall i \in B_m} w_i \times \hat{b}_n^{m,k}.$$

This prediction process is similar to the frame prediction in Equation 1. All predicted blocks $\bar{b}_n^m$ can be combined to form a motion-compensated frame that approximates frame m. As an alternative, multiple motion compensated prediction frames can be created using only predictions from a reference frame k. In any case, these preliminary prediction frames can be combined to generate a final prediction frame 238.

In some implementations, multiple preliminary prediction frames are generated by combining blocks from groups of different reference frames. The preliminary prediction frames can then be combined to generate final prediction frame 238. For example, a first preliminary prediction frame can be generated using a group of reference frames $k_1$ to $k_o$, a second preliminary prediction frame can be generated using a group of reference frames $k_p$ through $k_s$, and so on. Such preliminary prediction frames can be combined linearly or nonlinearly to generate a single final prediction frame. In some implementations, one or more reference frames can appear in multiple groups of reference frames and used to generate multiple preliminary prediction frames. In some implementations, one or more of the motion models used in bipredictive motion estimation modules 205 and/or unipredictive motion estimation modules 210 can be affine and/or a translational motion models. In some implementations, one or more of these can consider illumination changes in modeling motion. Moreover, please note that each bipredictive motion estimation module 205 and each unipredictive motion estimation module 210 can use different motion models.

Figure 3:
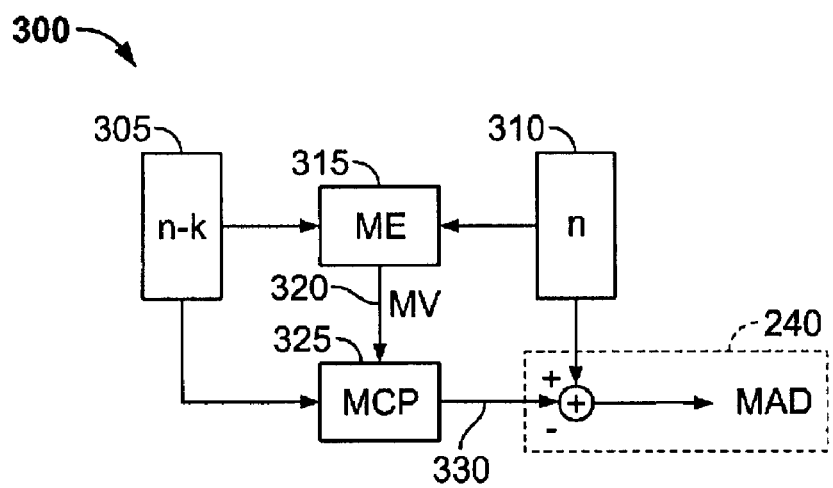
FIGS. 3 and 4 schematically represent examples of error predictions by an error prediction module.
Figure 4:
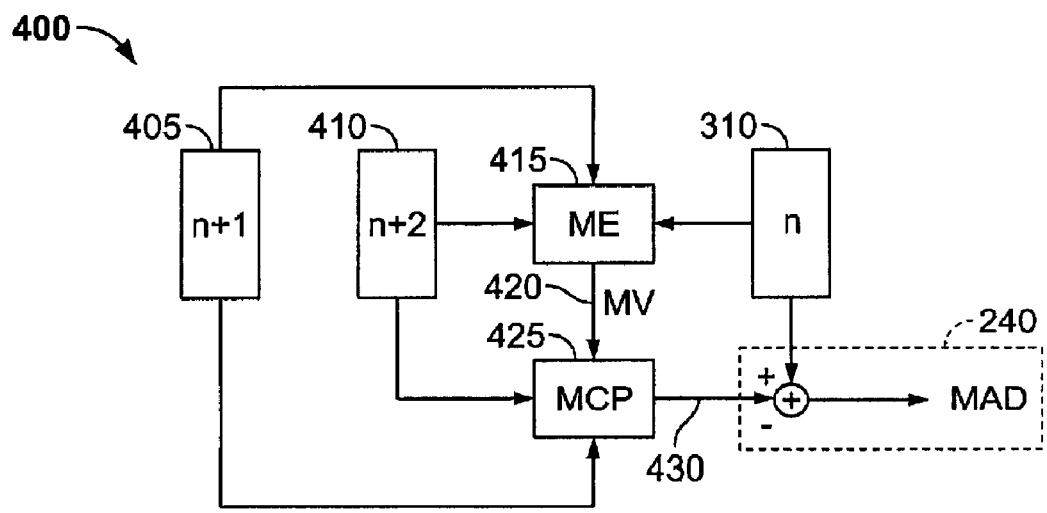

FIGS. 3 and 4 schematically represent different examples of calculations 300, 400 of mean absolute difference (MAD) error prediction metrics by an error prediction module, such as error prediction module 240. The MAD error prediction metric calculations 300, 400 can be determined for one or more MEMC modules, including MEMC module 105.

In particular, FIG. 3 schematically represents error MAD calculations using a single preceding reference frame 305. A current frame 310 and preceding reference frame 305 are input into a motion estimation module 315. Motion estimation module 305 represents the movement of one or more blocks using a set of motion vectors 320, which are provided to a motion compensation module 325. Motion compensation module 325 applies motion vectors 320 to one or more blocks in preceding reference frame 305 to generate a prediction frame 330. Prediction frame 330 is a characterization of the image shown in current frame 310 based on motion vectors 320 and preceding reference frame 305. Error prediction module 240 determines the difference between prediction frame 330 and current frame 310 and expresses it as a mean absolute difference.

FIG. 4 schematically represents error MAD calculations using multiple subsequent reference frames 405, 410. A current frame 310, first subsequent reference frame 405, and a second subsequent reference frame 410 are input into a motion estimation module 415. Motion estimation module 415 represents the movement of one or more blocks using a set of motion vectors 420, which are provided to a motion compensation module 425. Motion compensation module 425 applies motion vectors 420 to blocks in first and second subsequent reference frames 405, 410 to generate a prediction frame 430. Prediction frame 430 is a characterization of the image shown in current frame 310 based on motion vectors 420 and first and second subsequent reference frames 405, 410. Error prediction module 240 determines the difference between prediction frame 430 and current frame 310 and expresses it as a mean absolute difference.

In other implementations, an error prediction such as MAD, SAD, SSE or the like can be calculated directly from a representation of the movement of one or more blocks (e.g., a set of motion vectors) output by a motion estimation module. In other words, motion compensation is not necessarily performed.

In some implementations, MEMC framework module 105 can generate a wide variety of information 120 that characterizes frames in video information 115. MEMC framework module 105 need not generate every type of information 120 described herein. Rather, a results-effective subset can be generated. Examples of the information 120 that characterize a frame n include but are not limited to:

1. The difference between a block m in frame n and a motion-compensated prediction of block m in a reference frame k. Frame k can be a preceding frame n−N or a subsequent frame n+N. In some implementations, the difference can include luma components, color (chroma) components, and/or motion vector cost. The motion vector cost can be defined as a metric of the discrepancy of the current block's motion (or motion vector) compared to the motion of the blocks in its neighborhood.
2. The difference between block m in frame n and a motion-compensated prediction of block m in a linear or non-linear weighted combination of frames k, l, m, etc., where k, l, and m are between n−N and n+N.
3. The difference between block m in frame n and a motion-compensated prediction of block m in a final prediction frame. In some implementations, the prediction of block m in a final prediction frame can be a result of the combination of multiple prediction hypotheses from different reference frames and/or de-blocking.
4. Motion vectors that describe the motion of one or more blocks m in one or more respective reference frames. These motion vectors can be determined using any or a number of different motion models, including, e.g., translational motion models, affine motion models, parabolic motion models, and the like,
5. Weights and offsets that are applied to preliminary prediction frames.
6. Parameters that quantify prediction errors, such as the mean and variance of the prediction error for different blocks and frames.
7. An average global motion vector for an entire frame or a set of representative motion vectors for the most "dominant" regions in the frame.
8. The most dominant motion vectors for an entire frame, which can be obtained using a multi-dimensional motion vector histogram. The dominant motion vector can be expressed as the peak of such a histogram (i.e. the histogram's mode), as well as the M−1 largest values in the histogram. In some implementations, M can be equal to 5.
9. The dominant weighted prediction parameters determined, which can be determined using a two-dimensional histogram of the weights and offsets that are applied to preliminary uni-predictive or bi-predictive frames.

Figure 5:
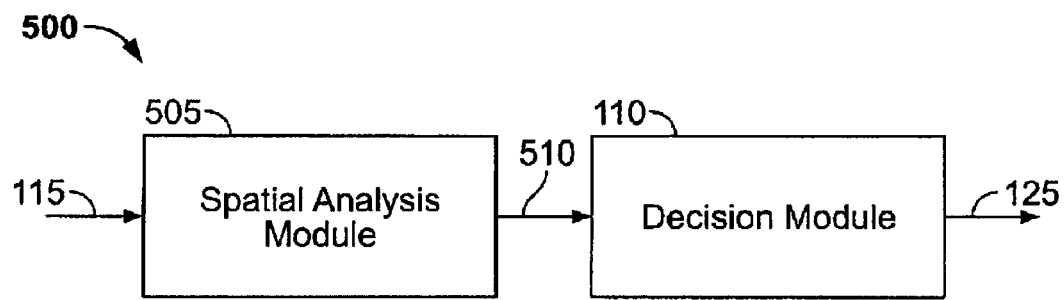
FIG. 5 is a schematic representation of an example of a video characterization system.

FIG. 5 is a schematic representation of a video characterization system 500. In addition to decision module 110, video characterization system 500 also includes a spatial analysis module 505. Video characterization system 500 receives video information 115 and generates scene classifications 125 based on a collection of spatial information 510 generated by spatial analysis module 505.

Spatial analysis module 505 is a video information processing device that generates spatial information 510 characterizing frames of video information. Spatial analysis module 505 can process video information in accordance with the logic of a set of machine-readable instructions. The machine-readable instructions can be tangibly embodied in hardware and/or software. For example, spatial analysis module 505 can be implemented on a computer that operates in accordance with the logic of spatial analysis software.

Among the spatial information 510 that can be generated by spatial analysis module 505 is texture information and edge intensity information. Texture information is information that characterizes the visual or tactile surface characteristics and appearance of a block in a frame, a region in a frame, or an entire frame. Texture information can be expressed in terms of the spatial frequency content of a block, a region, or a frame. The spatial frequency can be determined by applying a frequency analysis transform to a block, a region, or a frame. Examples of such frequency analysis transforms include wavelet transforms and the discrete cosine transform (DCT). The spatial frequency can also be determined using various filtering approaches. For example, if one applies an 8×8 DCT transform to a source block, the derived DCT coefficients can be used to characterize the textural content of the source block. For example, if the average energy at all DCT coefficient positions is smaller than a predetermined threshold or if DCT coefficients are non zero only at certain positions, then the source block can be classified as a low spatial frequency block.

Figure 6:
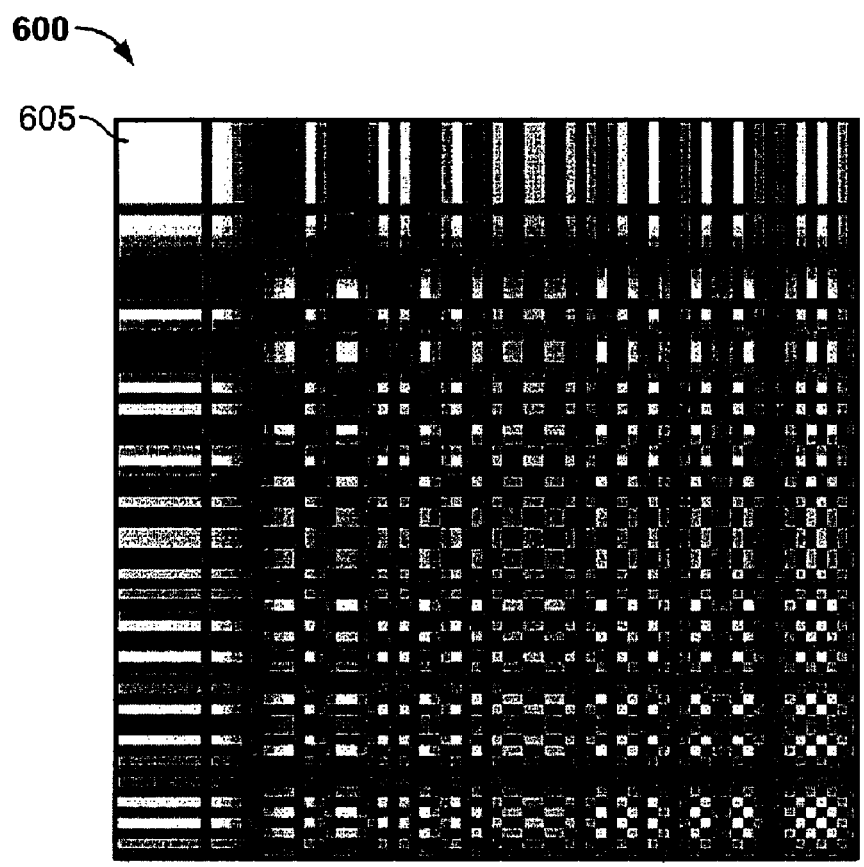
FIG. 6 is a representation of examples for the basis vectors relating to the frequency content of the 8×8 Discrete Cosine Transform.

FIG. 6 is a representation of the basis functions of the 8×8 Discrete Cosine Transform and shows the impact of each DCT coefficient on the spatial representation of an 8×8 block. The top-left block 605 relates to the "DC coefficient" which is a low-pass coefficient, and represents the average value of the pixels in the 8×8 block. The remainder of the blocks relate to the higher frequency DCT coefficients (i.e., the "AC coefficients") and capture increasing horizontal and vertical frequencies as distance from the DC coefficient increases.

FIG. 6 thus relates to the impact that a given frequency coefficient has on the characteristics of a block in the spatial domain. If, for example, a certain value x0 is in the DC coefficient, and x1 is in a certain AC coefficient, then the final representation in the spatial domain would be $x0*DC_{basis} + x1*AC_{basis}$.

Edge intensity information can be generated by an edge analyzer that applies one or more gradient-based edge filters to a frame. Example edge filters include the Sobel filter and the Prewitt filter operators. In some implementations, an edge analyzer can apply a Canny edge detector to a frame.

For example, the application of a Sobel filter around an area that includes one or more pixels can yield the direction and magnitude of the dominant edge in that area. The presence of edges is generally correlated with the presence of high spatial frequency content in an area and can be used to characterize such high spatial frequency content. The presence of edges can also be used in the selection of coding tools. For example, the presence of edges can be used in the selection of directional intra prediction modes in the H.264/AVC video coding standard, in the selection of inter prediction block types for motion estimation and compensation, in sub-pixel motion estimation simplification, and the like.

In some implementations, texture information and edge intensity information can be weighted and combined to classify a block, a region, or a frame as being highly textured, moderately textured, or smooth. Other and/or finer classifications can also be used. In some implementations, the color of a block, a region, or a frame can be used in making such classifications.

Figure 7:
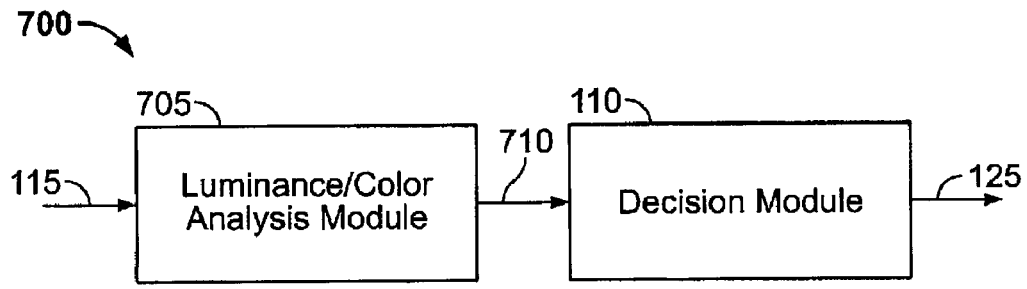
FIG. 7 is a schematic representation of an example of a video characterization system.

FIG. 7 is a schematic representation of a video characterization system 700. In addition to decision module 110, video characterization system 700 also includes a luminance/color analysis module 705. Video characterization system 500 receives video information 115 and generates scene classifications 125 based on a collection of luminance/color information 710 generated by luminance/color analysis module 705.

Luminance/color analysis module 705 is a video information processing device that generates luminance/color information 710 characterizing frames of video information. Luminance/color analysis module 705 can process video information in accordance with the logic of a set of machine-readable instructions. The machine-readable instructions can be tangibly embodied in hardware and/or software. For example, luminance/color analysis module 705 can be implemented on a computer that operates in accordance with the logic of luminance analysis software.

Luminance/color analysis module 705 can generate a variety of different luminance/color information 710. For example, in some implementations, luminance/color information 710 can characterize parameters of the average values of chroma and luminance components of a block, a region, or a frame. These parameters can be calculated on color planes such as the YUV and the RGB color planes. Examples of such parameters include the local (for individual blocks or regions) and global (for individual frames) average DC value of the luminance and chroma components, the local variance of each block or region, and the global variance of the entire source frame.

In some implementations, a frame can be classified based on luminance/color information 710 as either a) bright and hence likely to mask artifacts caused by filtering or compression, b) dark and hence likely to accentuate artifacts caused by filtering or compression, or c) normal and hence having an average luminance. In other implementations, other and/or finer classifications of frames or regions can be used.

Figure 8:
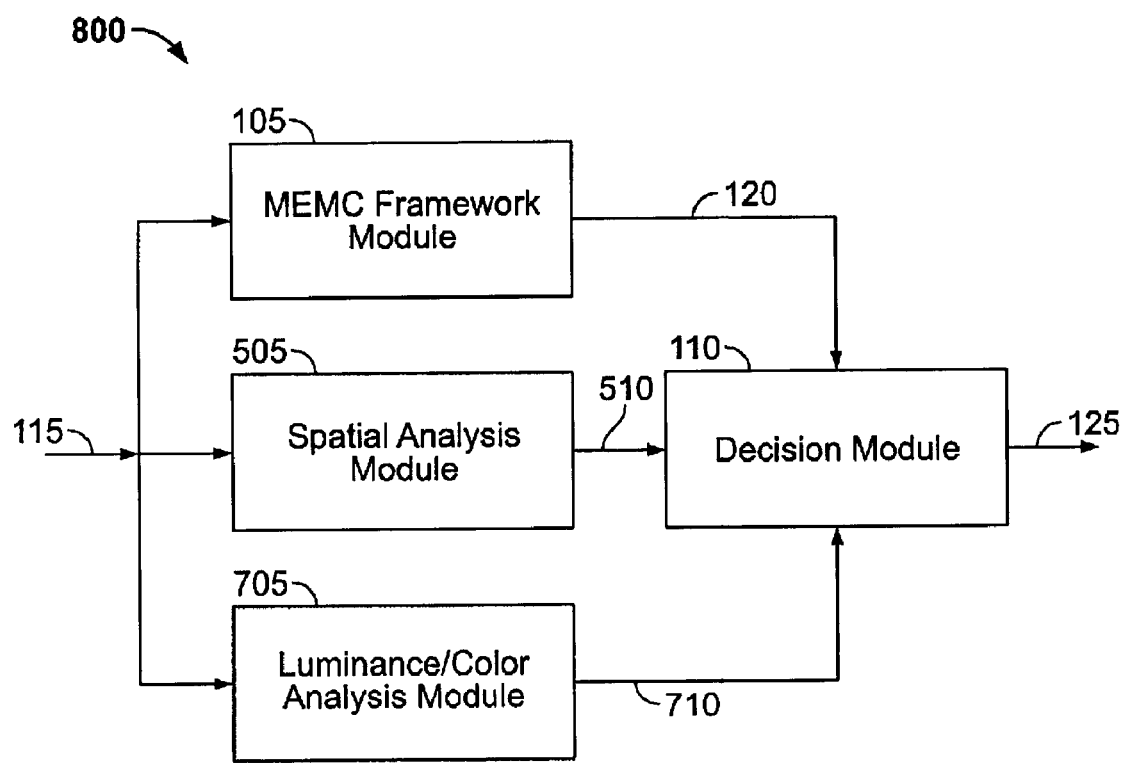
FIG. 8 is a schematic representation of an example of a video characterization system.

FIG. 8 is a schematic representation of a video characterization system 800. As shown, video characterization system 800 includes MEMC module 105, spatial analysis module 505, luminance/color analysis module 705, as well as decision module 110. Video characterization system 800 receives video information 115 and generates scene classifications 125 based on collections of information 120, spatial information 510, and luminance/color information 710 generated by modules 105, 505, 705, respectively.

As discussed above, decision module 110 can process information in accordance with the logic of a set of machine-readable instructions to generate scene classifications 125. In video characterization system 800, decision module 110 integrates information 120, 510, 710 to generate scene classifications 125.

Figure 9:
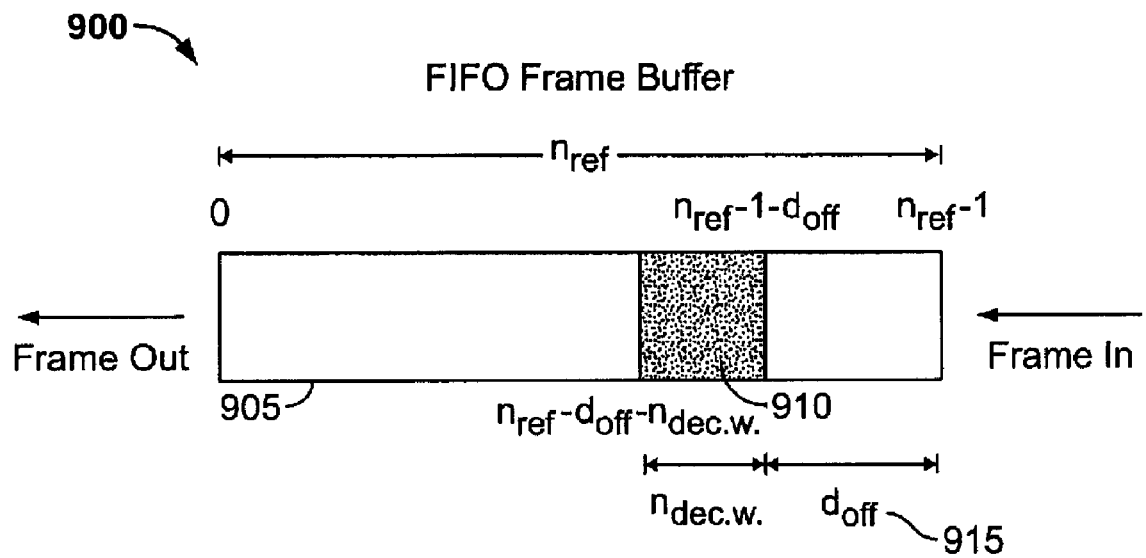
FIG. 9 schematically represents an example of an implementation of a buffer that can be used for generating scene classifications.

FIG. 9 schematically represents an implementation of a buffer 900 that can be used for generating scene classifications. For example, buffer 900 can be a FIFO buffer that is used by a system such as decision module 110.

Buffer 900 includes a collection of information 905 that characterizes a number $n_{ref}$ of frames. Information 905 can include one or more of information 120, 510, 710 (FIGS. 1, 5, 7, 8). Buffer 900 also includes a sliding decision window 910 of $n_{dec.w.}$ frames within the $n_{ref}$ of frames characterized by information 905. The $n_{dec.w.}$ frames of sliding decision window 910 are evaluated together. Sliding decision window 910 thus steps forward by $n_{dec.w.}$ frames every $n_{dec.w}$ frames and scene classification in the decision window benefits from the consideration of $n_{ref}$ frames in the FIFO buffer. The evaluation can include a classification of a scene and/or a characterization of the complexity of the $n_{dec.w.}$ frames within sliding decision window 910.

Buffer 900 also includes a decision offset 915 (denoted "$d_{off}$"). Decision offset 915 spans the frames that have been received by buffer 900 but not yet entered sliding decision window 910. Thus, if the frame that was last added to the FIFO buffer is frame $n_{ref}-1$, then decision window 910 spans the frames $m-d_{off}-n_{dec.w.}+1$ through $m-d_{off}$.

In some implementations, new frames enter into buffer 900 at the frame rate of the video source. In other implementations, new frames enter into buffer 900 at a rate that is lower than the frame rate of the video source. For example, new frames can enter into buffer 900 at a one half the frame rate of the video source, so that frames 0, 1, and 2 in buffer 900 correspond to frames 0, 2, and 4 in the video source. In some implementations, the relationship between the rate that frames enter into buffer 900 and the frame rate of the video source can vary. In some implementations, frames can be stored in buffer 900 (and subsequently processed) at a lower resolution to reduce processing overhead.

Figure 10:
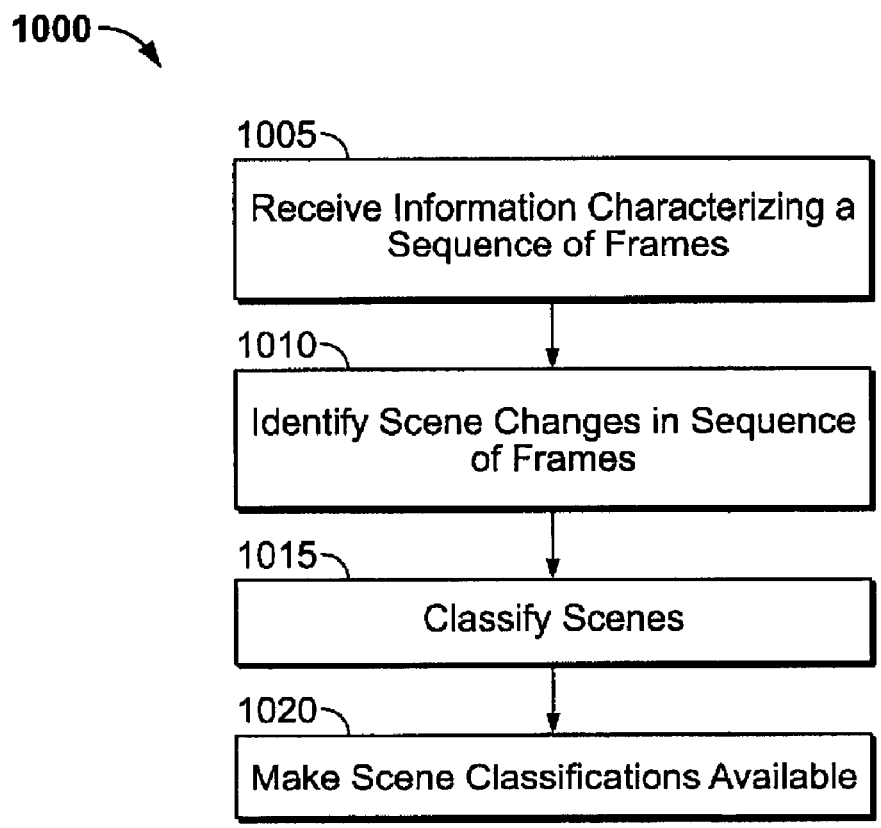
FIG. 10 is a flowchart of an example of a process for generating scene classifications.

FIG. 10 is a flowchart of a process 1000 for generating scene classifications. Process 1000 can be performed by one or more data processing devices. For example, process 1000 can be performed by decision module 110 in systems 100, 500, 700, 800 (FIGS. 1, 5, 7, 8) using a data storage device such as buffer 900 (FIG. 9).

The system performing process 1000 can receive a collection of information characterizing a sequence of frames at 1005. In some implementations, the received information can include one or more of motion estimation information, luminance/chroma information, spatial information and/or mixtures thereof. For example, the received information can include one or more of information 120, 510, 710. The information can be received from a module, such as one or more of modules 105, 505, 705.

Based on the received information, the system performing process 1000 can identify scene changes within the sequence of frames at 1010. A scene change is a demarcation between an end of a first scene and a start of a second scene. As discussed above, a scene is a sequence of frames that share characteristic properties. At a scene change, a first set of these characteristic properties can transition to a second set of these characteristic properties.

Scene changes can thus be identified based on the correlation between one or more characteristics of a current frame and one or more characteristics of one or more reference frames. In some implementations, a lack of correlation can be determined based on a magnitude of a prediction error between a current frame and a motion-compensated prediction of the current frame.

The system performing process 1000 can classify the scenes at 1015. A scene can be classified based on one or more characteristics of the frames in a scene, as discussed further below.

The system performing process 1000 can make the scene classifications available at 1020. The scene classifications can include a name or other identifier of the different classes of scenes in a collection of video information as well as information describing the disposition of the scenes with the collection of video information. The disposition of the scenes can be described, e.g., by the sequence in which the scenes appear and/or a start and stop time for the sequences.

Scene Changes

Figure 11:
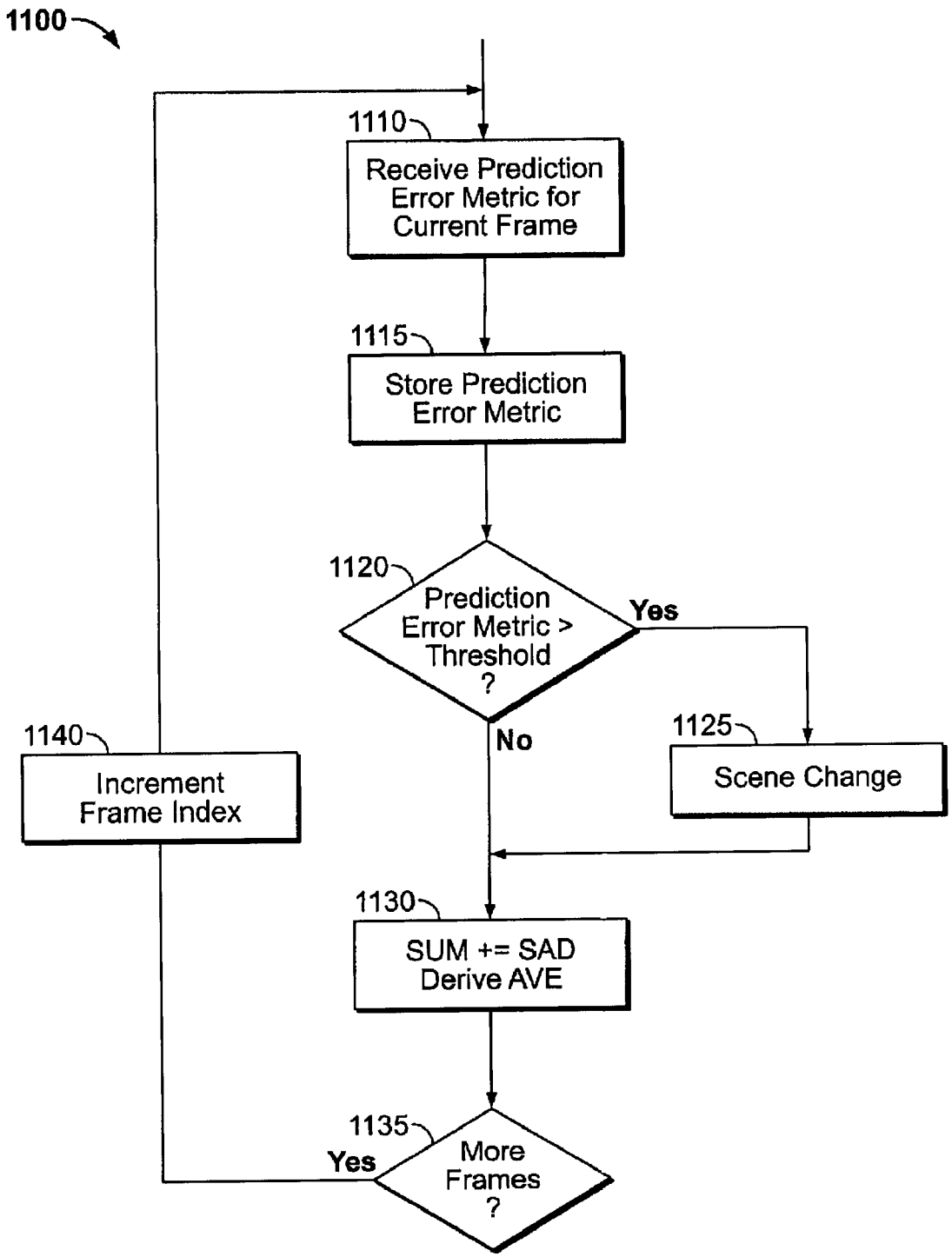
FIGS. 11, 12, 13 are flowcharts of examples of processes for identifying scene changes.

FIG. 11 is a flowchart of a process 100 for identifying scene changes. Process 1100 can be performed in isolation or process 1100 can be performed in conjunction with other activities. For example, process 1100 can be performed at 1010 by the system performing process 1000 (FIG. 10).

The system performing process 1100 can receive a prediction error metric for a current frame at 1110. The prediction error metric can embody how well the content of a current frame can be predicted from the content of one or more preceding or subsequent reference frames. The prediction error metric can be determined from the prediction error, which is the actual difference between the actual content of the original frame and the predicted content of that frame. The predicted content can include, e.g., the motion of one or more blocks, the texture of one or more blocks, a characterization of the texture of one or more blocks, the illumination and/or chroma of one or more blocks, a characterization of the illumination and/or chroma of one or more blocks, and the like. For example, the received prediction error metric can be the mean absolute difference MAD determined using one or more of calculations 300, 400 (FIGS. 3, 4). As another example, the received prediction error metric can be the sum of absolute differences (SAD) between a motion predicted frame and an actual frame.

The system performing process 100 can store the prediction error metric for the current frame at 1115. The stored prediction error metric for the current frame can be used in subsequent processing for identifying scene changes. For example, the SAD calculated for different frames n, n+1 from the same preceding frame can be used, e.g., to identify a frame that includes a flash, as discussed further below.

The system performing process 1100 can determine if the prediction error metric for the current frame exceeds a threshold at 1120. In some implementations, the threshold is twice the average prediction error metric for a sequence of frames. In some implementations, the sequence of frames for which the average prediction error metric is determined can exclude frames that are not correlated with the current frame. For example, frames that are identified as including flashes can be excluded from determinations of the average prediction error metric, as discussed further below. As another example, frames classified as belonging to a cross fade or belonging to a scene with significantly different spatial (e.g., texture) characteristics can be excluded.

An average (or a sum) of the block-level sum of absolute differences $SAD^m(n)$ can be calculated as the sum of the block-level SAD errors when blocks in frame n are predicted from blocks in frame m. If the first frame in the image sequence is indexed with an index number i=0, then the current frame has index number i=k. The average value of the SAD for the sequence of all frames that have previously been input is given by Equation 2.

$$SAD_{ave} = \frac{1}{k}\sum_{i=0}^{k} SAD^{i-1}(i) \qquad \text{Equation 2}$$

In some implementations, the threshold is twice the average SAD for previous 20 frames in the sequence of frames in a sliding decision window 910 of $n_{dec.w.}$ frames in buffer 900 (FIG. 9). The determination that the prediction error metric for the current frame exceeds such a threshold can be expressed as Equation 3.

$$SAD^{j-1}(j) > 2 \times SAD_{ave}$$

$$\text{where } j \in [m - d_{off} - n_{dec.w.} + 1, m - d_{off}] \qquad \text{Equation 3}$$

If the system performing process 1100 determines that the prediction error metric for the current frame exceeds the threshold, then the system can classify the current frame as a scene change at 1125. The current frame can be classified as a scene change by, e.g., adding a flag or other marker to the current frame in a collection of video information and/or establishing a separate data structure that identifies the scene change frame by frame number, time, and/or other identifying characteristic. The classification can be made available to a human user or other collection of data processing activities.

If the system performing process 1100 determines that prediction error metric for the current frame does not exceed the threshold, then the system can proceed to the next frame through block 1130.

The system performing process 1100 can also determine if there are additional frames for which a prediction error metric is available at 1135. For example, the system can determine if there are additional frames in a sliding decision window 910 of buffer 900 (FIG. 9). If the system performing process 1100 determines that there are additional frames for which a prediction error metric is available, then the system performing process 1100 can increment a frame index at 1140. Incrementing the frame index changes the current frame so that the system can return to 1110 and receive the prediction error metric for the (different) current frame.

Figure 12:
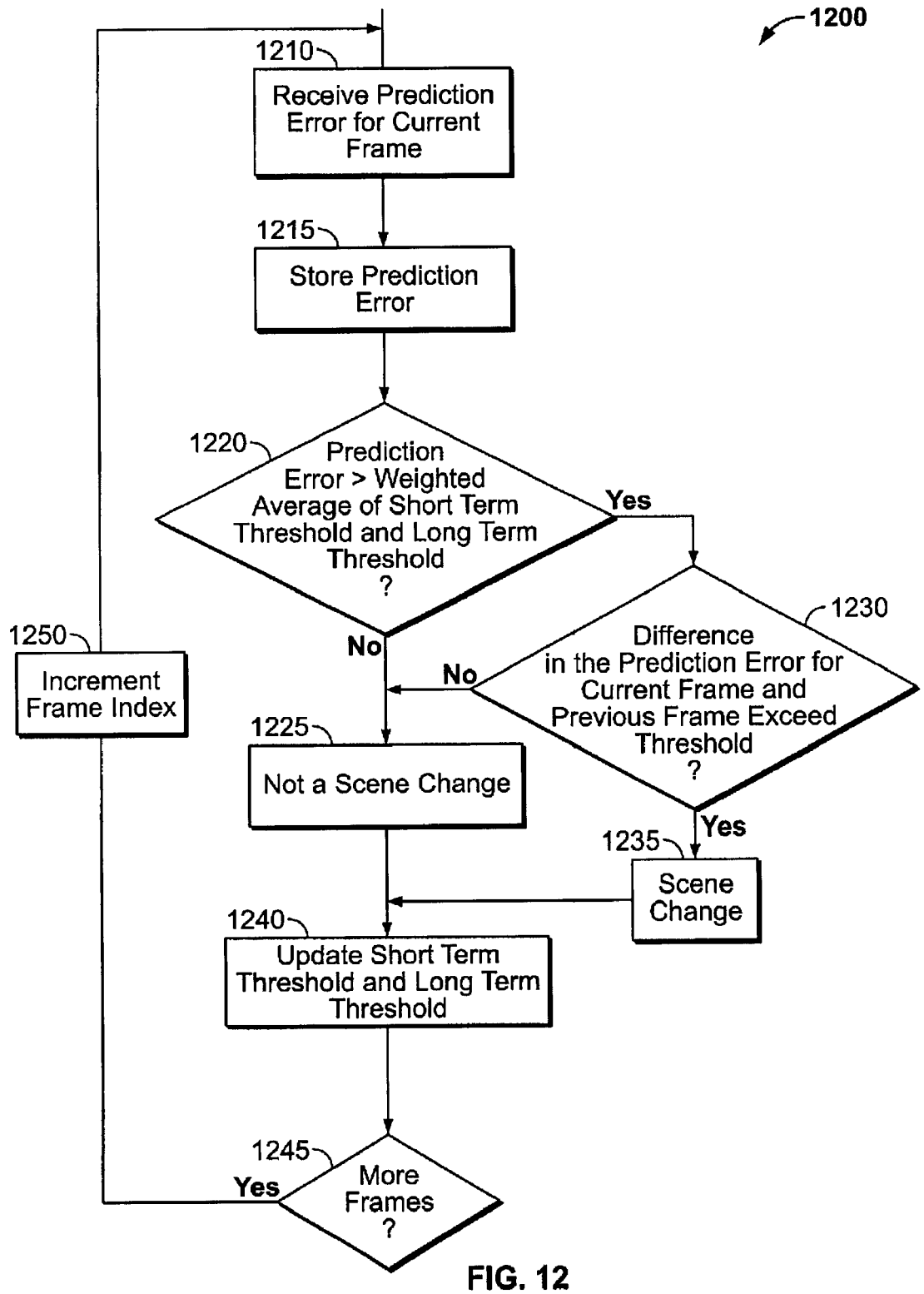

FIG. 12 is a flowchart of another process 1200 for identifying scene changes. Process 1200 can be performed in isolation or process 1200 can be performed in conjunction with other activities. For example, process 1200 can be performed at 1010 by the system performing process 1000 (FIG. 10).

The system performing process 1200 can receive a prediction error metric for a current frame at 1210 and store the prediction error metric for the current frame at 1215. The system performing process 1200 can determine if the prediction error metric for the current frame exceeds a weighted average of a short term threshold and a long term threshold at 1220. A short term threshold is a threshold that is based on the characteristics of a relatively small number of frames. A long term threshold is a threshold that is based on the characteristics of a relatively large number of frames. For example, a short term threshold can be based on the average prediction error metric for 60 preceding frames, whereas a long term threshold can be based on the average prediction error metric for 200 preceding frames.

In one implementation, the prediction error metric on which the short term and long term threshold are based is the sum of absolute differences (SAD) between a motion predicted frame and an actual frame. A frame can be classified as a scene change if the absolute difference of the SAD for the current and the previous frame is greater than a weighted average of the average SAD over a relatively large number of reference frames and the average SAD over a relatively small number of reference frames, as given by:

$$|SAD^{j-1}(j)-SAD^{j-2}(j-1)|>(\alpha \times SAD_{ave}^{long\text{-}term}+\beta \times SAD_{ave}^{short\text{-}term}) \quad \text{Equation 3.}$$

The condition expressed in Equation 3 uses a threshold that is based on both the short and long term average SAD thresholds. In some implementations, the short term average SAD threshold can be calculated based on a collection of SAD information that characterizes frames in sliding decision window 910 of buffer 900 (FIG. 9) and can be given by:

$$SAD_{ave}^{short\text{-}term} = \sum_{i=j-n_{ref}+1}^{j} SAD^{j-1}(j) \quad \text{Equation 4}$$

In some implementations, the long-term average SAD threshold can be the average of the SAD for all previously processed frames and can be given by:

$$SAD_{ave}^{long\text{-}term} = \sum_{i=0}^{j} SAD^{j-1}(j). \quad \text{Equation 5}$$

In some implementations, frames other than immediately preceding reference frames can be used. For example, the $SAD^{i-1}(i+1)$ prediction error metric or any $SAD^{-m}(i+n)$ prediction error metric (where $m \geq 1$ and $n \geq 1$) can be used to classify frames in different scenes. If these prediction error metrics are large compared to SAD errors where and $n \geq m$ and $n \leq 0$, then frame i is more likely to be a scene change.

If the system performing process 1200 determines that the prediction error metric for the current frame does not exceed the weighted average of a short term threshold and a long term threshold, then the system can indicate that a scene change is not present in the current frame at 1225. The system can indicate that a scene change is not present affirmatively (e.g., by associating a flag or other marker with the current frame) or by omission (e.g., by failing to add the current frame to a collection of frames that include scene changes or by omitting to mark the current frame with a flag or other marker indicative of a scene change). The indication can be made available to a human user or other collection of data processing activities.

If the system performing process 1200 determines that the prediction error metric for the current frame does exceed the weighted average, then the system can determine if the difference in the prediction error metrics of the current frame and a previous frame exceeds a predetermined threshold at 1230. The prediction error metrics can be the sum of the block-level absolute differences (SAD) between a motion predicted frame and the reference frame used for prediction. For example, in some implementations, the difference in the prediction error metrics on which the determination is based is given by:

$$|SAD^{j-1}(j)-SAD^{j-2}(j-1)|>T_{min} \quad \text{Equation 6}$$

In one implementation, $\alpha=0.5$, $\beta=0.5$ and $T_{min}=20$. Such a difference in prediction error metrics (as expressed in Equation 4) can detect false positives in very low activity content.

If the system performing process 1200 determines that the difference in the prediction error metrics of the current frame and a previous frame exceeds a predetermined threshold, then the system can indicate that a scene change is present at 1235. The system can indicate that a scene change is present by, e.g., associating a flag or other marker with the current frame or by adding the current frame to a collection of frames that includes scene changes. If the system performing process 1200 determines that the difference in the prediction error metrics of the current frame and a previous frame does not exceed a predetermined threshold, then the system can indicate that a scene change is not present in the current frame at 1225. In either case, the indication can be made available to a human user or other collection of data processing activities.

Regardless of whether a scene change is indicated as present or not in a current frame, the system performing process 1200 can update the long term and the short term threshold to account for the characteristics of the current frame. For example, when the long term and the short term threshold are based on an average prediction error metric for a certain number of preceding reference frames, the long term and the short term threshold can be updated to account for the prediction error metric of the current frame.

The system performing process 1200 can also determine if there are additional frames for which a prediction error metric is available at 1245. For example, the system can determine if there are additional frames in a sliding decision window 910 of buffer 900 (FIG. 9). If the system performing process 1200 determines that there are additional frames for which a prediction error metric is available, then the system performing process 1200 can increment a frame index at 1250. Incrementing the frame index changes the current frame so that the system can return to 1210 and receive the prediction error metric for the (different) current frame.

In some implementations, additional characteristics of the video information can be used for identifying scene changes. For example, the characteristics of a current frame can be compared to one or more thresholds to identify a scene changes. In some implementations, these thresholds are based on the characteristics of other frames in a sequence of frames. One or more of the following characteristics can be used:

1. The local (per block) and/or global (per frame) average DC value of luminance and chroma components.
2. The local variance of each block and/or the global variance of the entire source frame.
3. The variance of the motion-compensated prediction error metric. A frame belonging to a scene change can have different prediction error variance compared to previous frames belonging to a different scene.
4. The magnitudes of one or more dominant motion vectors, the average motion vector, and the variance of the motion vectors for a reference frame. In general, motion prediction cannot accurately predict a frame from other frames that belong to a different scene. Instead, abnormally large, spatially uncorrelated, spatially inconsistent, temporally uncorrelated, and temporally inconsistent motion vectors can be used to identify scene changes.
5. Illumination change parameters that are used to predict illumination in a current frame based on illumination in one or more reference frames. High volatility in such illumination change parameters, especially within a small region, can be used to identify scene changes.

In some implementations, the identification of a scene change by a system performing one or more of processes 1100, 1200 (FIGS. 11, 12) can be double-checked to avoid false positive identification of scene changes. For example, in some implementations, if frame i has been identified as a scene change, the following determination can be made:

$$|SAD^{i-1}(i) - SAD^{i-2}(i)| > 0.25 \times SAD^{i-1}(i) \qquad \text{Equation 7}$$

If the absolute difference of the SAD prediction error metric from reference frame i−1 and from reference frame i−2 is larger than one fourth of the SAD prediction error metric from reference frame i−1, then the frame need not be considered to be a scene change. Such double checking can help prevent temporary spikes in the SAD prediction error metric (e.g., abrupt movements or object occlusions) from being misclassified as scene changes.

In some implementations, double checking can be performed to exclude rapid changes in illumination from being classified as scene changes. Such changes in illumination occur, e.g., when one or more frames of video information includes a flash.

In excluding rapid changes in illumination, a system can evaluate one or more prediction error metrics of one or more frames preceding a suspected illumination change and frames following a suspected illumination change. For example, the $SAD^{i-1}(i+1)$ prediction error metric or another $SAD^{i-m}(i+n)$ prediction error metric, where $m \geq 1$ and $n \geq 1$, can be evaluated. If the evaluated prediction error metric is relatively small compared to the SAD prediction error metrics of preceding frames, which can be weighted by one or more factors as appropriate, this can be attributed to a change in illumination rather than a scene change. In contrast, if the SAD prediction error metrics increase for increasing n, then the prediction error metrics can be attributed to a scene change.

In some implementations, scene changes can be implicitly identified based on identifications and/or classifications of scenes in a sequence of frames. For example, fade-ins and cross-fades often precede a scene change. The detection of a fade-in scene, a cross-fade scene, or another scene can be used to identify a scene change, as discussed further below.

Figure 13:
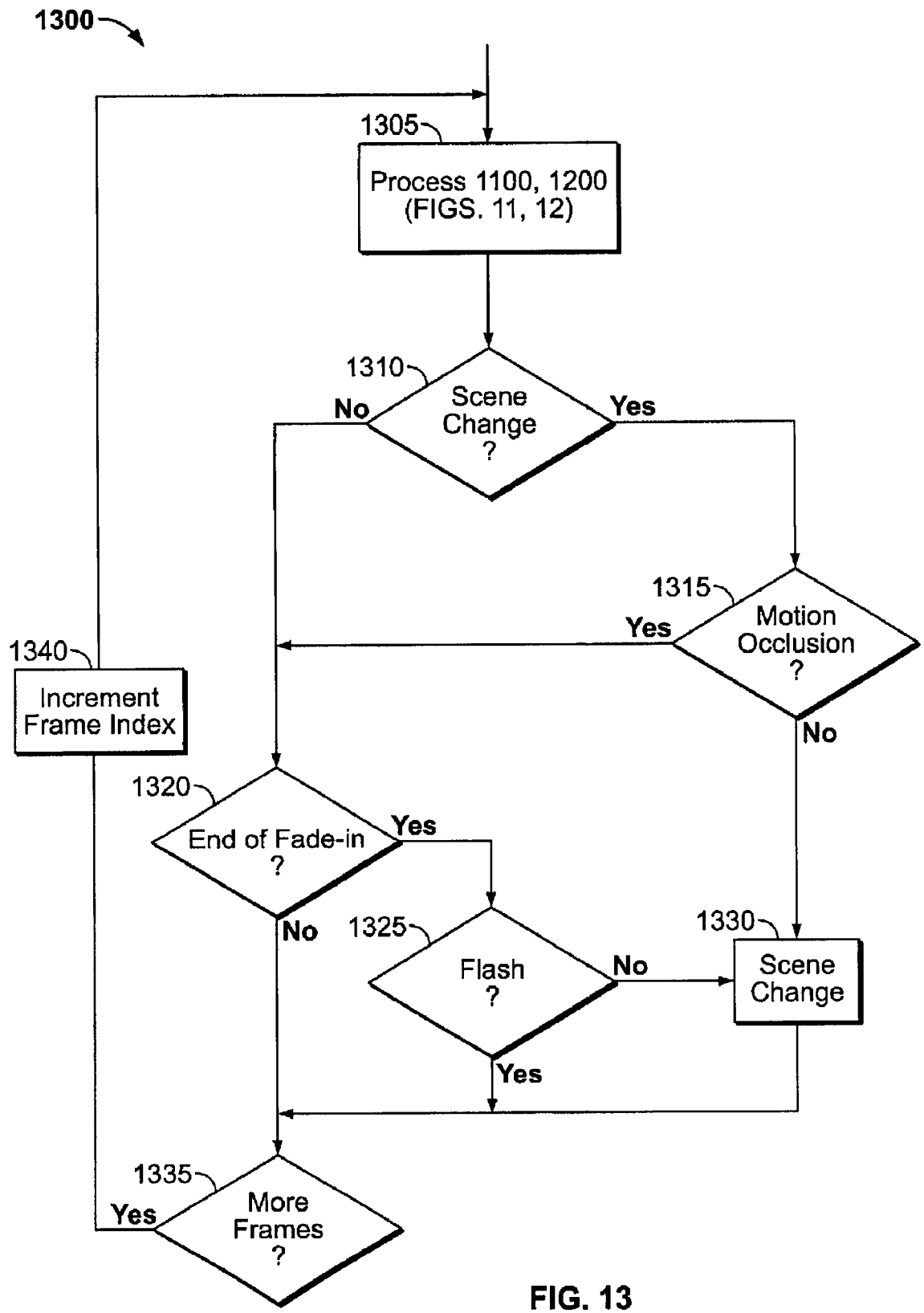

FIG. 13 is a flowchart of a process 1300 for identifying scene changes. Process 1300 can be performed in isolation or process 1300 can be performed in conjunction with other activities. For example, process 1300 can be performed at 1010 by the system performing process 1000 (FIG. 10). As another example, process 1300 can include one or more of processes 1100, 1200 (FIGS. 11, 12), as discussed further below.

The system performing process 1300 can perform one or more of processes 1100, 1200 (FIGS. 11, 12) at 1305. The system performing process 1300 can determine if the process performed at 1305 identifies that a current frame is a scene change at 1310.

If the system performing process 1300 identifies that the process performed at 1305 identifies that a current frame is a scene change, then the system performing process 1300 can determine whether motion in a current frame is occluded at 1315. Motion occlusion occurs when the motion of one or more blocks is concealed from view in a sequence of video information. For example, motion occlusion can occur when a moving block passes in front of or behind an immobile block or when the paths of two blocks with different motion vectors cross. Motion occlusion can be identified, e.g., by examining whether certain regions within a frame are characterized by considerably larger prediction error compared to others.

If the system performing process 1300 identifies that the process performed at 1305 does not classify a current frame as a scene change, then the system performing process 1300 can determine whether current frame occurs at the end of a fade-in at 1320. Fade scenes are characterized by relatively large changes in the average luminance of a frame when compared to preceding frames. These changes in average luminance are not instantaneous, as in a scene change. Rather, these changes in average luminance are gradual. Fade-ins occur at the beginning of a scene and are generally associated with gradual increases in average luminance. Fade-outs occur at the end of a scene and are generally associated with gradual decreases in average luminance. Fade-ins can be identified using process 1400 (FIG. 14), as discussed further below.

If the system performing process 1300 determines at 1320 that the current frame does occur at the end of a fade-in, then the system can determine whether the current frame includes a flash or other rapid change in illumination at 1325. Rapid changes in illumination such as flashes can be identified using the double checking approach discussed above.

If 1) the system performing process 1300 determines at 1325 that the current frame does not includes a rapid change in illumination or if 2) the system performing process 1300 determines at 1315 that motion in a current frame is not occluded, then the system performing process 1300 can indicate that a scene change is present at 1330. The system can indicate that a scene change is present by, e.g., associating a flag or other marker with the current frame or by adding the current frame to a collection of frames that include scene changes. The indication can be made available to a human user or other collection of data processing activities.

If 1) the system performing process 1300 determines at 1320 that the current frame does not occur at the end of a fade-in, or if 2) the system performing process 1300 determines at 1325 that the current frame does include a rapid change in illumination, or if 3) the system performing process 1300 has identified that a scene change is present at 1330, then the system performing process 1300 can determine if there are additional frames for which a prediction error metric is available at 1335. For example, the system can determine if there are additional frames in buffer 900 (FIG. 9). If the system performing process 1300 determines that there are additional frames for which a prediction error metric is available, then the system performing process 1300 can increment a frame index at 1340. Incrementing the frame index changes the current frame so that the system can return to 1305.

Fade Scenes

As discussed above, fade scenes are characterized by relatively large, gradual changes in the average luminance of a current frame when compared to preceding frames. In addition to classification as fade-ins and fade-outs, fade scenes can also be classified as fades to/from black, fades to/from white, and fades to/from a solid color. Also, cross-fades are fading transitions from one scene to the next scene.

A fade scene detector that is spread out temporally can be used to capture the slow transitions of relatively long duration fades. In some implementations, such detectors can process future frames to capture slow transitions. Such a processing can introduce delays into the identification of fade scenes. In some implementations, a fade scene detector can be applied across a small picture window. A frame decision offset $d_{off} > 1$ for the sliding-window frame buffer can help address such delays. The weighting coefficients can be more important than the offset for identifying fade scenes.

In general, fade scene detection can include the following:
- detection using luminance component analysis. For a number of N consecutive pictures, the average (DC) of the luminance component has to either increase or decrease. The change in the luminance DC has to exceed a threshold. If the absolute value of the DC difference is calculated then this detector cannot differentiate between fade-ins, fade-outs, and cross-fades. This detector is better suited for fade-in and fade-out detection.
- illumination change parameters calculated on a block basis using a MEMC framework module. Illumination change parameters can include a weight and an offset. The M dominant parameter pairs can be extracted from the picture through a two-dimensional histogram of the weighting parameters. Such weight-offset pairs can then be checked to determine if they satisfy certain criteria for the detection of a fade. In some implementations, bi-predictive motion estimation can improve the reliability of the detection of such transitions.

Fade scene detection can be implemented using weighting prediction parameters that reference an immediately preceding frame (n−1) or some other preceding frame (e.g., n−2). The same is true also for subsequent frames. For example, assume that a current frame n is within a fade-in. Weighting parameters that were obtained using past references n−k, where $k \geq 1$, either consistently increase or consistently decrease in the same prediction direction. The same is true for weighting parameters obtained using future references n+k, where $k \geq 1$. This is also true for fade-outs and cross-fades. In particular, for fade-ins, the weighting parameters decrease for references that are further in the past and increase for references that are further in the future. For fade-outs, the weighting parameters increase for references that are further in the past, and decrease for references that are further in the future. For cross-fades, the weighting parameters increase as for references that are further in the past and in the future.

In some implementations, the detection of fade-ins and fade-outs can also be based on spatial variance. For example, a fade-out can be detected based on a sequence of frames with decreasing source variance. As another example, a fade-in can be detected based on a sequence of frames with increasing source variance.

In some implementations, the significance of the illumination changes used to detect fades can be determined based on the difference between the motion-compensated MAD prediction error with and without weighted prediction.

Figure 14:
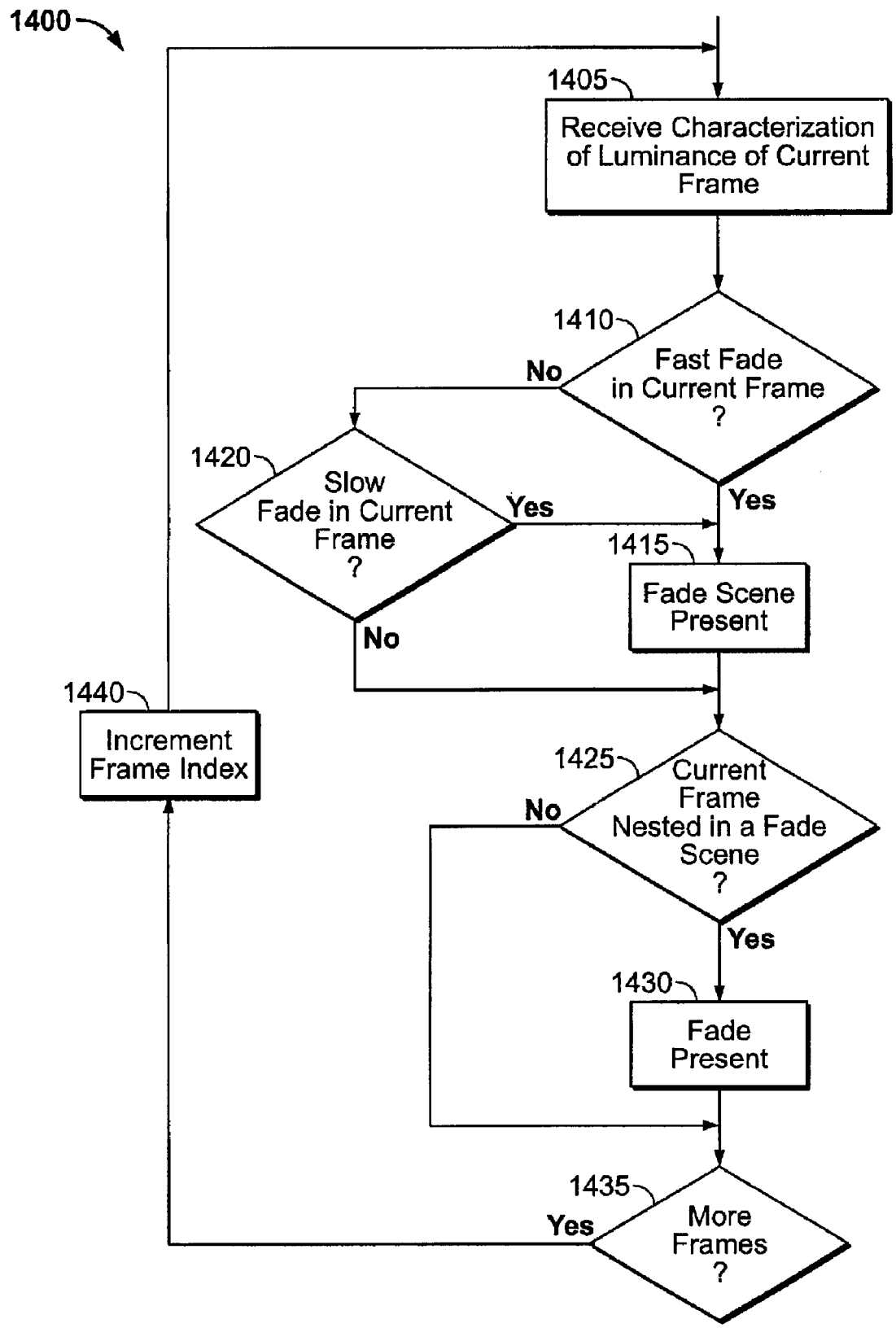
FIG. 14 is a flowchart of an example of a process for classifying fade scenes.

FIG. 14 is a flowchart of a process 1400 for classifying fade scenes. Process 1400 can be performed in isolation or process 1400 can be performed in conjunction with other activities. For example, process 1400 can be performed at 1015 by the system performing process 1000 (FIG. 10).

The system performing process 1400 can receive a characterization of luminance in a current frame at 1405. The characterization of luminance in the current frame can be received along with characterizations of luminance in preceding and/or subsequent frames. For example, characterizations of luminance can be accessed in buffer 900 (FIG. 9).

The system performing process 1400 can determine if the current frame is part of a fast fade at 1410. A fast fade is a fade where the average luminance of a sequence of frames changes relatively quickly. In some implementations, fast fades can be identified based on the nature of the changes in luminance over a sequence of frames.

One example of such a change in luminance that can be used to determine if the current frame is part of a fast fade requires that the change in luminance for a current frame and the change in luminance for a subsequent frame exceed a threshold value and have the same sign. For example, assuming 8 bit content, let $DC_{luma}(i)$ denote the average DC value of the luminance component for a frame i and let the terms $t_0^{fast}-1$, $t_1^{fast}-1$, $t_{0,A}^{slow}=0$, $t_{1,A}^{slow}=0$, $t_{0,B}^{slow}=0$ and $t_{1,B}^{slow}=0$ denote six thresholds. The change in DC luminance $\Delta DC_{luma}$ of frame m is the DC luminance of frame m minus the DC luminance of frame m−1. A fast fade can be identified if:

1. $|DC_{luma}(i)-DC_{luma}(i-1)|>t_1^{fast}$;      Equation 8

2. $|DC_{luma}(i+1)-DC_{luma}(i)|>t_1^{fast}$; and      Equation 9

3. $(DC_{luma}(i)-DC_{luma}(i-1))\times(DC_{luma}(i+1)-DC_{luma}(i)) \geq t_0^{fast}$.      Equation 10

Equation 10 ensures that the changes in luminance for frames m and m−1 are in the same direction (i.e., both frames have increased luminance or decreased luminance).

Another example of a change in luminance that can be used to determine if the current frame is part of a fast fade requires that the change in DC luminance for the current frame and a preceding frame exceed a threshold value and have the same sign. For example, a fast fade can also be identified if:

1. $|DC_{luma}(i)-DC_{luma}(i-1)|>t_1^{fast}$;      Equation 11

2. $|DC_{luma}(i-1)-DC_{luma}(i-2)|>t_1^{fast}$; and      Equation 12

3. $(DC_{luma}(i)-DC_{luma}(i-1))\times(DC_{luma}(i-1)-DC_{luma}(i-2)) \geq t_0^{fast}$.      Equation 13

Equation 13 ensures that the changes in luminance for frames m and m−1 are in the same direction (i.e., both frames have increased luminance or decreased luminance). In some implementations, a system can determine that the current frame is part of a fast fade if either the set of Equations 8, 9, 10 or the set of Equations 11, 12, 13 is satisfied.

If the system performing process 1400 determines at 1410 that the current frame is part of a fast fade, then the system can indicate that a fade scene is present at 1415. The system can indicate that a fade scene is present by, e.g., associating a flag or other marker with the current frame or by adding an identifier of the current frame to a collection of frame identifiers of frames in fade scenes. The indication can be made available to a human user or other collection of data processing activities.

If the system performing process 1400 determines at 1410 that the current frame is not part of a fast fade, then the system can determine if the current frame is instead part of a slow fade at 1420. A slow fade is a fade where the average luminance of a sequence of frames changes relatively slowly. In some implementations, slow fades can be identified based on the nature of the changes in luminance over a sequence of frames.

One example of such a change in luminance that can be used to determine if the current frame is part of a slow fade requires that the changes in luminance over three or more successive frames exceed a threshold value and have the same sign. For example, the successive frames can be current frame n and the frames n+1, n+2. In this case, the conditions for a positive determination that the current frame is part of a slow fade are given by:

1. $|DC_{luma}(i) - DC_{luma}(i-1)| > t_{1,A}^{slow}$;  Equation 14

2. $|DC_{luma}(i+1) - DC_{luma}(i)| > t_{1,A}^{slow}$;  Equation 15

3. $|DC_{luma}(i+2) - DC_{luma}(i)| > t_{1,A}^{slow}$;  Equation 16

4. $(DC_{luma}(i) - DC_{luma}(i-1)) \times (DC_{luma}(i+1) - DC_{luma}(i)) \geq t_{0,A}^{slow}$; and  Equation 17

5. $(DC_{luma}(i+2) - DC_{luma}(i+1)) \times (DC_{luma}(i+1) - DC_{luma}(i)) \geq t_{0,A}^{slow}$.  Equation 18

Equations 17 and 18 ensure that the changes in luminance for the frames n, n+1, n+2 are in the same direction (i.e., all three frames have increasing luminance or decreasing luminance).

As another example, the successive frames can be current frame n and the frames n−1, n−2. In this case, the conditions for a positive determination that the current frame is part of a slow fade are given by:

1. $|DC_{luma}(i) - DC_{luma}(i-1)| > t_{1,B}^{slow}$;  Equation 19

2. $|DC_{luma}(i-1) - DC_{luma}(i-2)| > t_{1,B}^{slow}$;  Equation 20

3. $|DC_{luma}(i-2) - DC_{luma}(i-3)| > t_{1,B}^{slow}$;  Equation 21

4. $(DC_{luma}(i) - DC_{luma}(i-1)) \times (DC_{luma}(i-1) - DC_{luma}(i-2)) \geq t_{0,B}^{slow}$; and  Equation 22

5. $(DC_{luma}(i-1) - DC_{luma}(i-2)) \times (DC_{luma}(i-2) - DC_{luma}(e-3)) \geq t_{0,B}^{slow}$.  Equation 23

Equations 22 and 23 ensure that the changes in luminance for the frames n, n−1, n−2 are in the same direction (i.e., all three frames have increasing luminance or decreasing luminance).

If the system performing process 1400 determines at 1420 that the current frame is part of a slow fade, then the system can indicate that a fade scene is present at 1415 and subsequently proceeds to double-check and determine if a fade is present at 1425. In some implementations, if the system determines at 1420 that the current frame is not part of a slow fade, then the system can double-check to determine if a fade is present at 1425.

The system performing process 1400 can determine if the current frame is nested in a fade scene at 1425. The determination can be based on the presence of a fade in both an immediately preceding frame and an immediately following frame. For example, frame i can be determined to include a fade if a fade has been identified in both the immediately preceding frame i−1 and the immediately following frame i+1.

Whether or not the double-check at 1425 determines if a fade is present, the system performing process 1400 can determine if there are additional frames for which a luminance information is available at 1435. For example, the system can determine if there are additional frames in buffer 900 (FIG. 9). If the system performing process 1400 determines that there are additional frames for which luminance information is available, then the system performing process 1400 can increment a frame index at 1440. Incrementing the frame index changes the current frame so that the system can return to 1405.

Figure 15:
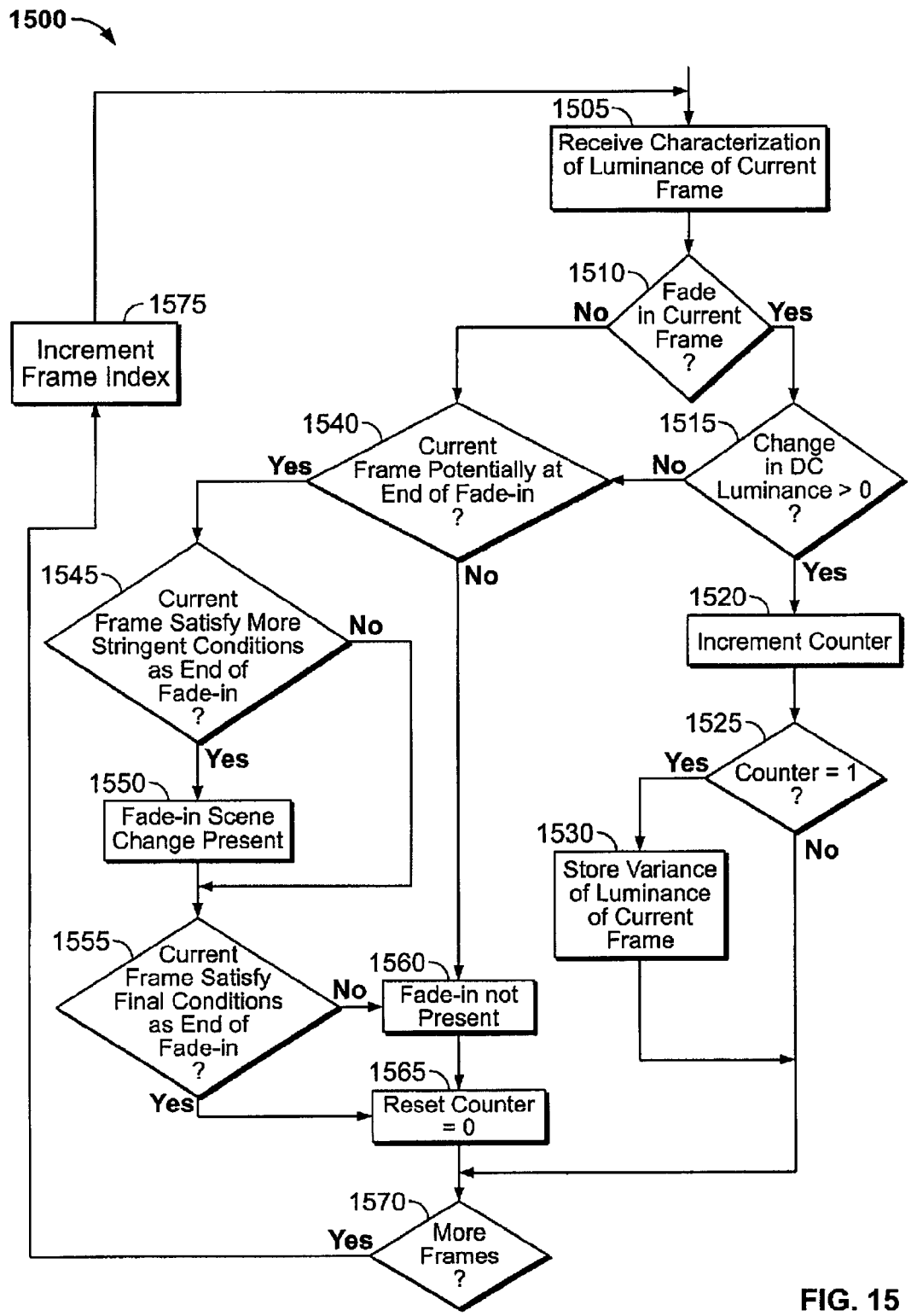
FIG. 15 is a flowchart of an example of a process for identifying the end of a fade-in transition.

In some implementations, a system for classifying fade scenes can also classify fade scenes as fade-ins, fade-outs, and/or cross-fades. For example, FIG. 15 is a flowchart of a process 1500 for identifying the end of a fade-in transition. Process 1500 can be performed in isolation or process 1500 can be performed in conjunction with other activities. For example, process 1500 can include the performance of process 1400 at 1510 (FIG. 14), as discussed further below.

The system performing process 1500 can receive a characterization of luminance in a current frame at 1505. The characterization of luminance in the current frame can be received along with characterizations of luminance in preceding and/or subsequent frames. For example, characterizations of luminance can be accessed in a buffer 900 (FIG. 9).

The system performing process 1500 can determine if the current frame is part of a fade at 1510. For example, the system can perform process 1400 (FIG. 14) to determine if the current frame is part of a fade. As another example, the system can check a flag or collection of information that identifies fades to determine if current frame is part of a fade.

If the system performing process 1500 determines that the current frame is part of a fade at 1510, then the system can determine if the change in DC luminance for the current frame is greater than zero at 1515. The direction of change in DC luminance for the current frame (i.e., increasing or decreasing DC luminance) distinguishes between a fade-in and a fade-out.

If the system performing process 1500 determines at 1515 that the change in DC luminance for the current frame is greater than zero, then the system can increment a counter $C_{fade-in}$ at 1520 and determine if this counter, which is initialized at zero, is now equal to one at 1525. In other words, the system determines if this is the first time that the counter has been incremented. If the system performing process 1500 determines at 1525 that the counter $C_{fade-in}$ is equal to one and hence has just been incremented for the first time, then the system can store a value representing the variance of the luminance of the current frame at 1530. This has the effect of storing the variance of the luminance component of an initial frame of a fade-in $VAR_{fade-in}^{start} = var(i)$, where var(i) is the variance of the luminance component of the current frame i. The system can then proceed to determine if there are additional frames for which luminance information is available at 1570, as discussed further below.

If 1) the system performing process 1500 determines at 1510 that the current frame is not part of a fade or if 2) the system performing process 1500 determines at 1515 that that the change in DC luminance for the current frame is not greater than zero, then the system performing process 1500 can determine if the current frame is potentially at the end of a fade-in at 1540. In one implementation, the system can determine if the current frame is potentially at the end of a fade-in based on the counter $C_{fade-in}$. For example, if the counter $C_{fade-in}$ is greater than a threshold number (e.g., three) and the current frame index is greater than the counter $C_{fade-in}$, then the system can determine that the current frame is potentially at the end of a fade-in.

If the system performing process 1500 does determine that the current frame is potentially at the end of a fade-in at 1540, then the system can determine if the current frame satisfies one or more stringent conditions for qualifying as the end of a fade-in at 1545. One example of a more stringent condition requires that the magnitude of the change in DC luminance between an initial frame in the fade-in and the current frame that is potentially at the end of the fade-in exceed a threshold value. For example, in some implementations, the difference of the DC luminance for the current frame i minus the DC luminance for frame i–$C_{fade-in}$ is required to be greater than 12*2^(bit_depth–8), where bit_depth is the current bit_depth of the content. In some implementations, bit_depth can equal 8. Hereinafter, unless otherwise noted, numerical thresholds correspond to 8-bit input data bit-depth.

Another example of a more stringent condition requires that the variance of the luminance of the current frame exceeds the variance of the luminance of an initial frame in the fade-in. For example, in some implementations, the variance of the luminance of the current frame is required to be greater than 1.5 times the variance of the initial frame in the fade-in.

Another example of a more stringent condition requires that none of a collection of sequentially preceding frames be classified as a camera pan. For example, process 1600 (FIG. 16) can be used to identify if the sequentially preceding frames are part of a camera pan scene. For example, in some implementations, none of the preceding three frames can be classified as part of a camera pan if the current frame is to qualify as an end of a fade-in.

Another example of a more stringent condition requires that none of a collection of sequentially subsequent frame be classified as a scene change. The classification of frames as a scene change can be performed using, e.g., one or more of processes 1100, 1200, 1300 (FIGS. 11, 12, 13) discussed above. For example, in some implementations, none of the subsequent 12 frames can be classified as a scene change if the current frame is to qualify as an end of a fade-in.

In some implementations, a determination that the current frame qualifies as the end of a fade-in requires that all four of these more stringent conditions be satisfied.

If the system performing process 1500 does determine that the current frame satisfies the stringent condition(s) and qualifies as an end of a fade-in at 1545, then the system can indicate that a fade-in scene change is present at 1550. Depending on the notation used by the system, the system can indicate that the fade-in scene change is present in the current frame or in the frame which immediately precedes the current frame. In either case, the system can indicate that a fade-in scene change is present by, e.g., associating a flag or other marker with the immediately preceding frame or by adding an identifier to a collection of identifiers of frames that include fade-in scene changes. The indication can be made available to a human user or to another collection of data processing activities.

Regardless of whether the current frame has qualified or not as a fade-in scene change, the system performing process 1500 can determine if the current frame satisfies one or more final conditions for qualifying as the end of a fade-in at 1555. One example of a final condition requires that the DC luminance of the initial frame in the fade-in be less than a threshold value. In some implementations, this threshold value is 50.

Another example of a final condition requires that the difference between DC luminance of the final and initial frames in the fade-in be larger than a threshold value. In some implementations, this threshold value is 12.

Another example of a final condition requires that the variance of the luminance of the final frame in the fade in be more than some multiple of the variance of the first frame in the fade-in. In some implementations, this multiple of the variance is 1.5.

In some implementations, a determination that the current frame satisfies the final conditions for qualifying as the end of a fade-in requires that all three of these final conditions be satisfied.

If the system performing process 1500 determines that the current frame is not potentially at the end of a fade-in at 1540, or fails to satisfy the more stringent condition(s) at 1555 (and hence in either case does not qualify as an end of a fade-in), then the system can indicate that the current frame is not part of a fade-in at 1560. The system can indicate that the current frame is not part of a fade-in by, e.g., adding a flag or other marker to the current frame in a collection of video information and/or excluding an identifier of the current frame from data structures that identify fade-ins. In cases where the system has identified that a fade-in scene change is present at 1550, then any such identification can be erased or reversed. The indication can be made available to a human user or other collection of data processing activities.

In some implementations, the system can also indicate that the preceding $C_{fade-in}$–1 frames are not part of a fade-in at 1560. For example, flags associated with the preceding frames that previously indicated that the preceding frames were part of a fade-in can be switched to clarify that these frames are not part of a fade-in.

If the system performing process 1500 determines that the current frame does satisfy final conditions as an end of a fade-in at 1555, then the system can reset the counter $C_{fade-in}$ to zero at 1565. The system performing process 1500 can also determine if there are additional frames for which luminance information is available at 1570. For example, the system can determine if there are additional frames in buffer 900 (FIG. 9). If the system performing process 1500 determines that there are additional frames for which luminance information is available, then the system performing process 1500 can increment a frame index at 1575. Incrementing the frame index changes the current frame so that the system can return to 1505.

In some implementations, a system for classifying fade scenes as fade-outs can operate using a process that resembles process 1500 (FIG. 15). One exception is the identification of fade scenes as fade-outs can require that the change in DC luminance for the current frame be less than zero. Thus, rather than determining if the change in DC luminance for the current frame is greater than zero (as done at 1515 in process 1500 (FIG. 15), a system for classifying fade scenes as fade-outs can determine if the change in DC luminance for the current frame is less than zero.

Another exception to the resemblance between the classification of fade scenes as fade-outs and the classification of scenes as fade-ins are the more stringent conditions for qualifying as a fade-out scene change. Rather than using the more stringent conditions applied at 1545 in process 1500 (FIG. 15), a system for classifying fade scenes as fade-outs can use other conditions.

For example, in some implementations, a system for classifying fade scenes as fade-outs can require that requires that the magnitude of the change in DC luminance between the current frame in a fade-out and an initial frame in the fade-out exceed a threshold value. For example, in some implementations, the difference of the DC luminance for frame i–$C_{fade-out}$ minus the DC luminance for the current frame i is required to be greater than 12*2^(bit_depth–8), where bit_depth is the current bit_depth of the content.

Another example of a more stringent condition requires that the variance of the luminance of the current frame be lower than the variance of the luminance of an initial frame in the fade-out. For example, in some implementations, the variance of the luminance of the current frame is required to be lower than 0.66 times the variance of the initial frame in the fade-out.

Another example of a more stringent condition requires that none of a collection of sequentially preceding frames be classified as part of a camera pan scene. For example, process 1600 (FIG. 16) can be used to identify if the sequentially preceding frames are part of a camera pan scene. For example, in some implementations, none of the preceding three frames can be classified as a camera pan if the current frame is to qualify as an end of a fade-out.

Another example of a more stringent condition requires that the difference between the SAD error prediction with consideration of illumination change parameters and the SAD error prediction without consideration of illumination change parameters be lower than a threshold value. Such SAD error predictions can be received from a MEMC module such as MEMC framework module 105 (FIG. 1) and stored in association with luminance information in a memory such as buffer 900 (FIG. 9). These illumination change parameters can be determined when attempting to predict luminance and/or chrominance from preceding reference frames.

In some implementations, a determination that the current frame satisfies the more stringent conditions for qualifying as a fade-out scene change requires that all four of these more stringent conditions be satisfied.

Another exception to the resemblance between the classification of fade scenes as fade-outs and the classification of scenes as fade-ins are the final conditions for qualifying as the end of a fade-out. Rather that using the final conditions applied at 1555 in process 1500 (FIG. 15), a system for classifying fade scenes as fade-outs can use other final conditions.

For example, in some implementations, a system for classifying fade scenes as fade-outs can require that the DC luminance of the initial frame in the fade-out be smaller than a threshold value. In some implementations, this threshold value is $50 * 2^{(bit\_depth-8)}$, where bit_depth is the current bit_depth of the content.

Another example of a final condition requires that the luminance DC difference in between the final and initial frames in the fade-out be less than a threshold value. In some implementations, this threshold value is $12 * 2^{(bit\_depth-8)}$.

Another example of a final condition requires that the variance of the luminance of the final frame be less than some multiple of the variance of the first frame in the fade-out. In some implementations, this multiple of the variance is 0.67.

In some implementations, a determination that the current frame satisfies the final conditions for qualifying as the end of a fade-out requires that all three of these final conditions be satisfied.

In some implementations, a system for classifying fade scenes as either fade-ins or fade-outs can also rely upon spatial information. For example, a fade-out can be identified based on at least in part on the presence of a sequence of frames with decreasing spatial variance, whereas a fade-in can be identified based on at least in part on the presence of a sequence of frames with increasing spatial variance.

In some implementations, both weighted prediction/illumination change parameters and prediction error metrics such as SAD can be used to identify fade scenes. For example, if a frame n+1 belongs to a fade, the weighted prediction parameters $WP''(n+1)$ which predict frame n+1 from reference frame n should be approximately inverse from the weighted prediction parameters $WP''^{+1}(n)$ which predict frame n from reference frame n+1. For example, if the dominant illumination scaling parameter from one direction is 0.2 then the dominant illumination scaling parameter from the other direction should be approximately 5.0. Identifications can also be based on similar observations for offset parameters Furthermore, the prediction error metrics such as SAD in the same prediction directions should be relatively close. The system can thus identify a fade scene by comparing a weighted prediction parameter for frame n referenced to a frame n+1 and the prediction error metric for that same motion vector with a weighted prediction parameter for frame n+1 referenced to frame n and the prediction error metric for that same weighted prediction parameter. If these weighted prediction parameters and prediction error metrics are not indicative of a fade, then the current frame can be excluded from being identified as a part of a fade.

Camera Pan Scenes

In general, camera pan scenes are characterized by the scanning of the field of view in a collection of video information. The field of view can be scanned horizontally, diagonally, or vertically. Panning refers to the rotation or other movement of a video camera that was traditionally used to scan the field of view. In general, camera pans occur over a relatively large number (e.g., more than 5-10) of sequential frames.

In some implementations, the identification of a camera pan scene can be based on one or more of the following characteristics of a collection of sequential frames. For example, a camera pan scene can be identified based on a collection of sequential frames being characterized by motion parameters with the same general direction and exceeding a threshold. Such motion parameters can be obtained through motion estimation techniques, such as those performed by a MEMC module such as MEMC framework module 105 (FIG. 1). In some implementations, other motion estimation techniques such as pixel-recursive algorithms, phase-correlation, and the like can be used.

As another example, a camera pan scene can be identified based on a collection of sequential frames being characterized by dominant motion parameters having the same general direction and exceeding a threshold. Dominant motion parameters can be obtained by analyzing the frequency distribution of motion parameters for multiple blocks in a sequence of frames. For example, dominant motion parameters can be obtained from a histogram of motion parameters. Such motion parameters can be obtained through motion estimation techniques.

As another example, a camera pan scene can be identified based on the motion relationship between the current frame and a set of other frames. Such a motion relationship can be derived using a single block, one or more block regions, or the entire frame. In particular, a camera pan scene can be identified if motion vectors associated with different reference pictures point in the same general direction with magnitudes that increase as temporal prediction distances (i.e., different in frame indices) increase. Reference pictures can either precede or follow the current picture and need not be immediately adjacent to the current picture. If both preceding and subsequent references pictures are used, the direction of motion can be accounted for.

As another example, a camera pan scene can be identified based on affine global parameters, which can be derived from translational motion parameters from multiple reference frames.

As another example, one or more of the methods for identifying camera pan scenes discussed above can be modified to account for the nature of a camera pan. In particular, during a camera pan, the motion of the camera gradually reveals new blocks that were previously outside the field of view. These new blocks can be excluded from use in identifying camera pan scenes. To identify those blocks, all motion vectors in a frame can be determined. The subset of the motion vectors associated with the new blocks can be identified, e.g., based on a check of the correlation between the motion vectors for blocks at an edge of a frame and the motion vectors for blocks in the interior of a frame. Such a correlation can be determined based on the SAD prediction error metrics for the different blocks and/or the direction and magnitude of the motion parameters.

Figure 16:
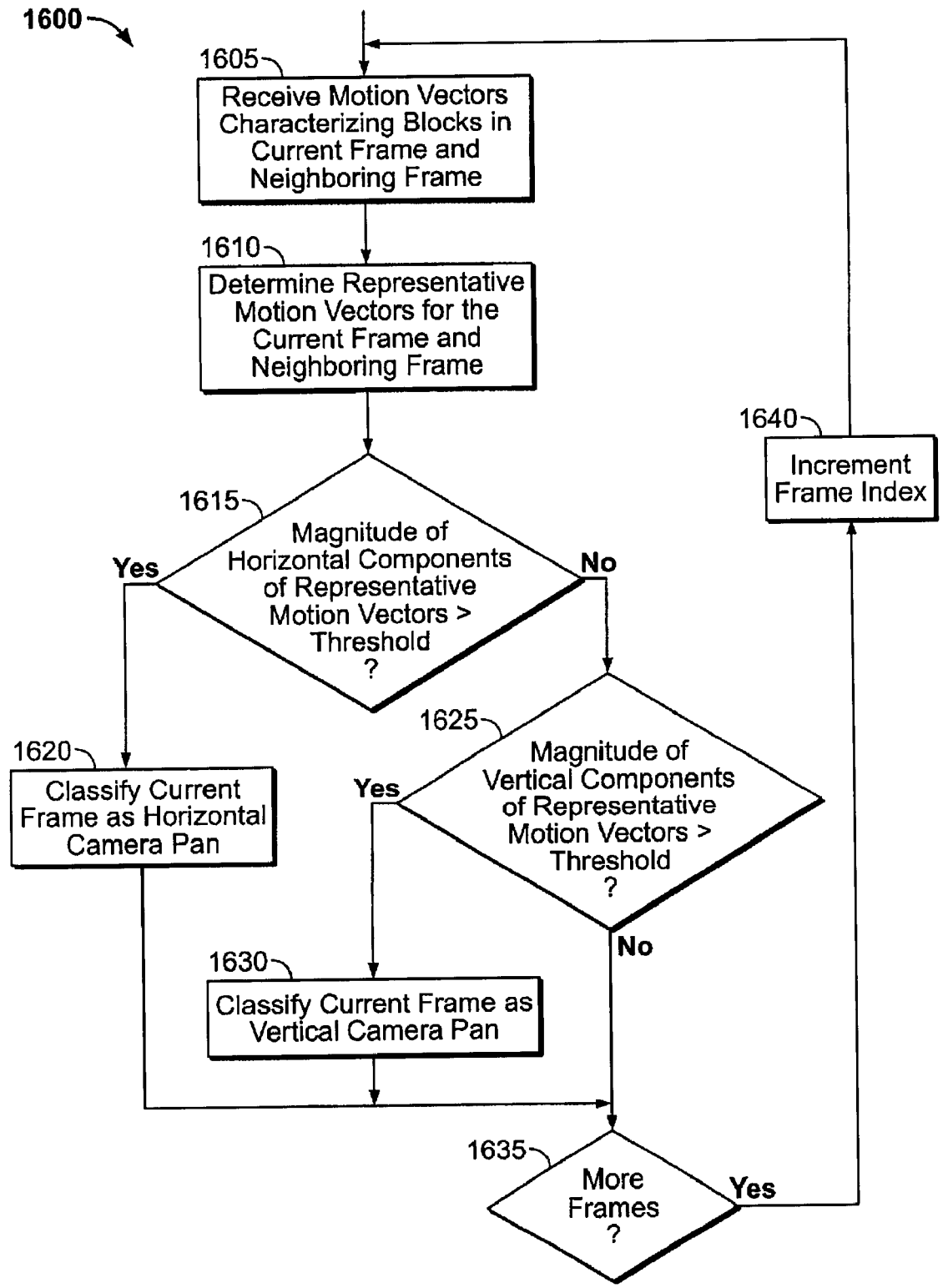
FIG. 16 is a flowchart of an example of a process for classifying camera pan scenes.

FIG. 16 is a flowchart of a process 1600 for classifying camera pan scenes. Process 1600 can be performed in isolation or process 1600 can be performed in conjunction with other activities. For example, process 1600 can be performed at 1015 by the system performing process 1000 (FIG. 10). As another example, process 1600 can be performed at 1545 in process 1500 (FIG. 15).

The system performing process 1600 can receive motion vectors characterizing the motion of blocks in a current frame and a frame that neighbors the current frame at 1605. The neighboring frame can precede or follow the current frame and need not be immediately adjacent to the current frame. The motion vectors can be received by accessing a memory such as buffer 900. The motion vectors can be determined by a MEMC module, such as MEMC framework module 105 (FIG. 1).

The system performing process 1600 can determine representative motion vectors for the current frame and the neighboring frame at 1610. A representative motion vector typifies the motion in a frame. For example, in some implementations, a representative motion vector can be determined by creating a two-dimensional histogram of translational motion vectors for blocks in a frame and selecting a translational motion vector that appears most often in the histogram (the mode of the histogram) as the representative motion vector. As another example, in some implementations, a representative motion vector can be an average motion vector that embodies the average horizontal or/and average vertical component of a motion vector of a region of a frame.

In some implementations, the motion vectors used to determine the representative motion vector can be drawn from a sub-set of the motion vectors provided by a MEMC module. For example, the subset can be obtained through thresholding, quantization, sub-sampling, the exclusion of boundary values and/or outliers, or spatio-temporal filtering of an original set of motion vectors.

The system performing process 1600 can determine if the horizontal components of the representative motion vectors for the current frame and the neighboring frame exceed a threshold at 1615. If the system determines that the horizontal components of the representative motion vectors for the current frame and the neighboring frame do exceed the threshold, then the system can classify the current frame as a horizontal camera pan at 1620. The system can classify the current frame as a horizontal camera pan by, e.g., adding a flag or other marker to the current frame in a collection of video information and/or adding an identifier of the current frame to a data structure that identifies horizontal camera pans.

If the system determines that the horizontal components of the representative motion vectors for the current frame and the neighboring frame do exceed the threshold, then the system can determine if the vertical components of the representative motion vectors for the current frame and the neighboring frame exceed a threshold at 1625. If the system determines that the vertical components of the representative motion vectors for the current frame and the neighboring frame do exceed the threshold, then the system can classify the current frame as a vertical camera pan at 1630. The system can classify the current frame as a vertical camera pan by, e.g., adding a flag or other marker to the current frame in a collection of video information and/or adding an identifier of the current frame to a data structure that identifies vertical camera pans.

The classification of a current frame as a horizontal or vertical camera pan can be expressed in the following pseudo-code, where $DMV_{ref}(i, x)$ denotes the horizontal component of the representative motion vector for frame i from reference frame ref and $t_{pan}$ denotes the threshold.

```
if ( ((|DMV_{i-1}(i,x)|>t_pan || |DMV_{i-1}(i,y)|>t_pan) &&
      (|DMV_i(i+1,x)|>t_pan || |DMV_i(i+1,y)|>t_pan )) ||
     ((|DMV_{i-1}(i,x)|>t_pan || |DMV_{i-1}(i,y)|>t_pan) &&
      (|DMV_{i-2}(i-1,x)|>t_pan || |DMV_{i-2}(i-1,y)|>t_pan)))
{
         camera_pan[i] = 1;
}
else
{
         camera_pan[i] = 0;
}
```

In some implementations, the threshold $t_{pan}$ can be, e.g., 10 in quarter pixel units.

The system performing process 1600 can also determine if there are additional frames for which there are motion vectors available at 1635 and, if so, increment a frame index at 1640. Incrementing the frame index changes the current frame so that the system can return to 1605.

In other implementations, higher order motion models such as the affine can be used and/or representative motion vectors for other and/or additional frames can be used. For example, motion vectors from distant frames (i–k where k≧1) can be used to accurately identify the subtle motion associated with relatively slow camera pans. In some of these implementations, the thresholds can be modified to reflect the increased distance between frames. Furthermore, correlation between motion parameters from additional preceding and/or subsequent reference frames can be used in the classification of a current frame as a camera pan.

camera Zoom Scenes

In general, camera zoom scenes are characterized by changes in the magnification of the field of view in a collection of video information. The field of view can be zoomed in or zoomed out. In some implementations, camera zoom scenes can be identified using an affine motion model.

Figure 17:
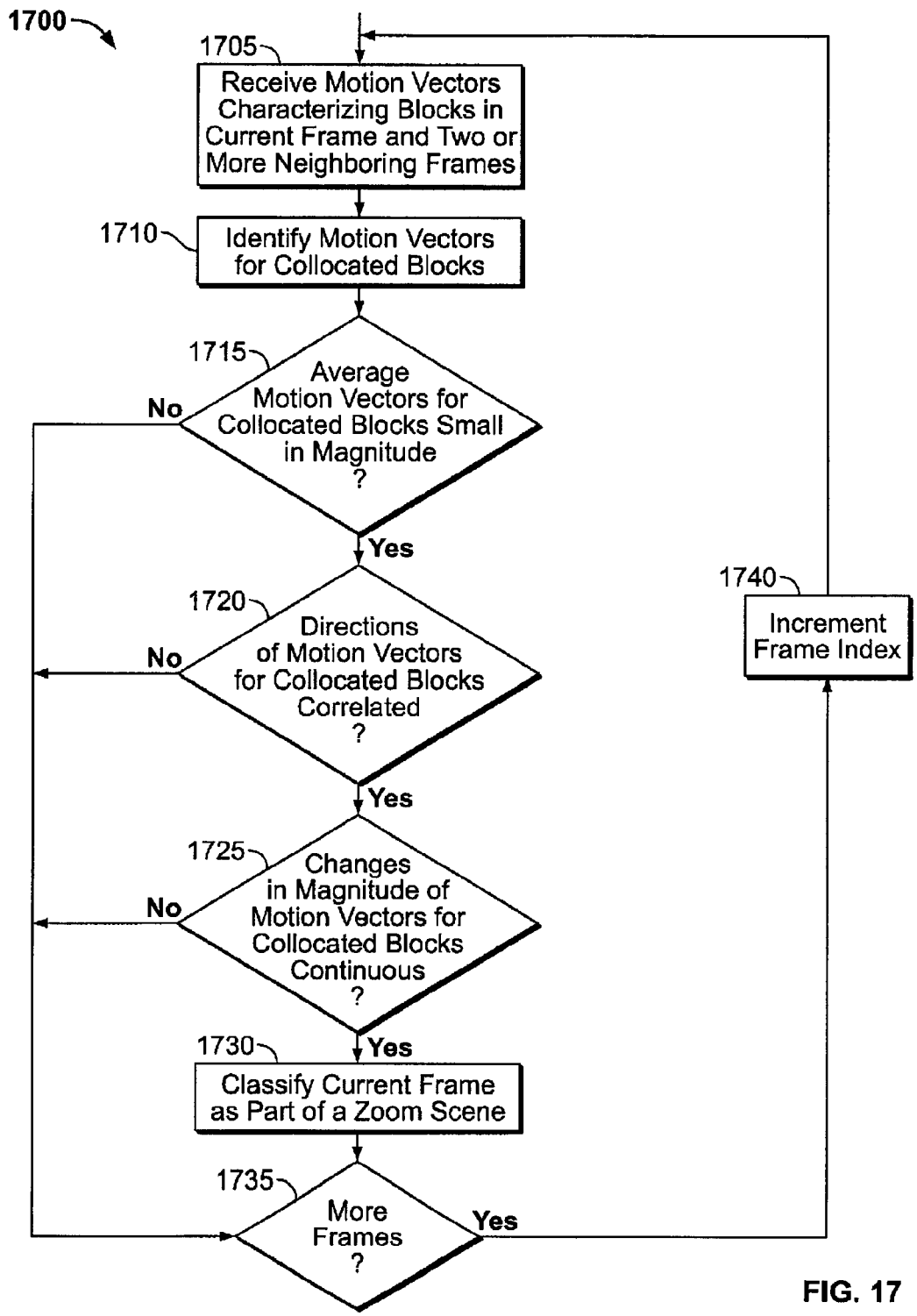
FIGS. 17, 18 are flowcharts for examples of processes for identifying camera zoom scenes.

FIG. 17 is a flowchart of a process 1700 for identifying camera zoom scenes. Process 1700 can be performed in isolation or process 1700 can be performed in conjunction with other activities. For example, process 1700 can be performed at 1015 by the system performing process 1000 (FIG. 10).

The system performing process 1700 can receive motion vectors characterizing the motion of blocks in a current frame and in two or more neighboring frames at 1705. The neighboring frames can precede or follow the current frame and need not be immediately adjacent to the current frame. The motion vectors can be accessed in a memory such as buffer 900 (FIG. 9). The motion vectors can be determined by a MEMC module, such as MEMC framework module 105 (FIG. 1).

The system performing process 1700 can identify motion vectors for collocated blocks in the current and neighboring frames at 1710. The system performing process 1700 can also determine whether the average magnitude of all or most motion vectors is relatively small at 1715. In principal, if there is a zoom sequence, pixels are expected to be moving in all directions starting from the center of the image with approximately equal displacements for pixels that are at the same distance from the center. The direction of motion is strongly indicative of the zoom direction (i.e., zoom in or zoom out). The average magnitude can be determined to be relatively small by computing the average magnitude of the horizontal and vertical components of the motion vectors and determining if these components are close to zero.

If the system performing process 1700 determines that the average magnitude of the identified block motion vectors is relatively small, then the system also determines if the motion vectors of the collocated blocks are correlated at 1720. These motion vectors are correlated when generally point in the same direction.

If the system performing process 1700 determines that the motion vectors of collocated blocks are correlated (i.e., point in similar directions), then the system also determines if the changes in magnitude of the motion vectors for collocated blocks are continuous at 1725. Continuous changes in magnitude occur when the magnitudes are uniformly increasing or uniformly decreasing as the temporal distance between a current frame and a reference frame (or difference in frame index) increases. In some implementations, the system performing process 1700 can determine if the changes in magnitude of the motion vectors for collocated blocks is continuous using the sum of the absolute magnitude of the motion vectors of the collocated blocks.

If the system performing process 1700 determines that the changes in magnitude of the motion vectors for collocated blocks are continuous, then the system can classify a current frame as part of a zoom scene at 1730. The current frame can be classified as a zoom scene by, e.g., adding a flag or other marker to the current frame in a collection of video information and/or establishing a separate data structure that identifies the current frame as a zoom scene by frame number, time, and/or other identifying characteristic. The identification can be made available to a human user or other collection of data processing activities.

The system performing process 1700 can also determine if there are additional frames for which there are motion vectors available at 1735 and, if so, increment a frame index at 1740. Incrementing the frame index changes the current frame so that the system can return to 1705.

Figure 18:
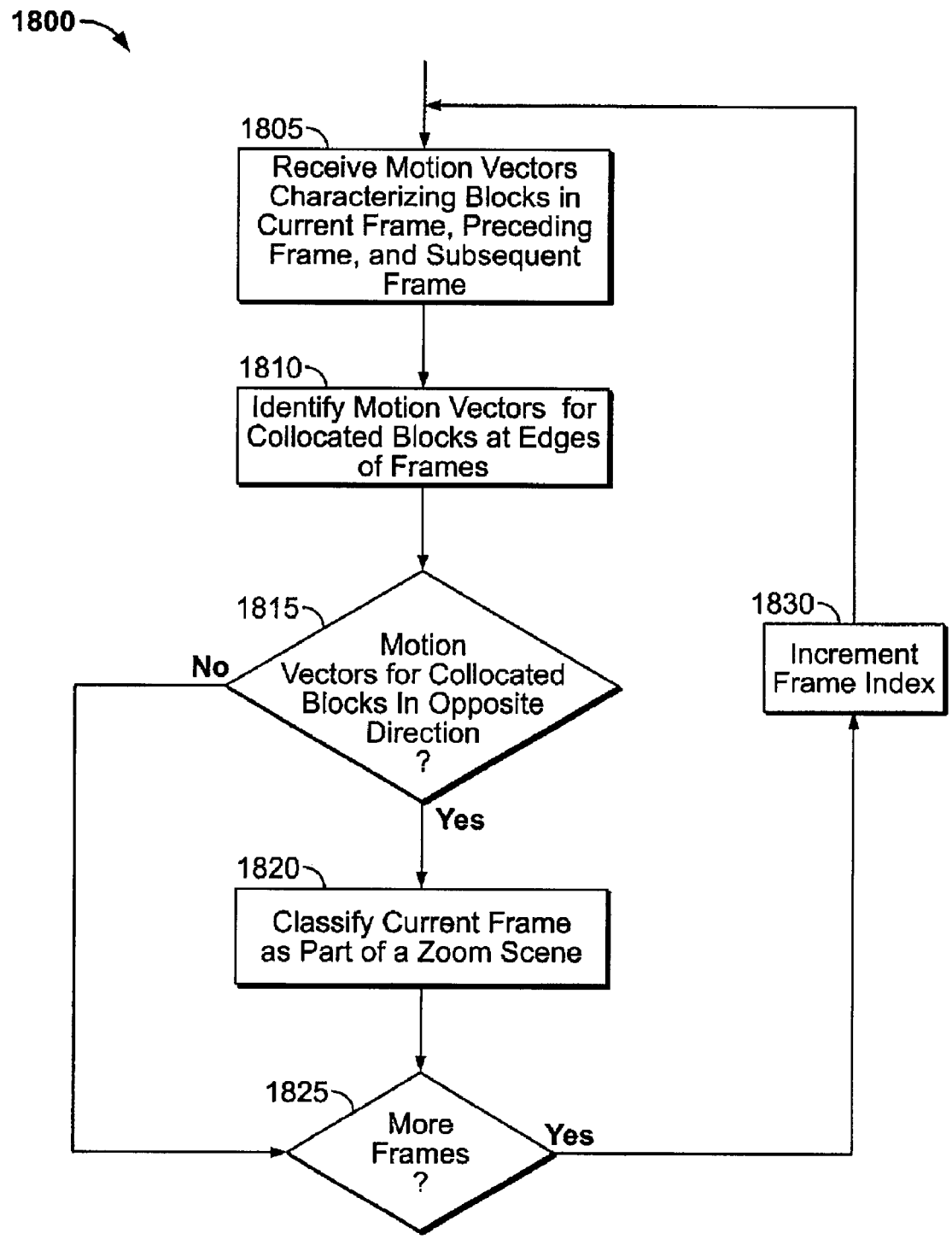

FIG. 18 is a flowchart of another process 1800 for identifying camera zoom scenes. Process 1800 can be performed in isolation or process 1800 can be performed in conjunction with other activities. For example, process 1800 can be performed at 1015 by the system performing process 1000 (FIG. 10). As another example, process 1800 can be performed in conjunction with process 1700 (FIG. 17) to ensure that camera zoom scenes are properly identified.

The system performing process 1800 can receive motion vectors characterizing the motion of blocks in a current frame, in a preceding reference frame, and in a subsequent reference frame at 1805. The motion vectors can be accessed in a memory such as buffer 900 (FIG. 9). The motion vectors can be determined by a MEMC module, such as MEMC framework module 105 (FIG. 1).

The system performing process 1800 can identify motion vectors for collocated blocks that are located at the edges of these frames at 1810. The system performing process 1800 can also determine whether the directions of motion vectors referenced to preceding and subsequent reference frames point in opposite directions at 1815. In other words, a block on the edge of a current frame is located on the inside of a preceding frame and on the outside of a subsequent frame during a zoom-in. However, assuming a concentric placement, the blocks in all three frames lie on an imaginary line connecting the center of the three frames with the center of the said block in the past frame. Similarly, a block on the edge of a current frame is located on the outside of a preceding frame and on the inside of a subsequent frame during a zoom-out. Thus, the motion vectors referenced to preceding and subsequent reference frames point in opposite directions during zoom scenes.

If the system performing process 1800 determines that the motion vectors from preceding and subsequent reference frames point in opposite directions, then the system can classify a current frame as part of a zoom scene at 1820. The current frame can be classified as a zoom scene by, e.g., adding a flag or other marker to the current frame in a collection of video information and/or establishing a separate data structure that identifies the current frame as a zoom scene by frame number, time, and/or other identifying characteristic. The identification can be made available to a human user or other collection of data processing activities.

The system performing process 1800 can also determine if there are additional frames for which there are motion vectors available at 1825 and, if so, increment a frame index at 1830. Incrementing the frame index changes the current frame so that the system can return to 1805.

In other implementations, a system can identify camera zoom scenes based on coefficients of affine motion parameters. In particular, a system can convert block level motion parameters (such as those provided by MEMC framework module 105) into affine global motion parameters. The coefficients of these affine global motion parameters can be analyzed to identify camera zoom scenes.

Figure 19:
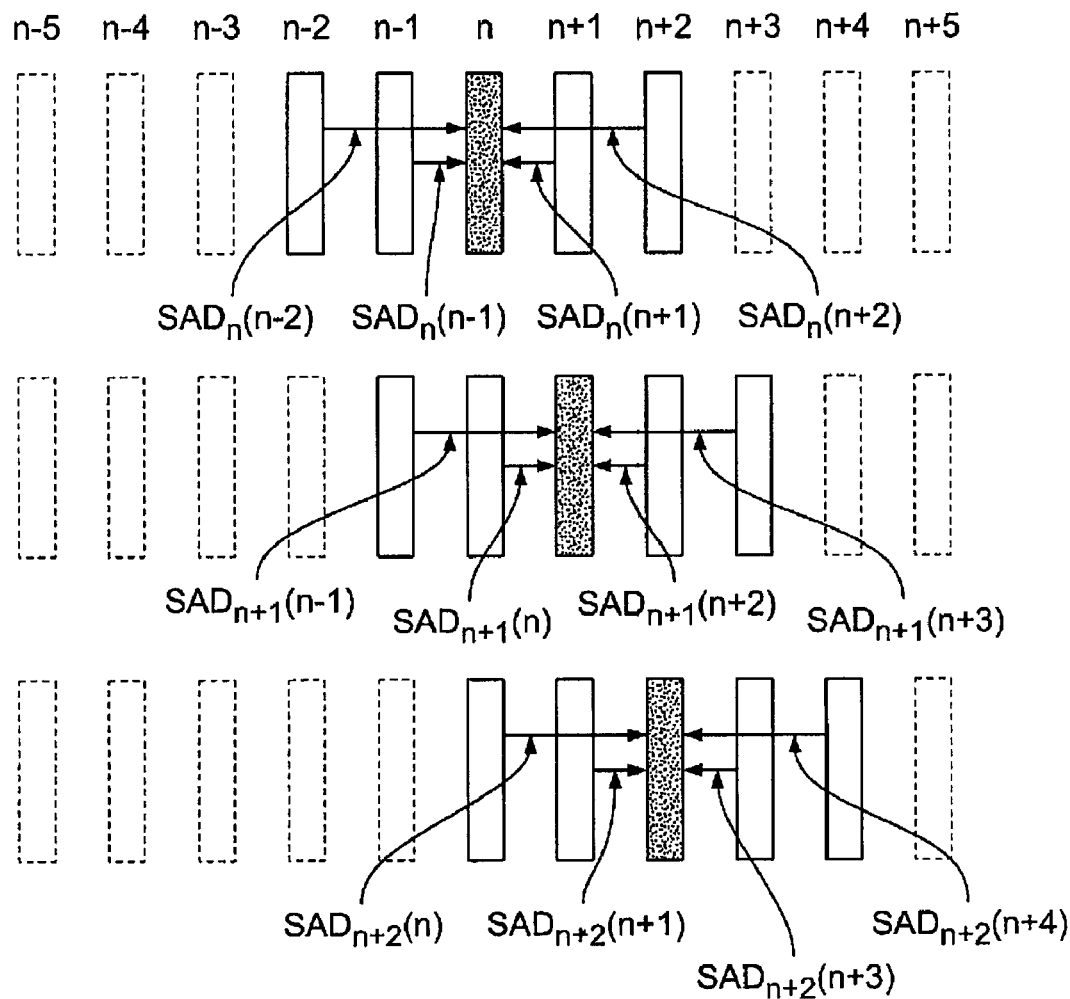
FIG. 19 schematically represents examples for the use of two or more preceding frames and two or more subsequent frames as prediction references.

In some implementations, both motion vectors and prediction error metrics such as SAD can be used to identify camera zoom scenes. For example, as shown in FIG. 19, a MEMC module such as MEMC framework module 105 can use two or more preceding frames and two or more subsequent frames as prediction references.

If a frame n+1 belongs to a zoom, the motion vectors which predict frame n+1 from reference frame n should be approximately inverse from the motion vectors which predict frame n from reference frame n+1. For example, if one motion vector is 0.2 then the other motion vector should be approximately 5.0. Furthermore, the prediction error metrics such as SAD in the same prediction directions should be relatively close. The system can thus identify a camera zoom scene by comparing a motion vector for frame n referenced to a frame n+k and the prediction error metric for that same motion vector with a motion vector for frame n+k referenced to frame n and the prediction error metric for that same motion vector. If these motion vectors and prediction error metrics are not indicative of a camera zoom scene, then the current frame can be excluded from being identified as a camera zoom scene.

Rotation Scenes

In general, rotation scenes are scenes where the field of view is rotated. Rotation scenes can be classified using processes that are similar to the processes used to characterize zoom scenes. Instead of the characteristics discussed above, rotation scenes can be characterized based on the magnitude of motion vectors being comparable at comparable distances from the center of rotation and the direction of the motion vectors changing to define a circle around the center of rotation.

Static Scenes

In general, static scenes are characterized by little or no changes in the field of view in a collection of video information. Static scenes can thus be identified based on, e.g., the magnitude of the motion vectors and/or the prediction error metric being below one or more thresholds. The thresholds can be below the average magnitude of the motion vectors and the prediction error metric for the collection of video information.

Active Scenes

In general, active scenes are characterized by large numbers or significant changes in the field of view in a collection of video information. Active scenes can thus be identified based on, e.g., the magnitude of the motion vectors and/or the prediction error metric being above one or more thresholds. In some implementations, a histogram of motion vectors can be assembled and the peak of the histogram can be selected. Using such a histogram, motion of multiple objects can be identified based on the presence of a large number of peaks with comparable block membership. In any case, the thresholds can be above the average magnitude of the motion vectors and the prediction error metric for the collection of video information.

Flash Scenes

In general, flash scenes are one or more frames in which a significant increase in illumination has occurred. Frames in flash scenes can be detected based on large prediction errors relative to a short term or long term threshold, large differences between the prediction error with weighted prediction and without prediction, and/or low prediction errors between frames n−k and n+m where the frame k>0 and m>0 are part of the flash scene.

Frame Region Segmentation

Generally, frame region segmentation is the process of identifying regions in a sequence of frames that have common characteristics. In some implementations, regions in different frames can be identified based on the similarity of motion vectors in the different regions. For example, the K-means algorithm can be used to identify the number and size of regions. In some implementations, frame region segmentation can also identify regions based on one or more of the following: (a) motion-compensated prediction error metric for a region; (b) luminance and chrominance DC and variance values; (c) the region source variance for a region, (d) spatial characteristics of a region, including texture and frequency analysis; and (e) region classifications from other frames (i.e., recursion).

In some implementations, the identified regions can be labeled with a metric that characterizes, e.g., the complexity or importance of the region. Such metrics can represent the visual significance of a region and can be based on the motion, texture, and luminance characteristics of a region. For example, in some implementations, each region can be with one or more metrics that characterize the most dominant N motion vectors, the average luminance or/and chrominance DC values, a characterization of the texture of the entire region, its variance, energy of transform coefficients, and the like. For example, N can be equal to 1.

Figure 20:
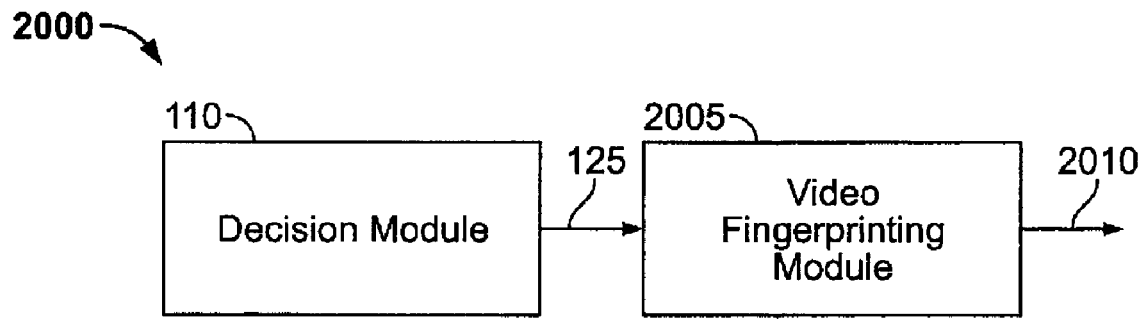
FIG. 20 is a schematic representation of an example of a video fingerprinting system.

FIG. 20 is a schematic representation of a video fingerprinting system 2000. Video fingerprinting system 2000 includes a decision module 110 and a video fingerprinting module 2005. Decision module 110 can be part of any of systems 100, 500, 700, 800 (FIGS. 1, 5, 7, 8) and generate scene classifications 125 from video information. Video fingerprinting module 2005 can receive scene classifications 125 from decision module 110 to generate video fingerprint 2010.

Generally, video fingerprinting is the process of characterizing video information in non-visual semantics. For example, visual features of a collection of video information (such as, e.g., variances in visual parameters, motion, scene transitions, and temporal and spatial correlations) can be described using language. Video fingerprinting can be applied to achieve a number of different ends such as, e.g., search and retrieval, watermarking, audio-video synchronization, and content classification and characterization for the identification of copyrighted works and/or the insertion of targeted advertisements into a collection of video information.

Figure 21:
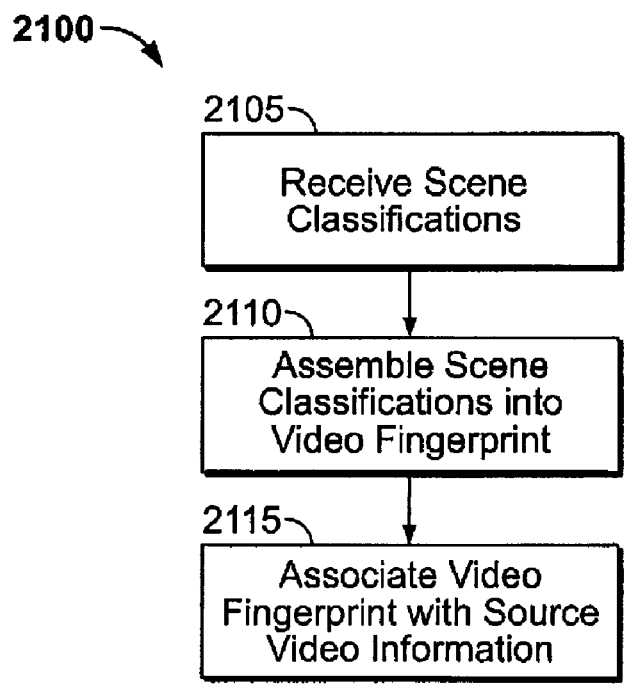
FIG. 21 is a flowchart of an example for a process for video fingerprinting.

FIG. 21 is a flowchart of a process 2100 for video fingerprinting. Process 2100 can be performed by one or more data processing devices. For example, process 2100 can be performed by video fingerprinting module 2005 in systems 2000 (FIG. 20). Process 2100 can be performed in isolation or process 2100 can be performed in conjunction with other activities. For example, process 2100 can be performed after the performance of process 1000 (FIG. 10).

The system performing process 2100 can receive scene classifications at 2105. For example, the system can receive information identifying classification of one or more scenes as well as the disposition of the classified scenes in the source collection of video information. Example classifications of scenes include scene changes, camera pans, camera zooms, cross-fades, fade-ins, fade-outs, flash scenes, high-motion, active segments, low-motion, static segments, texture classification, and classifications of the number and size of blocks.

In some implementations, the scene classifications can be received in conjunction with other information that characterizes the source video information. For example, the scene classifications can be received in conjunction with parameters characterizing one or more of the following:

(a) DC or variance of luminance and chrominance components;

(b) edge magnitude and orientation information obtained through one or more edge filtering technique (e.g., Sobel);

(c) characterization of frequency in the video information, such as the coefficients of one or more transforms;

(d) average and dominant local and global motion vectors, including filtered collections of motion vectors, quantized collections of motion vectors, or collections of motion vectors from which outliers have been excluded;

(e) average and dominant local and global weighted prediction parameters, including filtered collections of weighted prediction parameters, quantized collections of weighted prediction parameters, or collections of weighted prediction parameters from which outliers have been excluded.;

(f) energy of transform coefficients, including wavelet, DCT, or Fourier transform coefficients;

(g) correlation coefficients reflecting the correlations between original and motion-compensated predictions;

(h) spatial dimensions and number of frames in the source video information;

(i) prediction error metrics from motion-compensation;

(j) differences between combinations of prediction error metrics from motion-compensation using one or more reference frames; and/or (k) global motion model parameters.

The system performing process 2100 can assemble the scene classifications into a video fingerprint at 2110 and associate the video fingerprint with the source video information at 2115. As one example, the system can associate the video fingerprint with the source video information by labeling the video fingerprint with the name or other identifier of the source video information. As another example, the system can associate the video fingerprint with the source video information by storing the video fingerprint with the source video information. In some implementations, the source video information can be stored in a compressed format. For example, the video fingerprint can be stored alongside the source video information using the MPEG-7 XML-based descriptor format. In some implementations, some or all of the other information that characterizes the source video information can be included in the video fingerprint.

FIG. 22 is a schematic representation of a video coding system 2200. Video coding system 2200 includes a decision module 110 and a video coding module 2205. Decision module 110 can be part of any of systems 100, 500, 700, 800 (FIGS. 1, 5, 7, 8) and generate scene classifications 125 from video information. Video coding module 2205 can receive scene classifications 125 from decision module 110 to generate coded video information 2210. Moreover, in some implementations, video coding module 2205 can provide feedback 2215 to decision module 110 to aid in the generation of scene classifications 125.

Generally, video coding is the process of formatting video information for a purpose. For example, video information can be formatted for storage and/or transmission using video coding. In situations where bandwidth and/or storage space are limited, video coding can compress video information for transmission and/or storage. Examples of techniques for video coding include many of the Moving Picture Experts Group (MPEG) standards such as MPEG-2, MPEG-4 AVC/H.264, and MPEG-4 SP/ASP, as well as other codecs and standards such as VC-1, On-2's VP6 and VP7, and AVS.

FIGS. 23-32 are flowcharts of processes 2300, 2400, 2500, 2600, 2700, 2800, 2900, 3000, 3100, 3200 for video coding. One or more of processes 2300, 2400, 2500, 2600, 2700, 2800, 2900, 3000, 3100, 3200 can be performed by one or more data processing devices. For example, one or more of processes 2300, 2400, 2500, 2600, 2700, 2800, 2900, 3000, 3100, 3200 can be performed by video coding module 2205 in system 2200 (FIG. 22). Processes 2300, 2400, 2500, 2600, 2700, 2800, 2900, 3000, 3100, 3200 can be performed in isolation or processes 2300, 2400, 2500, 2600, 2700, 2800, 2900, 3000, 3100, 3200 can be performed in conjunction with each other and/or with other activities. For example, one or more of processes 2300, 2400, 2500, 2600, 2700, 2800, 2900, 3000, 3100, 3200 can be performed after performing process 1000 (FIG. 10).

FIG. 23 is a flowchart of process 2300 that relates to video coding of scene changes. The system performing process 2300 receives a sequence of frames and classifications of these frames at 2305. The sequence of frames and their classification can be received from a decision module such as decision module 110. In some implementations, the classifications are flags or other markers associated with the frames themselves, e.g., as a header. In other implementations, the classifications are stored in a separate data structure that identifies frames in the sequence by index number, time, or otherwise.

The system performing process 2300 determines if one or more frames in the sequence of frames are classified as scene changes at 2310. If the system determines that one or more frames are classified as scene changes, then the system performing process 2300 codes those frames classified as scene changes as intra-coded pictures, which avoids referencing other frames in the sequence, at 2315. Intra-coded pictures can be decoded without reference to another previously coded frame. For example, intra-frames and IDR frames (in H.264/AVC) are intra-coded frames.

The system perfomimg process 2300 can also optionally store one or more scene change frames as long term reference frames at 2320. Long term reference frames are frames used as references for motion-compensated prediction of other frames and do not have to be removed from the reference buffer except under explicit instruction to remove.

FIG. 24 is a flowchart of another process 2400 that relates to video coding of scene changes. The system performing process 2400 receives a sequence of frames and classifications of these frames at 2305 and determines if one or more frames in the sequence of frames are classified as scene changes at 2310. If the system determines that one or more frames are classified as scene changes, then the system performing process 2400 ensures that one or more neighboring highest priority level frames are coded as intra-coded frames at 2405. In this regard, some video coders code certain frames at higher priority levels than other frames. For example, a hierarchical coding structure can code certain frames at higher priority levels than other frames.

The system performing process 2400 can thus identify a subsequent neighboring frame that is to be coded at the highest priority level and ensure that this frame is preferably coded as intra-coded pictures. This ensures that a highest priority frame in the vicinity of the scene change is intra-coded.

Figure 25:
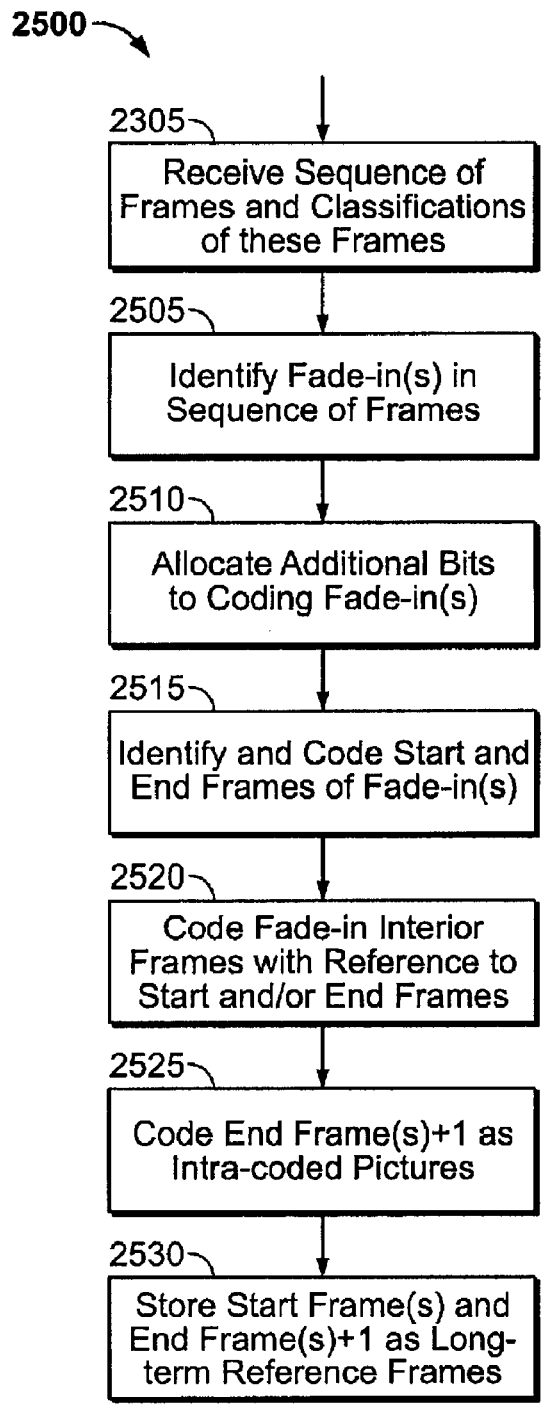

FIG. 25 is a flowchart of another process 2500 that relates to video coding of fade-in transitions. The system performing process 2500 receives a sequence of frames and classifications of these frames at 2305 and identifies one or more fade-in transitions in the sequence of frames at 2505. The fade-in transitions can be identified using the received classifications of the frames in the sequence. The system performing process 2500 can increase the allocation of bits to code the frames that belong to the identified fade-in transitions at 2510. The bits can be allocated by changing the rate allocation for the identified fade-in transitions. This is particularly useful when illumination change compensation is not available to the video encoder.

The system performing process 2500 can also identify and code the start and end frames of the fade-in transitions at 2515. The start and end frames can be identified from the received classifications of the sequence of frames. The system performing process 2500 can code interior frames of the fade-in transitions (i.e., frames between the start and end frames) with reference to one or both of the start and end frames at 2520. In some implementations, bi-prediction is used (i.e., the interior frames are coded with reference to both the start and end frames).

The system performing process 2500 can also code the frames immediately subsequent to the end frames of the fade-in transitions as intra-coded pictures at 2525. Since this frame is a scene change, this is consistent with the coding of scene change frames as intra-coded frames at 2315 in process 2300 (FIG. 23). The system performing process 2500 can also optionally store the start frames and the frames immediately subsequent to the end frames as long term reference frames at 2530.

In implementations where the system coding the fade-in transitions codes certain frames at higher priority levels than other frames (e.g., in hierarchical coding), rather than performing the activities described at 2525 and 2530, the system performing process 2500 can ensure that one or more highest priority level frames that neighbor the frames immediately subsequent to the end frames are coded as intra-coded frames.

In implementations where the coder has access to illumination change compensation (weighted prediction), then frames immediately subsequent to the end frames of the fade-in can be predicted from a previously coded frame and need not be coded as intra-pictures. This applies both to implementations with a single priority level and implementations with multiple priority levels.

Figure 26:
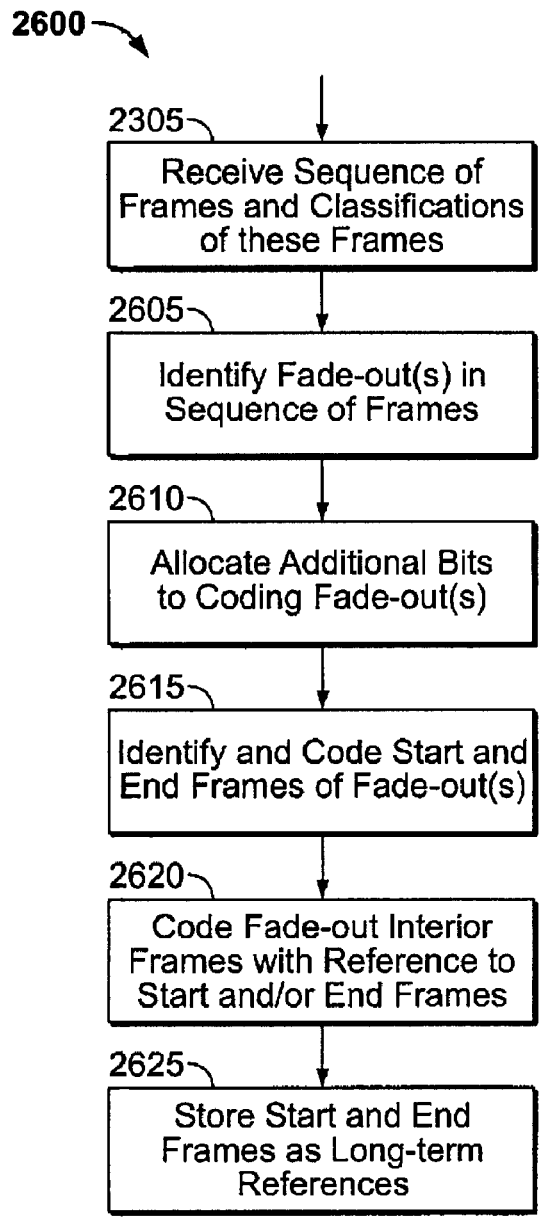

FIG. 26 is a flowchart of a process 2600 that relates to video coding of fade-out transitions. The system performing process 2600 receives a sequence of frames and classifications of these frames at 2305 and identifies one or more fade-out transitions in the sequence of frames at 2605. The fade-out transitions can be identified using the received classifications of the frames in the sequence. The system performing process 2600 increase the allocation of bits to code the frames that belong to the identified fade-out transitions at 2610. The bits can be allocated by changing the rate allocation for the identified fade-out transitions. This is particularly useful when illumination change compensation is not available to the video encoder.

The system performing process 2600 can also identify and code the start and end frames of the fade-out transitions at 2615. The start and end frames can be identified from the received classifications of the sequence of frames. The system performing process 2600 can code interior frames of the fade-out transitions (i.e., frames between the start and end frames) with reference to one or both of the start and end frames at 2620. In some implementations, bi-prediction is used (i.e., the interior frames are coded with reference to both the start and end frames). The system performing process 2600 can also optionally store the start frames and the end frames as long term reference frames at 2625.

Figures 27, 28:
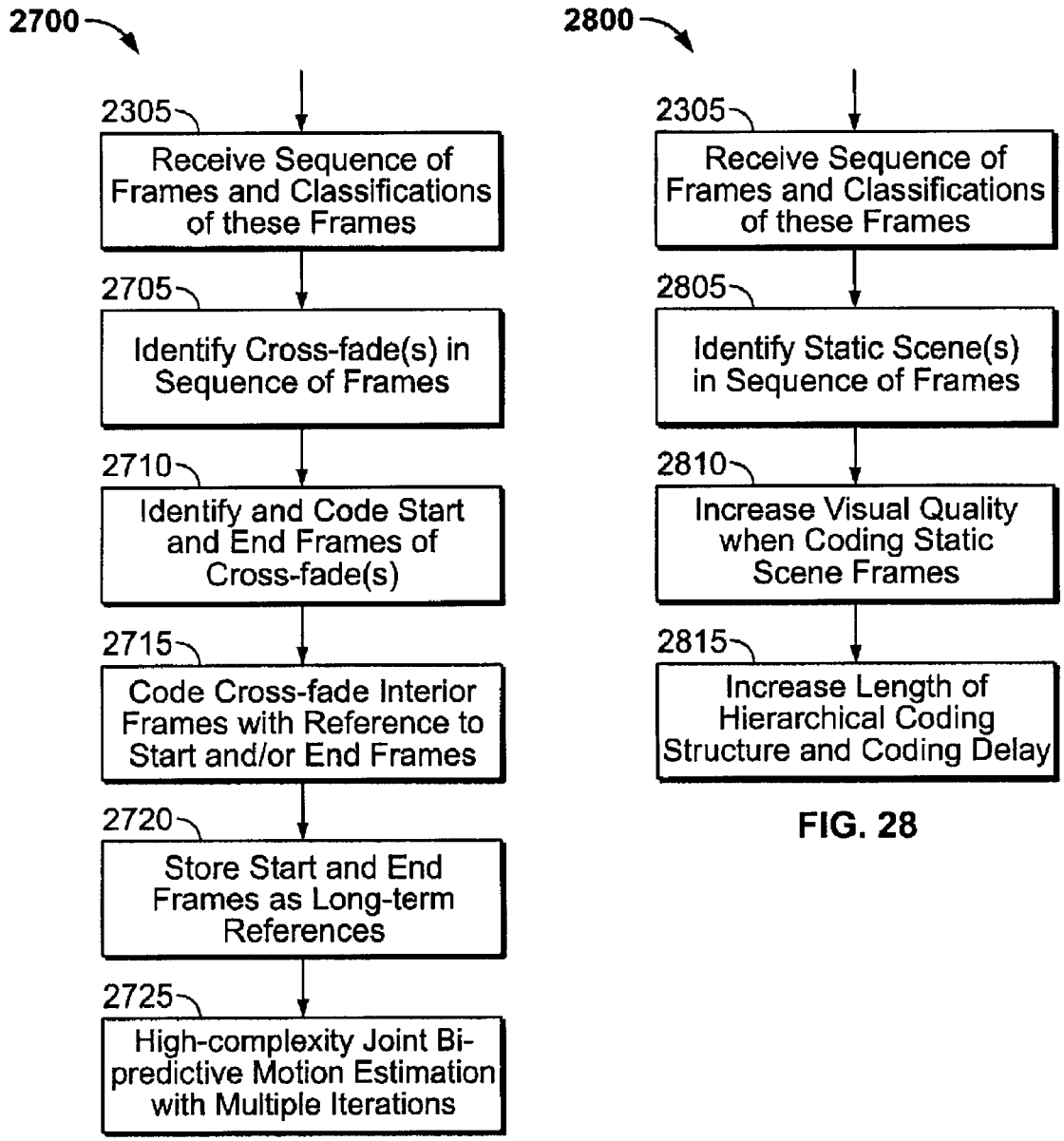

FIG. 27 is a flowchart of a process 2700 that relates to video coding of cross-fade transitions. The system performing process 2600 receives a sequence of frames and classifications of these frames at 2305 and identifies one or more cross-fade transitions in the sequence of frames at 2705. The cross-fade transitions can be identified using the received classifications of the frames in the sequence. The system performing process 2700 can identify and code the start and end frames of the cross-fade transitions at 2710. The start and end frames can be identified from the received classifications of the sequence of frames. The system performing process 2700 can code interior frames of the cross fade transitions (i.e., frames between the start and end frames) with reference to one or both of the start and end frames at 2715. In some implementations, bi-prediction is used (i.e., the interior frames are coded with reference to both the start and end frames). The system performing process 2700 can also store the start frames and the end frames as long term reference frames at 2720 and employ high-complexity joint bi-predictive motion estimation with multiple iterations for the cross-fade transitions at 2725.

FIG. 28 is a flowchart of a process 2800 that relates to video coding of static scenes. The system performing process 2800 receives a sequence of frames and classifications of these frames at 2305 and identifies one or more static scenes in the sequence of frames at 2805. The static scenes can be identified using the received classifications of the frames in the sequence. The system performing process 2800 can increase the visual quality when coding the static scenes at 2810. Also, the system performing process 2800 can increase both the length of hierarchical coding structure and hence the coding delay at 2815. In this regard, if n denotes the last coded frame in a sequence of frames, hierarchical coding structures can be used to compress frame n+N and code frames n+1 through n+N−1 using bi-predictive motion compensation, where N>1.

FIG. 29 is a flowchart of a process 2900 that relates to video coding of active scenes. The system performing process 2800 receives a sequence of frames and classifications of these frames at 2305 and identifies one or more active scenes in the sequence of frames at 2905. The active scenes can be identified using the received classifications of the frames in the sequence. The system performing process 2900 can low pass filter the active scenes at 2910. In particular, details that are not perceivable during display can be low-pass filtered from the active scenes.

The system performing process 2900 can adjust the deblocking filter parameters applied to the active scenes at 2915. In particular, in some implementations, a stronger deblocking filter can be used if the scene is active in an effort to better reduce blockiness. However, deblocking strength can be reduced if the scene is characterized by high texture regions to avoid introducing other artifacts. The increment or decrement can depend on the bit-rate target of the current frame or region or the quantization parameters used. In some implementations, deblocking filter parameters need not be adjusted, especially when higher bit rate and/or lower quantizers result in fewer blocking artifacts. Indeed, in some implementations, deblocking filter parameters can be reduced to retain the texture characteristics of a scene.

The system performing process 2900 can also employ high-complexity joint bi-predictive motion estimation with multiple iterations for the active scenes at 2920. Further, the system performing process 2900 can reduce the allocated bit rate for the active scenes at 2925. In particular, the allocated bit rate, and consequently quality can be reduced by increasing the quantization or Lagrangian parameters used for the scene, adjusting thresholding considerations and adaptive rounding coefficients used during the transform and quantization process, prioritizing different modes with lower bit cost such as skip, and the like. Such changes can inherently reduce the number of bits used to code active scenes.

FIG. 30 is a flowchart of a process 3000 that relates to video coding of camera pan scenes. The system performing process 3000 receives a sequence of frames and classifications of these frames at 2305 and identifies one or more camera pan scenes in the sequence of frames at 3005. The camera pan scenes can be identified using the received classifications of the frames in the sequence. The system performing process 3000 can increase the allocation of bits to code the frames that belong to the identified camera pan scenes at 3010. The bits can be allocated by changing the rate allocation for the identified camera pan scenes. The system performing process 3000 can identify and code the start and end frames of the camera pan scenes at 3015. The start and end frames can be identified from the received classifications of the sequence of frames. In some implementations, the start and end frames can be coded as intra-coded pictures.

The system performing process 3000 can code interior frames of the camera pan scenes (i.e., frames between the start and end frames) with reference to one or both of the start and end frames at 3020. In some implementations, bi-prediction is used (i.e., the interior frames are coded with reference to both the start and end frames). The system performing process 3000 can also store the start frames and the end frames as long term reference frames at 3025.

Figure 31:
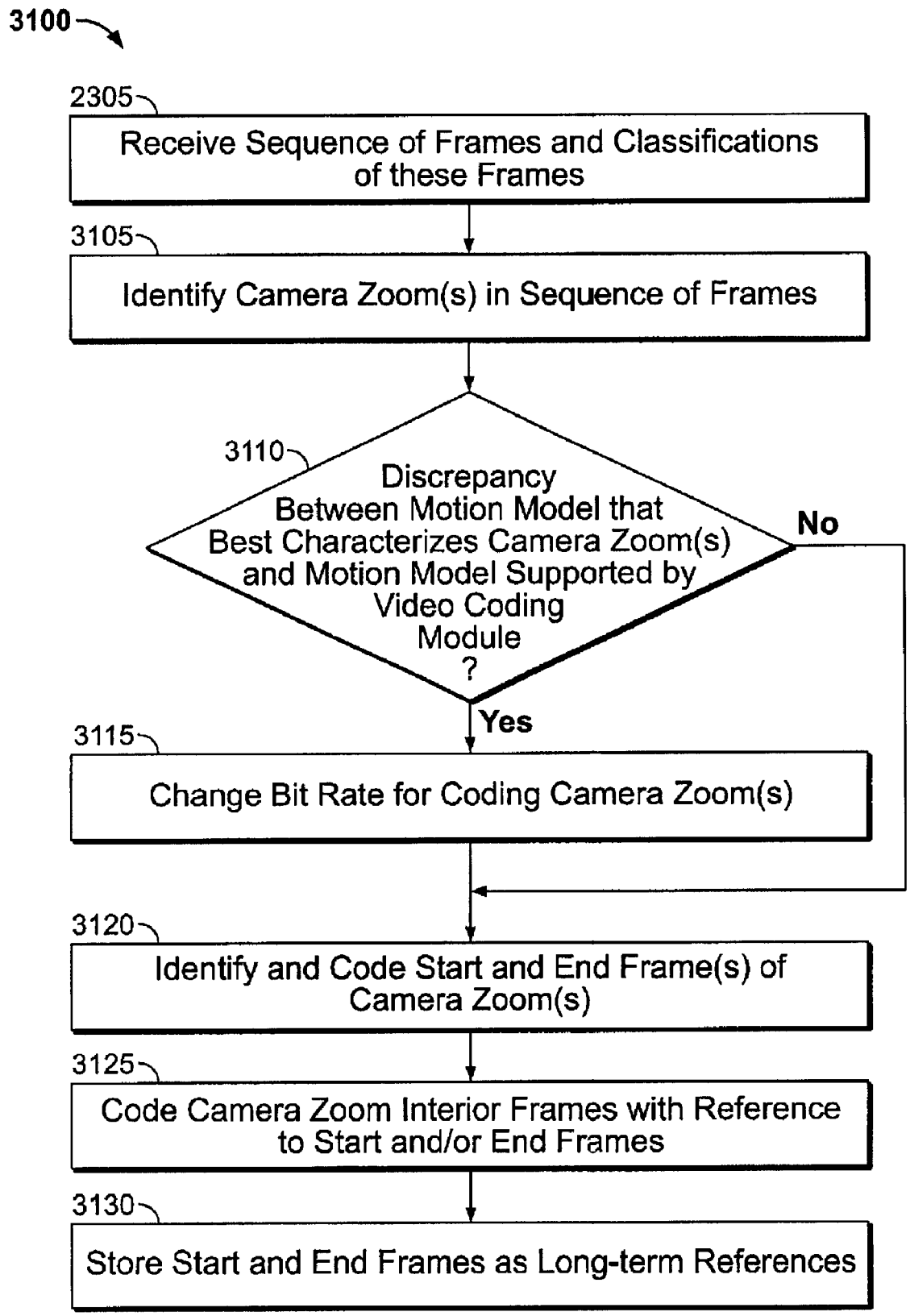

FIG. 31 is a flowchart of a process 3100 that relates to video coding of camera zoom scenes. The system performing process 3100 receives a sequence of frames and classifications of these frames at 2305 and identifies one or more camera zoom scenes in the sequence of frames at 3105. The camera zoom scenes can be identified using the received classifications of the frames in the sequence. The system performing process 3100 can determine if there is a discrepancy between which of two or more motion models best characterizes the motion in the identified camera zoom scenes and a motion model supported by a video coding module at 310. Examples of motion models include affine motion models, translational motion models, and higher order motion models. In some implementations, the motion in identified camera zoom scenes can be best characterized using, e.g., an affine motion model that may not be supported by a video coding module.

If the system performing process 3100 determines that there is a discrepancy, then the system can change the allocated bit rate for coding camera zoom scenes at 3115. For example, if a video coding module supports the affine motion model, which can better characterize camera transitions such as zooms, then fewer bits can be allocated to a zoom transition. On the other hand, if a video coding module only supports a translational motion model, which can be less efficient when coding zoom transitions, more bits can be allocated. In general, when a video coding module supports a higher order motion model which better supports complicated motion and generally results in better motion compensated prediction performance, fewer bits can be allocated to encoding a camera zoom scene.

The system performing process 3100 can also identify and code the start and end frames of the camera zoom scenes at 3120. The start and end frames can be identified from the received classifications of the sequence of frames. In some implementations, the start and end frames can be coded as intra-coded pictures.

The system performing process 3100 can code interior frames of the camera zoom scenes (i.e., frames between the start and end frames) with reference to one or both of the start and end frames at 3125. In some implementations, bi-prediction is used (i.e., the interior frames are coded with reference to both the start and end frames). The system performing process 3100 can also store the start frames and the end frames as long term reference frames at 3130.

Figure 32:
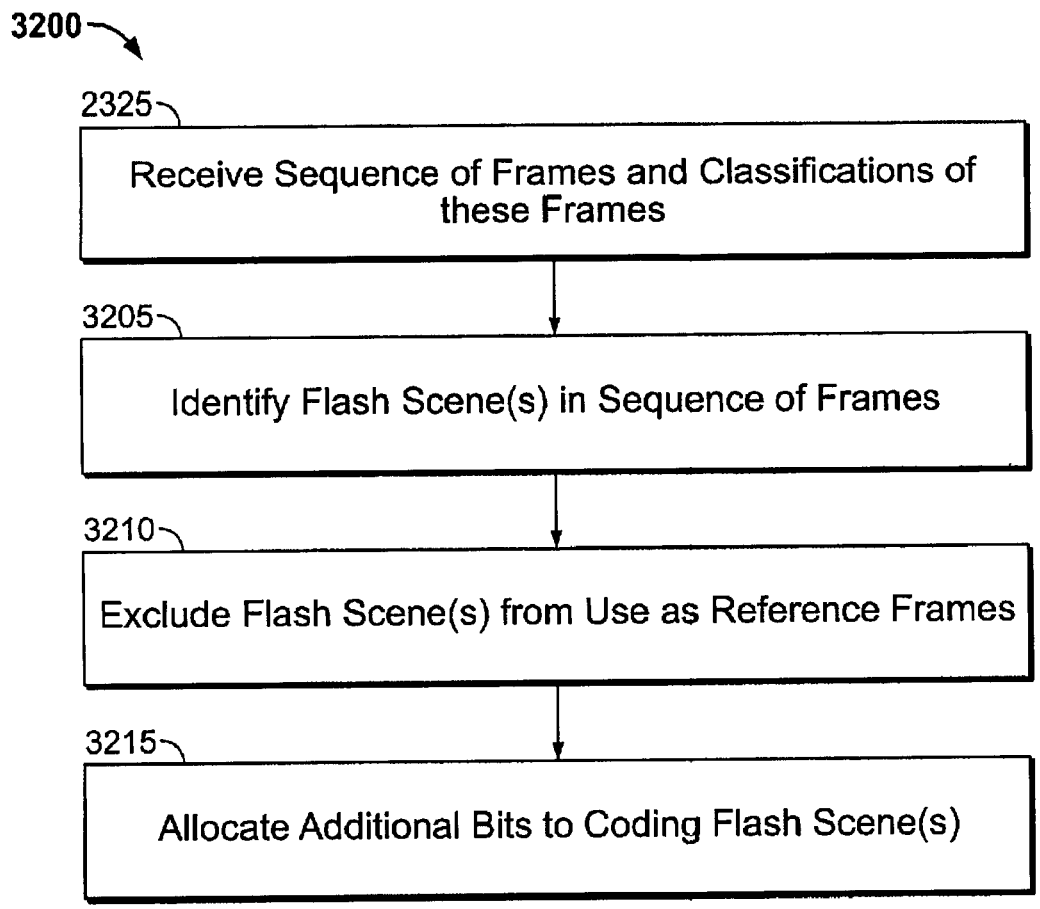

FIG. 32 is a flowchart of a process 3200 that relates to video coding of flash scenes. The system performing process 3200 receives a sequence of frames and classifications of these frames at 2305 and identifies one or more flash scenes in the sequence of frames at 3205. The flash scenes can be identified using the received classifications of the frames in the sequence. The system performing process 3200 can exclude the frames in the flash scenes from use as reference frames at 3210. The system performing process 3200 can also increase the allocation of bits to code the frames that belong to the identified flash scenes at 3215. The bits can be allocated by changing the rate allocation for the identified flash scenes. This is particularly useful when illumination change compensation is not available to the video encoder.

Figure 33:
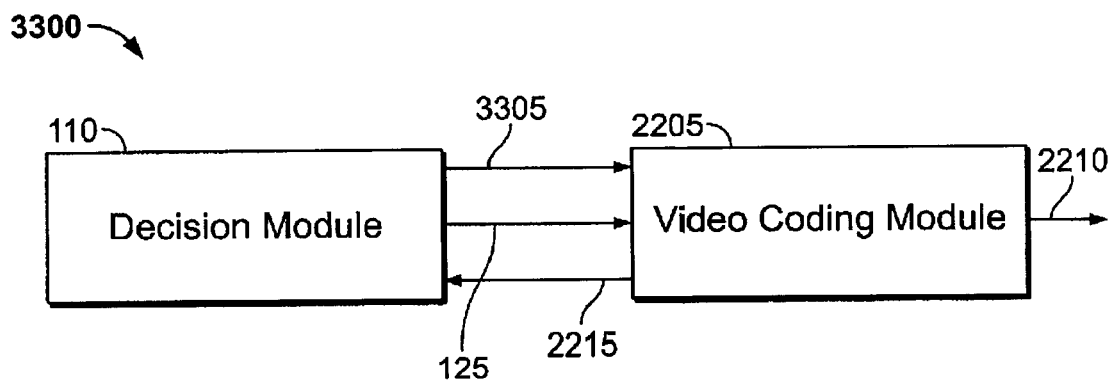
FIG. 33 is a schematic representation of an example of a video coding system.

FIG. 33 is a schematic representation of a video coding system 3300. Video coding system 3300 includes decision module 110 and video coding module 3305. Decision module 110 can be part of any of systems 100, 500, 700, 800 (FIGS. 1, 5, 6, 8) and generate scene classifications 125 from video information. In addition to scene classifications 125, video coding module 2205 can also receive video characterization information 3305 from decision module 110. Video coding module 2205 can use video characterization information 3305 and/or scene classifications 125 to generate coded video information 2210. For example, video coding module 2205 can use one or more of processes 3400, 3500, 3600, 3700, 3800, 3900, 4000 (FIGS. 34-40) to generate coded video information 2210. In some implementations, video coding module 2205 can provide feedback 2215 to decision module 110 to aid in the generation of scene classifications 125.

Figure 34:
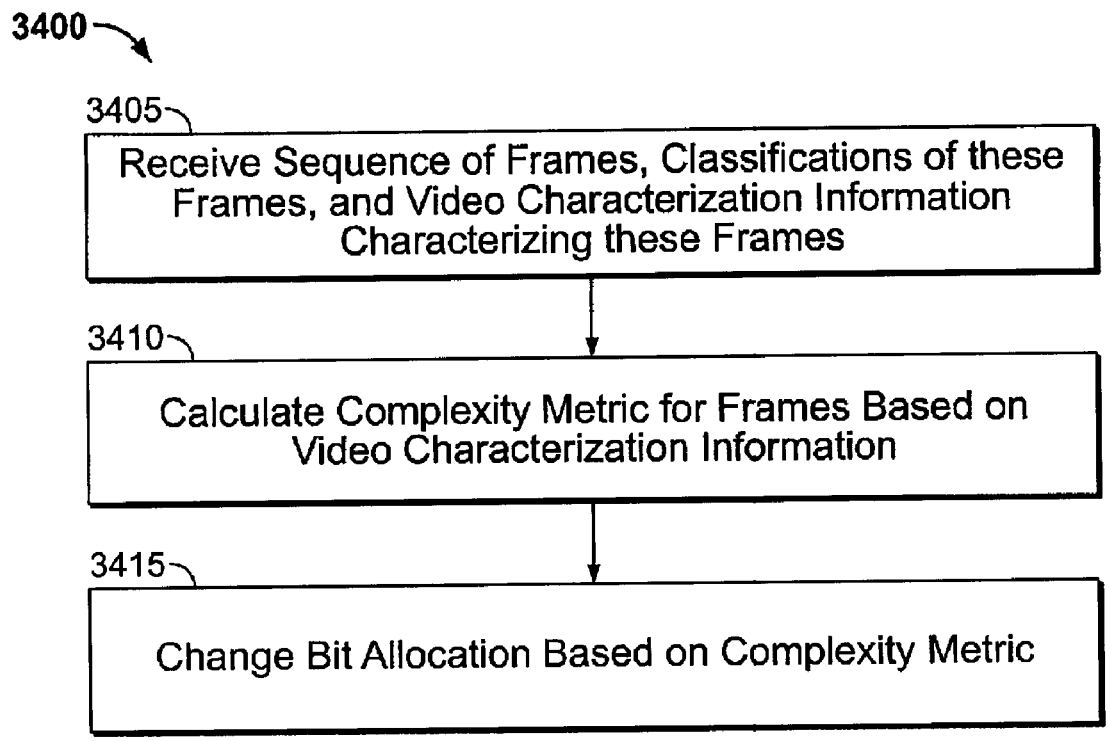
FIGS. 34-40 are flowcharts of example processes for video coding.

FIG. 34 is a flowchart of a process 3400 for video coding. The system performing process 3400 receives a sequence of frames, classifications of these frames, and video characterization information that characterizes these frames at 3405.

The video characterization information can include information characterizing the motion-compensated prediction error metric and source variance for the frames in the sequence. In some implementations, such information can be determined by a spatial analysis module such as spatial analysis module 505 (FIGS. 5, 8).

The system performing process 3400 can calculate a complexity metric for the frames based on the video characterization information at 3410. A complexity metric is a parameter that embodies the complexity of the frames in the sequence. A complexity metric can be calculated based on, e.g., the motion-compensated prediction error metric and source variance for the frames in the sequence. For example, in some implementations, the complexity metric is the motion-compensated prediction error metric (e.g., SAD) of the current frame compared to the motion-compensated prediction error metric of a closest preceding reference. In other implementations, the complexity metric is the weighted average of the motion-compensated prediction error metric for the current picture compared to the motion-compensated prediction error metrics of all of the references of the current picture.

The system performing process 3400 can change the bit allocation to frames based on the complexity metric for the frames at 3415. In particular, frames that are more complex can be allocated increased numbers of bits and frames that are less complex can be allocated reduced numbers of bits.

Figure 35:
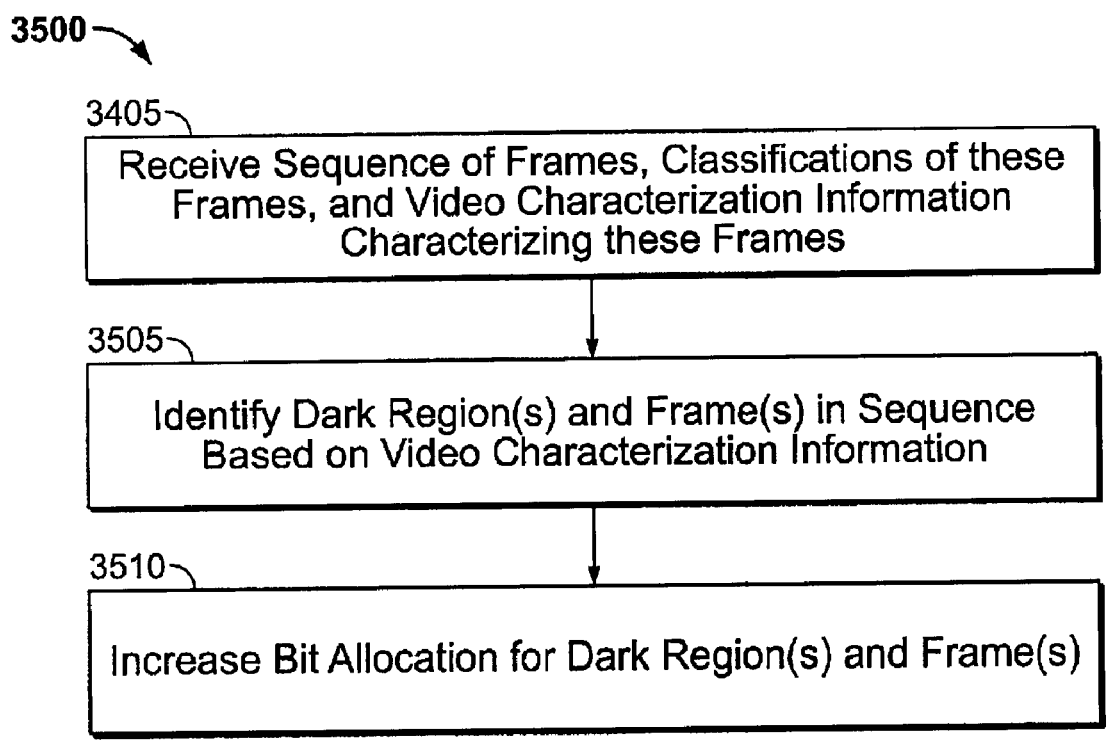

FIG. 35 is a flowchart of a process 3500 for video coding. The system performing process 3500 receives a sequence of frames, classifications of these frames, and video characterization information that characterizes these frames at 3405. The video characterization information can include luminance parameters that characterize the luminance of regions and frames in the sequence. In some implementations, such information can be determined by a luminance/color analysis module such as luminance/color analysis module 705 (FIGS. 7, 8).

The system performing process 3500 can identify one or more dark regions and frames based on the video characterization information at 3505. A dark region is a region within a frame that is darker than a threshold or darker than the remainder of the frame. A dark frame is a frame that is darker than a threshold or darker than the remainder of the frames in a sequence. Dark regions and frames can be identified based on luminance parameters. The system performing process 3500 can increase the bit allocation for any identified dark regions and frames at 3510.

Figure 36:
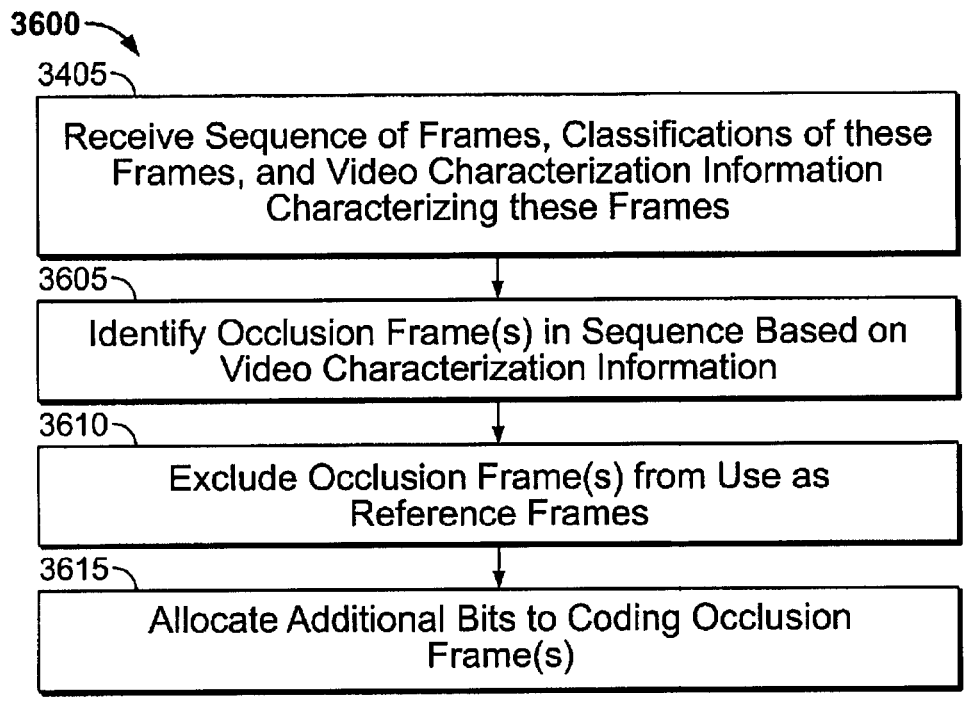

FIG. 36 is a flowchart of a process 3600 for video coding. The system performing process 3600 receives a sequence of frames, classifications of these frames, and video characterization information that characterizes these frames at 3405. The video characterization information can include SAD or other prediction error metrics for the frames in the sequence. In some implementations, these prediction error metrics can be determined by a MEMC framework module such as MEMC framework module 105 (FIGS. 1, 8).

The system performing process 3600 can identify one or more occlusion frames in the sequence of frames based on the video characterization information at 3605. Occlusion frames are frames where one or more objects temporarily occludes one or more other objects or areas in a frame. Occlusion frames can arise, e.g., when different objects have different movement vectors during a sequence of frames. Occlusion frames associated with occlusion, as discussed above.

The system performing process 3600 can exclude the occlusion frames from use as reference frames at 3610 and increase the bit allocation for coding the occlusion frames at 3615.

Figure 37:
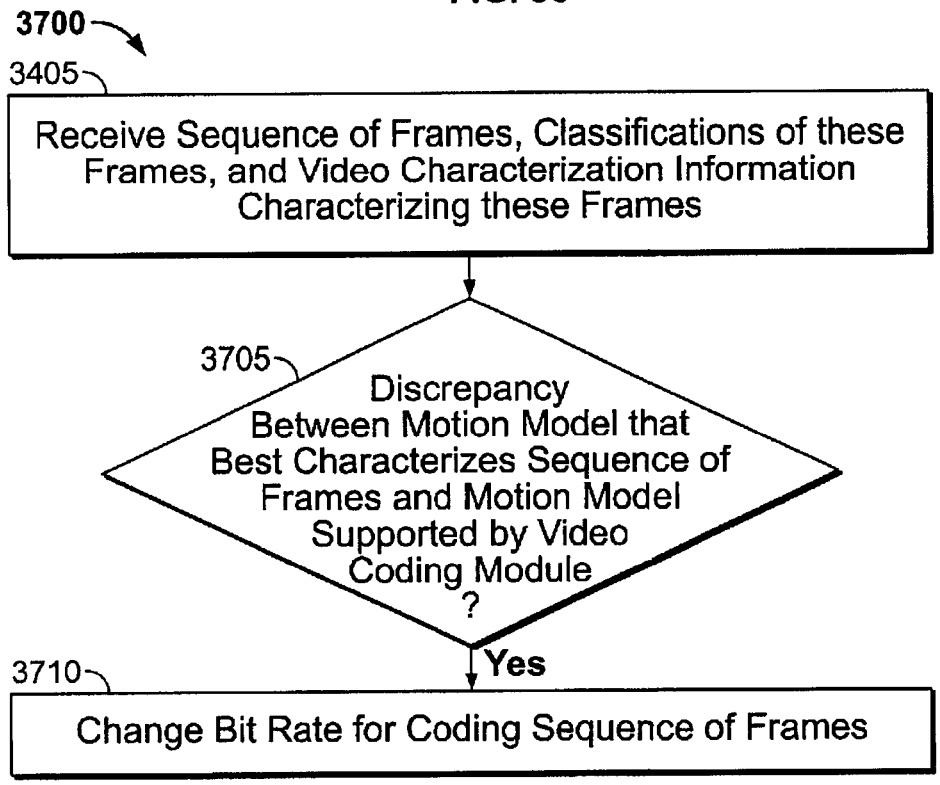

FIG. 37 is a flowchart of a process 3700 for video coding. The system performing process 3700 receives a sequence of frames, classifications of these frames, and video characterization information that characterizes these frames at 3405. The video characterization information can include a variety of prediction error metrics, such as the SAD, for the frames within the sequence, which can be computed based on a variety of motion and spatial analysis models. In some implementations, these prediction error metrics can be determined by a MEMC framework module such as MEMC framework module 105 (FIGS. 1, 8). In other implementations, the prediction error metrics can be pre-computed and provided through external mechanisms such as metadata. In other implementations, a transcoding architecture may include a second video encoding module to re-encode a previously encoded video. In such implementations, the prediction error metrics can be derived directly from the bit stream, e.g., by analyzing the motion and residual information within the bit stream or in combination with metadata and/or an additional information provided by a MEMC framework module.

The system performing process 3700 can determine if there is a discrepancy between which of two or more motion models best characterizes the motion in the sequence of frames and a motion model supported by a video coding module at 3705. Examples of motion models include affine motion models, translational motion models, and higher order motion models.

If the system performing process 3700 determines that there is a discrepancy, then the system can change the allocated bit rate for coding the sequence of frames at 3710.

Figure 38:
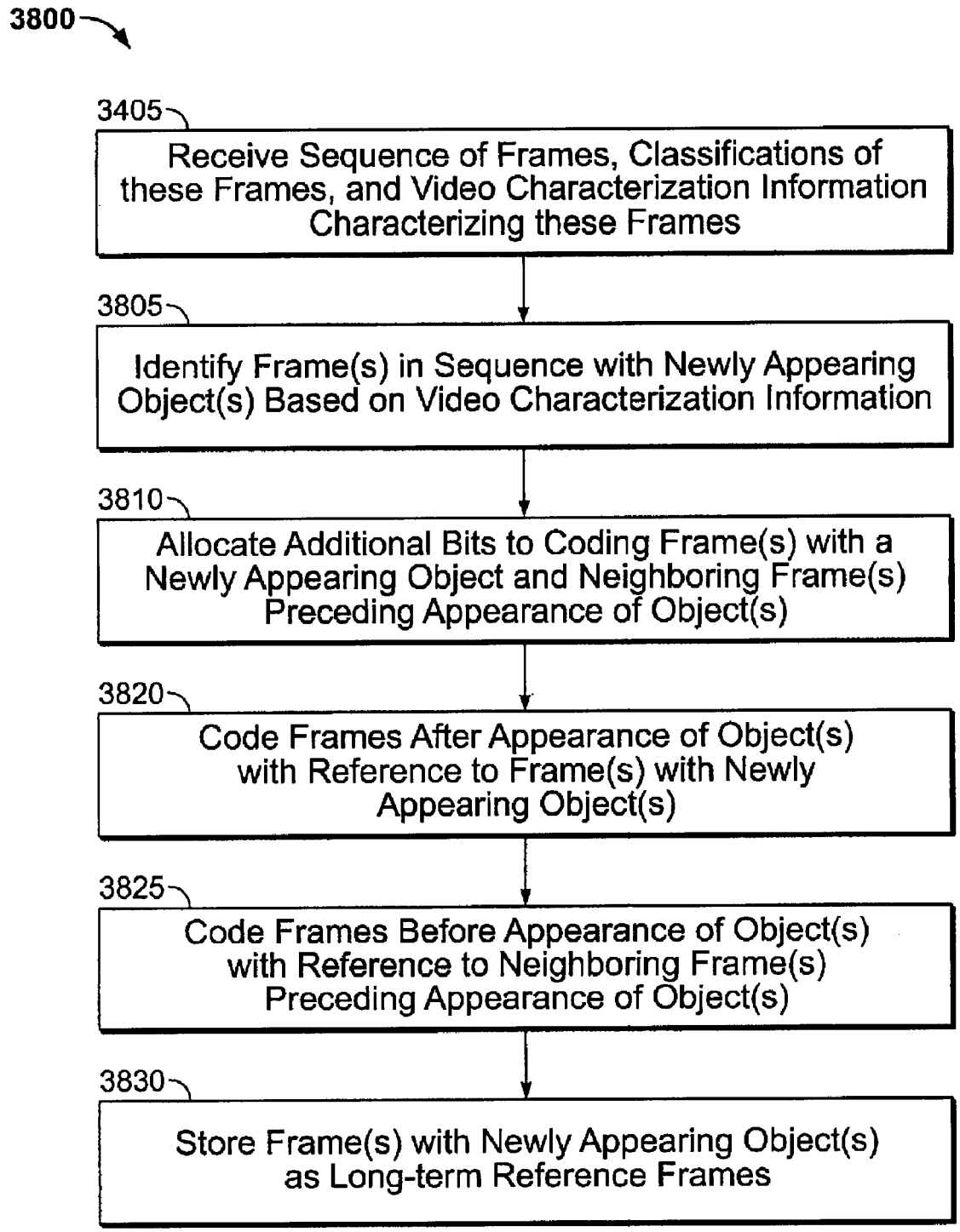

FIG. 38 is a flowchart of a process 3800 for video coding. The system performing process 3800 receives a sequence of frames, classifications of these frames, and video characterization information that characterizes these frames at 3405. The video characterization information can include SAD or other prediction error metrics for the frames in the sequence. In some implementations, these prediction error metrics can be determined by a MEMC framework module such as MEMC framework module 105 (FIGS. 1, 8).

The system performing process 3800 can identify one or more frames in the sequence of frames that include one or more newly appearing objects based on the video characterization information at 3805. Frames that include a newly appearing object can be identified based on, e.g., the increases in SAD or other prediction error metrics associated with the appearance of the object.

The system performing process 3800 can increase the bit allocation for coding the frames that include newly appearing objects and for neighboring frames that precede such frames at 3810. In some implementations, the preceding neighboring frames immediately precede the frames that include newly appearing objects. The system performing process 3800 can code frames after the appearance of objects with reference to the frames that include the newly appearing objects at 3815. The system performing process 3800 can code frames before the appearance of objects with reference to the preceding neighboring frames at 3820.

Figure 39:
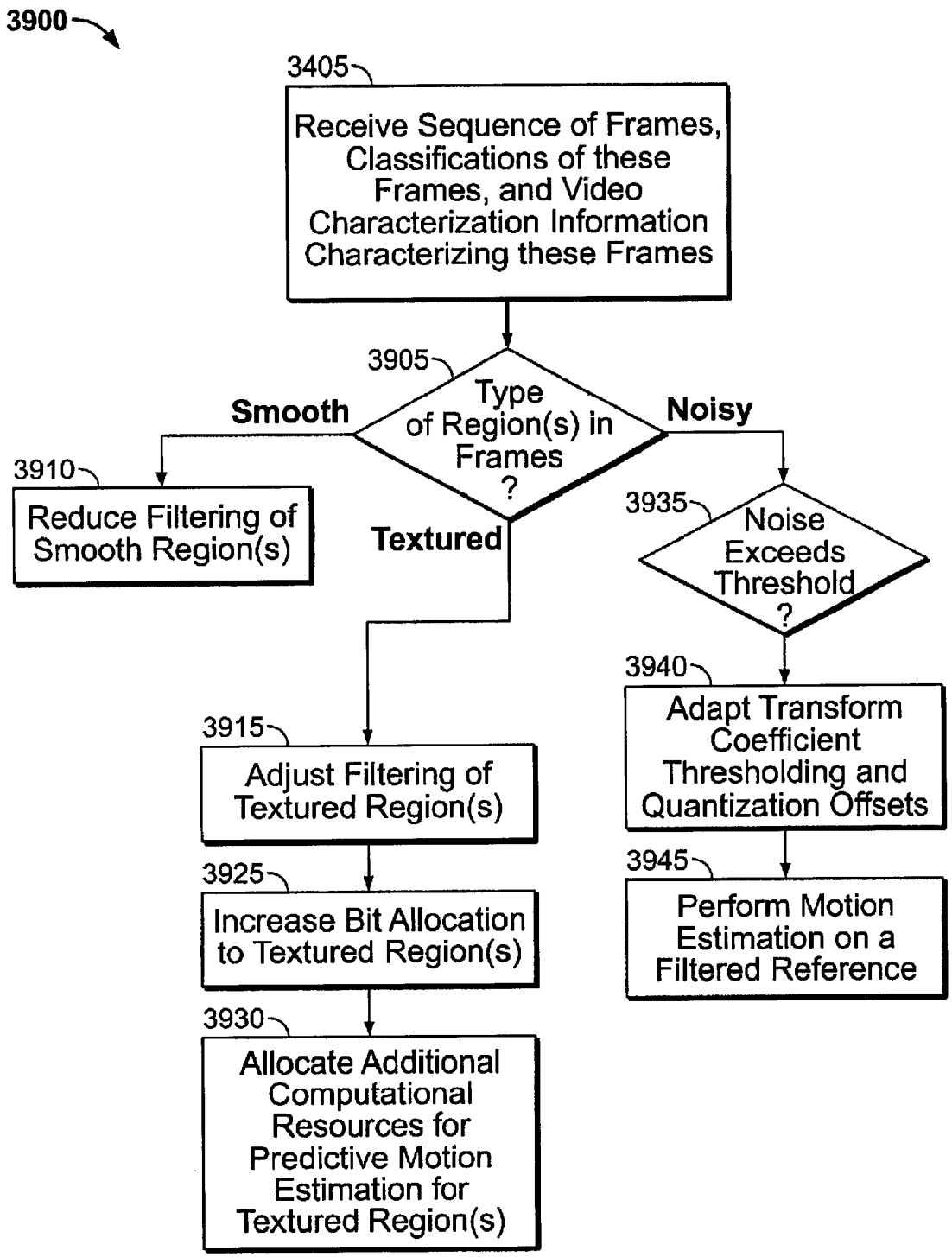

The system performing process 3800 can also optionally store the frames that include the newly appearing object as long-term reference frames at 3830. In some implementations, the preceding neighboring frames can also be stored as long-term reference frames since they may provide information about the background which could be covered by the new object FIG. 39 is a flowchart of a process 3900 for video coding. The system performing process 3900 receives a sequence of frames, classifications of these frames, and video characterization information that characterizes these frames at 3405. The video characterization information can include texture information. In some implementations, the texture information can be determined by a spatial analysis module such as spatial analysis module 505 (FIG. 5).

The system performing process 3900 can determine if one or more regions in the frames in the sequence belong to certain types of regions based on the video characterization information at 3805. For example, the system can determine if one or more regions in the frames in the sequence are smooth regions, textured regions, or noisy regions. For example, if a block has low variance or only contains low amplitude, low frequency coefficients (which can be determined using a DCT-based frequency analysis), then the block can be classified as a smooth region. On the other hand, spatially active, textured regions are regions that are characterized by a consistent and usually structured texture pattern and can be classified as having moderate to high variance and frequency characteristics. Noisy regions are regions that are characterized by random, noisy patterns that appear to be unrelated to the actual signal (i.e., true objects) within a scene. Noisy regions can be classified using techniques such as Wiener and Kalman filtering but also through the use of motion compensated prediction. In particular, noisy regions tend not to be temporally correlated, unlike smooth and to some extend texture regions. Therefore, areas with high motion compensated prediction error are more likely to belong to a noisy region and therefore, given also their spatial characteristics, can be classified as such.

If the system performing process 3900 determines that one or more regions in the frames are smooth regions, then the system can reduce the filtering of those regions at 3910. A reduction in the filtering can include increasing the weighting of the original frame in a motion compensated temporal filtering architecture like 105, or through the use of a higher bandwidth filter.

If the system performing process 3900 determines that one or more regions in the frames are textured regions, then the system can adjust the filtering of the textured regions at 3915. For example, the filtering of textured regions can be adjusted so that the details of those textured regions are preserved. This can be done by increasing the weighting of the original frame in a motion compensated temporal filtering architecture like 105, or through the use of a higher bandwidth filter. Examples of filters that can be adjusted include linear filters (e.g., Gaussian smoothing), non-linear (e.g., median) filters, and other filters such as filters based on wavelets, morphological processing, and the like.

The system performing process 3900 can also increase the allocation of bits to code the textured regions at 3925 and allocate additional computational resources to predictive motion estimation for the textured regions at 3930.

If the system performing process 3900 determines that one or more regions in the frames are noisy regions, then the system can determine if the noise exceeds a threshold at 3935. If the system determines that the noise does exceed the threshold, then the system can adapt the transform coefficient thresholding and quantization offsets at 3940. Transform coefficient thresholding is a process that determines whether a transform coefficient is adjusted or dropped (i.e., set to 0) if too costly to preserve. Quantization offsets are parameters considered during transform and quantization that determine whether a coefficient during quantization should be rounded up or down. Transform coefficient thresholding and quantization offsets can be increased or decreased depending on the scene or region type and other parameters such as the quality or bit rate target. If, for example, a block is characterized as high texture, then it may be desirable to increase the thresholding parameters and/or reduce the quantization offsets in an effort to increase the compressibility of this block. On the other hand, it may be desirable to keep details of a smooth block as accurately as possible, and therefore decrease or disable the thresholding parameters and/or increase the quantization offset in an effort to improve the subjective/perceived quality of this block.

The system performing process 3900 can also perform motion estimation on a filtered reference at 3945. A filtered reference is a collection of video information that has been filtered to reduce the noise. A filtered reference can be filtered by using a linear (e.g., Gaussian smoothing) or non-linear filter (e.g., Median filtering). In implementations where motion estimation is performed by a remote MEMC framework module such as MEMC framework module 105 (FIG. 1), the performance of motion estimation of a filtered reference can include the provision of feedback 2215 from video coding module 2205 to decision module 110. Decision module 110 can, in turn, instruct MEMC framework module 105 to filter video information prior to performing motion estimation.

Figure 40:
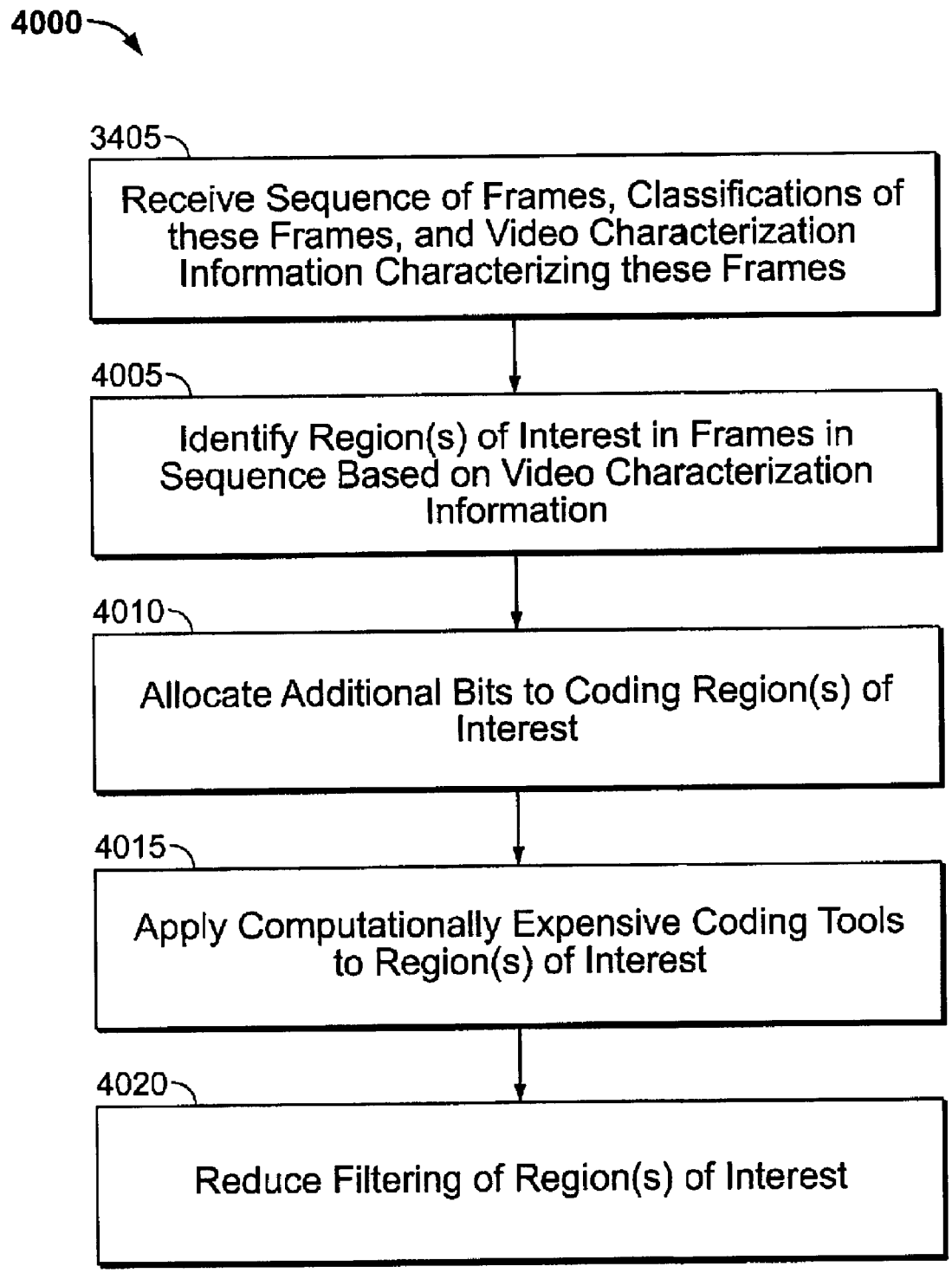

FIG. 40 is a flowchart of a process 4000 for video coding. The system performing process 4000 receives a sequence of frames, classifications of these frames, and video characterization information that characterizes these frames at 3405. The video characterization information can include descriptions of the texture or motion characteristics of a block, including motion and illumination change characteristics, luminance and chrominance intensity, variance, texture characterization, and the like. In some implementations, these block descriptors can be determined by a MEMC framework module such as MEMC framework module 105 (FIGS. 1, 8).

The system performing process 4000 can identify one or more within one or more frames from a sequence of frames as regions of interest based on the video characterization information at 4005. Regions of interest are regions in a frame that are more relevant to the visual quality of the frame from a viewer's perspective than other regions. A region of interest can be identified based on, e.g., the frequency of the region's use as a motion-compensated prediction block.

The system performing process 4000 can increase the bit allocation for coding the regions of interest at 4010. The system performing process 4000 can also apply computationally expensive coding tools to the regions of interest at 4015. A computationally expensive coding tool is a coding technique that requires increased computational resources but may result in improved coding efficiency/performance. Examples of computationally expensive coding tools include weighted prediction and bi-predictive motion estimation with multiple iterations.

In implementations where prediction and motion estimation are performed by a remote MEMC framework module such as MEMC framework module 105 (FIG. 1), the application of computationally expensive coding tools can include the provision of feedback 2215 from video coding module 2205 to decision module 110. Decision module 110 can, in turn, instruct MEMC framework module 105 to apply computationally expensive coding tools to the regions of interest.

The system performing process 4000 can also reduce the filtering of the regions of interest at 4020. A reduction in the filtering can include the use of a higher bandwidth filter within the pre-processing stage, and/or the reduction in the strength of an in-loop deblocking filter in a video coding module such as video coding module 2205 (FIG. 22).

In some implementations, the systems and techniques described herein can be used in conjunction with a rate control scheme. Rate control is a mechanism by which the bit target is achieved during coding of a frame. In particular, a compressed bit stream may be able to satisfy specific bandwidth constraints that are imposed by the transmission or targeted medium through rate control. Rate control algorithms can try to vary the number of bits allocated to each frame so that the target bit rate is achieved while maintaining visual quality.

Let $p_{adapt}$ denote an adaptation period. If a sequence of frames or regions is static, the bits allocated to a picture can be temporarily increased every $p_{adapt}$ pictures. For example, in some implementations, the quantization parameter (QP) value can be modified with the modifier $QP_{adapt}^{init}$ every $P_{adapt}$ pictures, which has a negative value. The remaining $P_{adapt}-1$ frames from each sequence can receive fewer bits than the adapted pictures. For example, in some implementations, a QP modifier of $QP_0^{init}$, which can be equal to or larger than $QP_{adapt}^{init}$, can be used Compression efficiency can thereby be improved for static or low motion scenes and can be applied exclusively to regions of interest. For example, a picture sequence can be segmented into a high-motion and low-motion region. This technique can be used to improve bit allocation for a low-motion region. However, use of this approach in a high motion scene or region can reduce performance. In particular, the limited correlation between consecutive pictures can waste any additional bits that are allocated to the first frame in the sequence, since the first frame will rarely be referenced by subsequent frames.

To address this issue, frames and/or regions can be analyzed to determine whether certain frames and/or regions should be allocated additional bits. Consequently, the sum of the period value and the number of pictures for which classification decisions are made can be held lower than a sliding window picture buffer length $p_{adapt}+n_{dec.w.}<n_{ref}$. This ensures that the sliding window is large enough so that decision whether or not to allocate additional bits within the window can be based on a look-ahead of $P_{adapt}$ frames. If hierarchical coding structures are used to code the image sequence, then the period $p_{adapt}$ can be constrained to be a multiple of the period between frames of the highest priority level (hierarchical period $p_{hier}$) If all frames have the same priority level then $p_{heir}=1$. The same constraint can also be applied to parameter $n_{dec.w.}$. Moreover, the frames that are allocated additional bits, e.g., by modifying their QPs with $QP_{adapt}^{init}$, can be constrained to lie on the highest priority level.

Figure 41:
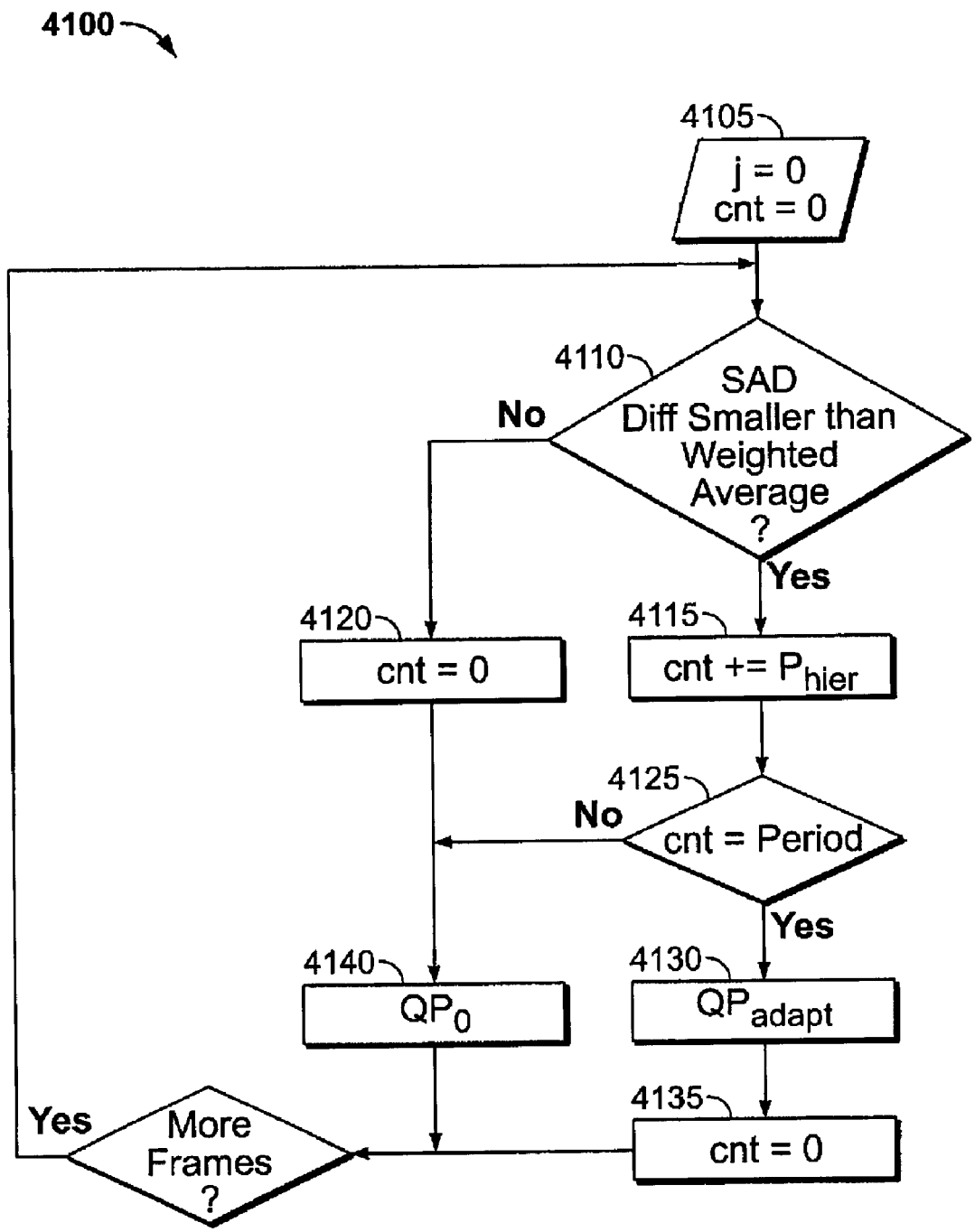
FIG. 41 is a flowchart of an example process for rate control.

FIG. 41 is a flowchart of a process 4100 for rate control. The system performing process 4100 can set a counter $cnt_{adapt}$ to zero at the beginning of the image sequence at 4105. Further, counter $cnt_{adapt}$ can be repeatedly zeroed out every time the bits allocated to a frame are increased temporarily. In some implementations, the bit allocation can be increased by modifying the QP of a frame with the $QP_{adapt}^{init}$ value. The system performing process 4100 can increment the $cnt_{adapt}$ counter by $p_{hier}$ at 4115 every time that the system determines that the absolute difference of the motion-compensated SAD is smaller than a threshold at 4110. For example, the threshold can be the product of a constant and a weighted combination of the short-term and long-term SAD averages:

$$|SAD(j)-SAD(j-p_{heir})|<t_{static} \times (\alpha \times SAD_{ave}^{long-term}+\beta \times SAD_{ave}^{short-term})$$ Equation 24

In some implementations, $\alpha=0.5$ and, $\beta=0.5$. However, these vales can be changed based on the use of a hierarchical coding structure. In implementations where bits are allocated to regions, the SAD's include blocks belonging to the specific region.

If the system performing process 4100 determines that condition of Equation 24 is not satisfied, the cnt$_{adapt}$ counter can be zeroed out at 4120 to reflect an insufficient number of temporally correlated pictures or regions that follow the frame under consideration (j-p$_{adapt}$). If the system performing process 4100 determines that the condition of Equation 24 is satisfied, the system can increment counter cnt$_{adapt}$ by p$_{hier}$ at 4115.

The system performing process 4100 can also determine whether the counter has reached the value p$_{adapt}$ at 4125. If the system performing process 4100 determines that the counter has reached the value p$_{adapt}$, then the system can temporarily increase the number of bits allocated to frame j-p$_{adapt}$ (e.g., by modifying the QP value of frame j-p$_{adapt}$ with QP$_{adapt}^{init}$) at 4130 and zero out the counter cnt$_{adapt}$ at 4135. Otherwise, the system performing process 4100 can assign fewer bits (e.g., by assigning the QP modifier value QP$_0^{init}$ to the frame) at 4140. The motion-compensated SAD can be derived using a MEMC framework module such as MEMC framework module 105. Other error metrics can also be used. The short-term average can be used to adapt the decision threshold to the local scene statistics and is given by:

$$SAD_{ave}^{short-term} = \sum_{i=j-n_{ref}+1}^{j} SAD^{j-p_{hier}}(j) \qquad \text{Equation 25}$$

where the long-term MAD is given by:

$$SAD_{ave}^{short-term} = \sum_{i=0}^{j} SAD^{j-p_{hier}}(j). \qquad \text{Equation 26}$$

The threshold $t_{static}$ is a floating-point number. In some implementations, $t_{static}$ has a value of around 0.15. In some implementations, the QP modifier QP$_{adapt}^{init}$ can be adapted to local region or scene statistics. The adaptation algorithm can take into account temporal, spatial, and luminance information. For example, (a) Temporal correlation can be considered by evaluating the SAD error magnitude. The larger the error magnitude is the fewer additional bits are allocated. In some implementations, the modifier QP$_{adapt}^{init}$ becomes smaller since large SAD denotes large motion.

(b) Spatial complexity can be considered by evaluating the spatial variance. Again, the larger the error magnitude is the fewer additional bits are allocated. In some implementations, the modifier QP$_{adapt}^{init}$ becomes smaller.

(c) High luminance masks compression artifacts and the number of additional bits can be reduced by e.g. reducing the modifier. Darker scenes though are prone to more compression artifacts and the number of additional bits can be increased by e.g. increasing the value of the modifier.

Example Systems

Figure 42:
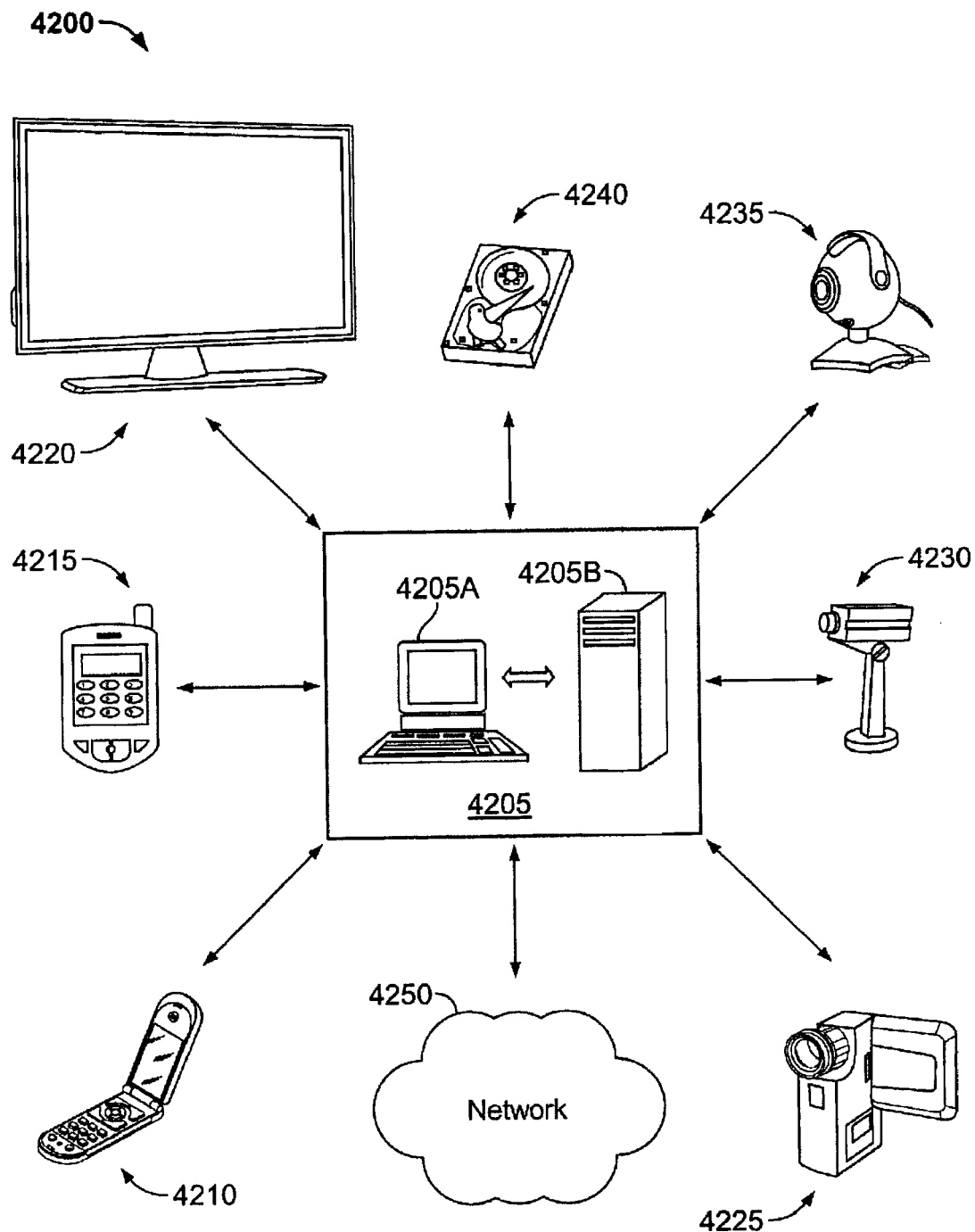
FIG. 42 is an example of a system.

FIG. 42 depicts an example of a system that can employ any (or any combination) of the techniques described herein. The techniques can be used on one or more computers 4205A, 4205B. One or more methods (e.g., algorithms/processes) herein can be implemented with, or employed in computers and/or video display 4220, transmission, processing, and playback systems. The computers described herein may be any kind of computer, either general purpose, or some specific purpose computer such as a workstation. The computer 4205B may be, e.g., an Intel or AMD based computer, running Windows XP™, Vista™, or Linux™, or may be a Macintosh computer. An embodiment may relate to, e.g., a handheld computer, such as a PDA 4215, cell phone 4215, or laptop 4205A. The computer may also refer to machines or parts of a machine for image recording or reception 4225, 4230, 4235, processing, storage 4240, and distribution of data, in particular video data.

Any combination of the embodiments described herein may be part of a video system and its components. Any combination of the embodiments may be part of a video encoder and/or part of the example video systems and/or part of the components/modules depicted in any of the figures. Any combination of the embodiments may be implemented in hardware and/or software. For example, any of the embodiments may be implemented with a computer program.

Computer and/or graphic programs may be written in C or Python, or Java, Brew or any other programming language. The programs may be resident on a storage medium, e.g., magnetic or optical, e.g., the computer hard drive, a removable disk or media such as a memory stick or SD media, wired or wireless network based or Bluetooth-based (or other) Network Attached Storage (NAS), or other fixed or removable medium. The programs may also be run over a network 4250, for example, with a server or other machine sending communications to the local machine, which allows the local machine to carry out the operations described herein. The network may include a storage area network (SAN).

Although only a few embodiments have been described in detail above, other embodiments are possible. It should be appreciated that embodiments of the present invention may encompass equivalents and substitutes for one or more of the example techniques described herein. The present specification describes specific examples to accomplish a more general goal in another way. This description should be understood to represent example embodiments and the claims following are intended to cover any equivalent, modification, or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 4240, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes,and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 4220, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

A number of implementations have been described. Nevertheless, it will be understood that various modifications may be made. For example, motion estimation can be performed using reference frames selected based on criteria other than temporal distance, such as similarity to a current frame. For example, in some implementations, motion estimation and/or motion compensation can be performed on previously filtered frames. Reference frames can be spatially filtered or spatio-temporal filtered. In some implementations, frames can be filtered multiple times prior to use as reference frames. The input sequence of frames can be filtered using cascaded sequential filters. In some implementations, a deblocking filter can be followed by a low-pass filter and an enhancement filter. The first filter can reduce blocking artifacts, the second one can reduce noise, and the final one can enhance details that may have been attenuated by the first two filters. In some implementations, the filters can be applied in parallel and their outputs combined in a linear or non-linear fashion. In some implementations, combinations of parallel and cascaded filters can be used. In these cases, the output of one filtering arrangement can be used as the input to another filtering arrangement.

As another example, in some implementations, a de-blocking filter can be applied to prediction frames. For example, de-blocking filters can be applied to reduce blocking artifacts (i.e., unwanted boundary artifacts). In some implementations, a de-blocking filter is applied only to a final prediction frame. In other implementations, a de-blocking filter is applied to one or more the preliminary prediction frames. The application of de-blocking filters to preliminary prediction frames may be especially beneficial if different motion models are used to arrive at the preliminary prediction frames.

As another example, video coding module 2205 can receive video characterization information 3305 from one or more devices other than decision module 110. For example, in some implementations, video coding module 2205 can receive video characterization information 3305 directly from one or more of modules 105, 505, 705.

Enumerated Example Embodiments

Some embodiments may relate to one or more of the example embodiments enumerated below.

1. A method comprising:
   receiving video information;
   classifying one or more frames in the received video information as a scene;
   adjusting one or more coding parameters based on the classification of the frames; and
   coding the video information in accordance with the adjusted coding parameters.
2. The method of enumerated example embodiment 1, wherein classifying the one or more frames comprises classifying the frames as one or more of a camera zoom scene or a fade scene.
3. The method of enumerated example embodiment 2, wherein classifying the one or more frames comprises classifying the frames as a cross-fade scene.
4. The method of enumerated example embodiment 1, wherein classifying the one or more frames comprises classifying the frames as a flash scene.
5. The method of enumerated example embodiment 3, wherein classifying the one or more frames as the flash scene comprises identifying a low prediction errors between frames preceding the flash scene and frames subsequent to the flash scene.
6. The method of enumerated example embodiment 1, wherein adjusting one or more coding parameters comprises specifying that certain frames be coded as intra-coded frames.
7. The method of enumerated example embodiment 1, wherein:
   classifying one or more frames comprises identifying at least one of a start frame and an end frame of the scene; and
   adjusting the one or more coding parameters comprises specifying that the at least one of the start frame and the end frame be coded as intra-coded frames.
8. The method of enumerated example embodiment 7, wherein adjusting one or more coding parameters further comprising specifying that interior frames in the scene be coded with reference to the at least one of the start frame and the end frame.
9. A method comprising:
   receiving video information;
   performing motion estimation and compensation on the video information to generate a collection of motion estimation and compensation parameters; and
   classifying one or more frames in the video information as a scene based on the motion estimation and compensation parameters.
10. The method of enumerated example embodiment 9, wherein classifying the one or more frames comprises classifying the one or more frames as a pan scene based on a component of a representative motion estimation and compensation parameter.
11. The method of enumerated example embodiment 9, wherein classifying the one or more frames comprises:
    identifying motion vectors for blocks in two or more frames;
    determining that the motion vectors for the blocks are relatively small in magnitude;
    determining that the motion vectors for blocks are correlated in direction and continuous over successive frames; and
    classifying the two or more frames as a camera zoom scene.
12. The method of enumerated example embodiment 9, wherein classifying the one or more frames as a scene comprises:
    comparing a prediction error metric for a current frame with a threshold; and
    identifying a scene change based on the prediction error metric for the current frame exceeding the threshold.
13. The method of enumerated example embodiment 12, wherein comparing the prediction error metric for the current frame with the threshold comprises:
    comparing the prediction error metric for the current frame with a long term threshold relating to prediction error metric over a relatively large number of frames; and
    comparing the prediction error metric for the current frame with a short term threshold relating to prediction error metric over a relatively small number of frames.
14. The method of enumerated example embodiment 12, wherein comparing the prediction error metric for the current frame with the threshold comprises comparing a difference in prediction error metric for a current frame and an adjacent frame with a threshold.
15. The method of enumerated example embodiment 9, further comprising changing a bit rate for coding the frames based on a lack of support for a motion model by a video encoding module.
16. The method of enumerated example embodiment 15, wherein changing the motion estimation and compensation parameters comprises excluding certain frames from use as reference frames.
17. The method of enumerated example embodiment 15, wherein changing the motion estimation and compensation parameters comprises changing a weight of a preliminary prediction frame in a final prediction frame.
18. The method of enumerated example embodiment 15, wherein changing the motion estimation and compensation parameters comprises allocating additional computational resources to predictive motion estimation.
19. The method of enumerated example embodiment 9, further comprising:
    adjusting one or more coding parameters based on the scene classifications; and
    coding frames in the scene in accordance with the adjusted coding parameters.
20. The method of enumerated example embodiment 19, wherein adjusting one or more coding parameters comprises specifying that certain frames be coded as intra-coded frames.
21. The method of enumerated example embodiment 19, wherein adjusting one or more coding parameters comprises increasing a bit allocation for coding the scene.

22. A method comprising:
  receiving video information;
  classifying a region in one or more frames in the received video information, wherein the region is smaller than the frame in which the region appears;
  adjusting one or more coding parameters based on the classification of the region; and
  coding the region in accordance with the adjusted coding parameters.
23. The method of enumerated example embodiment 22, wherein adjusting one or more coding parameters comprises increasing a bit allocation for coding the region.
24. The method of enumerated example embodiment 22, wherein adjusting one or more coding parameters comprises reducing filtering of the region.
25. The method of enumerated example embodiment 22, wherein classifying the region comprises classifying the region as a dark region.
26. The method of enumerated example embodiment 25, further comprising increasing a bit allocation for coding the dark region.
27. A method comprising:
  receiving video information;
  identifying a scene change in the received video information;
  classifying a scene based on a discrepancy between a prediction error with weighted prediction and a prediction error without weighted prediction; and
  making a classification of the scene available.
28. A method comprising:
  receiving video information;
  identifying a scene change in the received video information;
  classifying a scene based on a position of the scene change; and
  making a classification of the scene available.
29. The method of enumerated example embodiment 28, further comprising making a fingerprint of the video information using the classification of the scene.
30. The method of enumerated example embodiment 28, further comprising adjusting coding parameters used in coding the video information based on the classification of the scene.
31. The method of enumerated example embodiment 28, wherein classifying the scene comprises classifying the scene based on feedback from an encoding module.
32. The method of enumerated example embodiment 28, wherein identifying the scene change comprises:
  identifying a fade scene; and
  classifying a frame at an end of the fade scene as a scene change.
33. The method of enumerated example embodiment 28, wherein identifying the scene change comprises detecting a fade scene based on weighted prediction parameters from reference frames preceding a current frame and weighted prediction parameters from reference frames subsequent to the current frame.
34. The method of enumerated example embodiment 28, wherein identifying the scene change comprises:
  identifying that a current scene includes a flash; and
  excluding the current scene from being identified as a scene change based on the identification that the current scene includes the flash.
35. A method comprising:
  receiving a characterization of luminance in a sequence of frames of video information;
  classifying one or more frames in the sequence of frames as a scene based on the characterization of the luminance; and
  making one or more scene classifications available.
36. The method of enumerated example embodiment 35, wherein classifying the one or more frames comprises classifying the one or more frames as a fast fade or a slow fade based on an amount of change in the luminance between the one or more frames.
37. The method of enumerated example embodiment 35, further comprising:
  adjusting one or more coding parameters based on the scene classifications; and
  coding the video information in accordance with the adjusted coding parameters.
38. The method of enumerated example embodiment 37, wherein:
  classifying the one or more frames comprises classifying the one or more frames as a dark scene; and
  coding the video information comprises increasing a bit allocation to the dark scene based.
39. A method comprising:
  receiving a sequence of frames of video information;
  determining dominant motion vectors for each of the frames in the sequence; and
  identifying a scene change based on the dominant motion vectors of the frames in the sequence.
40. The method of enumerated example embodiment 39, wherein determining the dominant motion vectors comprises:
  forming a multi-dimensional motion vector histogram that embodies frequencies with which motion vectors appear; and
  selecting the dominant motion vectors based on the frequency at which motion vectors appear in the histogram.
41. A method comprising:
  receiving a characterization of luminance in a sequence of frames of video information;
  based on the characterization of the luminance, identifying one or more of the frames in the sequence as including a flash; and
  excluding the frames including the flash from use as motion-compensation reference frames.
42. A system comprising:
  a motion estimation and motion prediction module to generate a collection of parameters characterizing motion in a collection of video information; and
  a decision module to classify one or more scenes in the collection of video information based at least in part on the parameters characterizing the motion in the collection of video information.
43. The system of enumerated example embodiment 42, wherein:
  the system further comprises a luminance module to generate a collection of parameters characterizing luminance in the collection of video information; and
  the decision module is to classify the one or more scenes based at least in part on the parameters characterizing the luminance in the collection of video information.
44. The system of enumerated example embodiment 42, wherein:
  the system further comprises a spatial analysis module to generate a collection of parameters characterizing texture and edge effects in the collection of video information; and the decision module is to classify the one or more scenes based at least in part on the parameters characterizing the texture and edge effects in the collection of video information.

45. The system of enumerated example embodiment 42, further comprising a data path to carry feedback from the decision module to the motion estimation motion prediction module.

46. The system of enumerated example embodiment 42, further comprising a video fingerprinting module to generate a video fingerprint of the collection of video information based at least in part on the classifications of the one or more scenes.

47. The system of enumerated example embodiment 42, further comprising a coding module to generate coded video information based at least in part on the classifications of the one or more scenes.

48. The system of enumerated example embodiment 47, further comprising a data path to carry feedback from the coding module to the motion estimation motion prediction module.

49. A computer program product, tangibly encoded on a computer-readable medium, comprising instructions to cause data processing apparatus to perform video coding operations, the operations comprising:
receiving video information;
classifying one or more frames in the received video information as a scene;
adjusting one or more coding parameters based on the classification of the frames; and
coding the video information in accordance with the adjusted coding parameters.

50. The product of enumerated example embodiment 49, wherein classifying the frames comprises instructions for classifying the frames as one or more of a camera zoom scene or a fade scene.

51. The product of enumerated example embodiment 50, wherein classifying the frames comprises instructions for classifying the frames as a cross-fade scene.

52. The product of enumerated example embodiment 49, wherein classifying the frames comprises instructions for classifying the frames as a flash scene.

53. The product of enumerated example embodiment 52, wherein classifying the frames as the flash scene comprises instructions for identifying a low prediction errors between frames preceding the flash scene and frames subsequent to the flash scene.

54. The product of enumerated example embodiment 49, wherein adjusting one or more coding parameters comprises instructions for specifying that certain frames be coded as intra-coded frames.

55. The product of enumerated example embodiment 49, wherein:
classifying one or more frames comprises instructions for identifying at least one of a start frame and an end frame of the scene; and
adjusting the one or more coding parameters comprises instructions for specifying that the at least one of the start frame and the end frame be coded as intra-coded frames.

56. The product of enumerated example embodiment 49, wherein the instructions for adjusting one or more coding parameters further comprises instructions for specifying that interior frames in the scene be coded with reference to the at least one of the start frame and the end frame.

57. A computer program product, tangibly encoded on a computer-readable medium, comprising instructions to cause data processing apparatus to perform video coding operations, the operations comprising:
receiving video information;
performing motion estimation and compensation on the video information to generate a collection of motion estimation and compensation parameters; and
classifying one or more frames in the video information as a scene based on the motion estimation and compensation parameters.

58. The product of enumerated example embodiment 57, wherein classifying the one or more frames comprises instructions for classifying the one or more frames as a pan scene based on a component of a representative motion estimation and compensation parameter.

59. The product of enumerated example embodiment 57, wherein classifying the one or more frames comprises instructions for:
identifying motion vectors for blocks in two or more frames;
determining that the motion vectors for the blocks are relatively small in magnitude;
determining that the motion vectors for blocks are correlated in direction and continuous over successive frames; and
classifying the two or more frames as a camera zoom scene.

60. The product of enumerated example embodiment 57, wherein classifying the one or more frames as a scene comprises instructions for:
comparing a prediction error metric for a current frame with a threshold; and
identifying a scene change based on the prediction error metric for the current frame exceeding the threshold.

61. The product of enumerated example embodiment 60, wherein the instructions for comparing the prediction error metric for the current frame with the threshold comprises operations including:
comparing the prediction error metric for the current frame with a long term threshold relating to prediction error metric over a relatively large number of frames; and
comparing the prediction error metric for the current frame with a short term threshold relating to prediction error metric over a relatively small number of frames.

62. The product of enumerated example embodiment 60, wherein comparing the prediction error metric for the current frame with the threshold comprises instructions for comparing a difference in prediction error metric for a current frame and an adjacent frame with a threshold.

63. The product of enumerated example embodiment 57, further comprising instructions for changing a bit rate for coding the frames based on a lack of support for a motion model by a video encoding module.

64. The product of enumerated example embodiment 63, wherein changing the motion estimation and compensation parameters comprises instructions for excluding certain frames from use as reference frames.

65. The product of enumerated example embodiment 63, wherein changing the motion estimation and compensation parameters comprises instructions for changing a weight of a preliminary prediction frame in a final prediction frame.

66. The product of enumerated example embodiment 63, wherein changing the motion estimation and compensation parameters comprises instructions for allocating additional computational resources to predictive motion estimation.

67. The product of enumerated example embodiment 57, further comprising instructions for:
  adjusting one or more coding parameters based on the scene classifications; and
  coding frames in the scene in accordance with the adjusted coding parameters.
68. The product of enumerated example embodiment 67, wherein adjusting one or more coding parameters comprises specifying that certain frames be coded as intra-coded frames.
69. The product of enumerated example embodiment 67, wherein adjusting one or more coding parameters comprises increasing a bit allocation for coding the scene.
70. A computer program product, tangibly encoded on a computer-readable medium, comprising instructions to cause data processing apparatus to perform video coding operations, the operations comprising:
  receiving video information;
  classifying a region in one or more frames in the received video information, wherein the region is smaller than the frame in which the region appears;
  adjusting one or more coding parameters based on the classification of the region; and
  coding the region in accordance with the adjusted coding parameters.
71. The product of enumerated example embodiment 70, wherein adjusting one or more coding parameters comprises increasing a bit allocation for coding the region.
72. The product of enumerated example embodiment 70, wherein adjusting one or more coding parameters comprises reducing filtering of the region.
73. The product of enumerated example embodiment 70, wherein classifying the region comprises classifying the region as a dark region.
74. The product of enumerated example embodiment 73, further comprising instructions for increasing a bit allocation for coding the dark region.
75. A computer program product, tangibly encoded on a computer-readable medium, comprising instructions to cause data processing apparatus to perform video coding operations, the operations comprising:
  receiving video information;
  identifying a scene change in the received video information;
  classifying a scene based on a discrepancy between a prediction error with weighted prediction and a prediction error without weighted prediction; and
  making a classification of the scene available.
76. A computer program product, tangibly encoded on a computer-readable medium, comprising instructions to cause data processing apparatus to perform video coding operations, the operations comprising:
  receiving video information;
  identifying a scene change in the received video information;
  classifying a scene based on a position of the scene change; and
  making a classification of the scene available.
77. The product of enumerated example embodiment 76, further comprising instructions for making a fingerprint of the video information using the classification of the scene.
78. The product of enumerated example embodiment 76, further comprising instructions for adjusting coding parameters used in coding the video information based on the classification of the scene.
79. The product of enumerated example embodiment 76, wherein classifying the scene comprises instructions for classifying the scene based on feedback from an encoding module.
80. The product of enumerated example embodiment 76, wherein identifying the scene change comprises instructions including:
  identifying a fade scene; and
  classifying a frame at an end of the fade scene as a scene change.
81. The product of enumerated example embodiment 76, wherein identifying the scene change comprises instructions for detecting a fade scene based on weighted prediction parameters from reference frames preceding a current frame and weighted prediction parameters from reference frames subsequent to the current frame.
82. The product of enumerated example embodiment 76, wherein identifying the scene change comprises:
  identifying that a current scene includes a flash; and
  excluding the current scene from being identified as a scene change based on the identification that the current scene includes the flash.
83. A computer program product, tangibly encoded on a computer-readable medium, comprising instructions to cause data processing apparatus to perform video coding operations, the operations comprising:
  receiving a characterization of luminance in a sequence of frames of video information;
  classifying one or more frames in the sequence of frames as a scene based on the characterization of the luminance; and
  making one or more scene classifications available.
84. The product of enumerated example embodiment 83, wherein classifying the one or more frames comprises instructions for classifying the one or more frames as a fast fade or a slow fade based on an amount of change in the luminance between the one or more frames.
85. The product of enumerated example embodiment 83, further comprising instructions including:
  adjusting one or more coding parameters based on the scene classifications; and
  coding the video information in accordance with the adjusted coding parameters.
86. The product of enumerated example embodiment 85, wherein:
  classifying the one or more frames comprises classifying the one or more frames as a dark scene; and
  coding the video information comprises increasing a bit allocation to the dark scene based.
87. A computer program product, tangibly encoded on a computer-readable medium, comprising instructions to cause data processing apparatus to perform video coding operations, the operations comprising:
  receiving a sequence of frames of video information;
  determining dominant motion vectors for each of the frames in the sequence; and
  identifying a scene change based on the dominant motion vectors of the frames in the sequence.
88. The product of enumerated example embodiment 87, wherein determining the dominant motion vectors comprises instructions for:
  forming a multi-dimensional motion vector histogram that embodies frequencies with which motion vectors appear; and
  selecting the dominant motion vectors based on the frequency at which motion vectors appear in the histogram.

89. A computer program product, tangibly encoded on a computer-readable medium, comprising instructions to cause data processing apparatus to perform video coding operations, the operations comprising:
receiving a characterization of luminance in a sequence of frames of video information;
based on the characterization of the luminance, identifying one or more of the frames in the sequence as including a flash; and
excluding the frames including the flash from use as motion-compensation.

Accordingly, other implementations are within the scope of the following claims.

What is claimed is:

1. A method for generating scene classifications in a video system, the method comprising:
receiving at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;
classifying a scene at least based on one or more of the characteristics in the sequence of frames;
adjusting one or more coding parameters based on the classification of the scene;
coding the video information in accordance with the adjusted coding parameters; and
determining a lack of correlation based on a magnitude of a prediction error between the current frame and a motion-compensated prediction of the current frame,
wherein scene classifications comprises an identifier of different classes of scenes in a collection of video information.

2. The method of claim 1, wherein classifying the frames comprises classifying the frames as one or more of a camera zoom scene or a fade scene.

3. The method of claim 1, wherein classifying the frames comprises classifying the frames as a cross-fade scene.

4. The method of claim 1, wherein classifying the frames comprises classifying the frames as a flash scene.

5. The method of claim 1, wherein classifying the frames as the flash scene comprises identifying a low prediction errors between frames preceding the flash scene and frames subsequent to the flash scene.

6. The method of claim 1, wherein adjusting one or more coding parameters comprises specifying that certain frames be coded as intra-coded frames.

7. The method of claim 1, wherein:
classifying one or more frames comprises identifying at least one of a start frame and an end frame of the scene; and
adjusting the one or more coding parameters comprises specifying that the at least one of the start frame and the end frame be coded as intra-coded frames.

8. The method of claim 1, wherein the received video information comprises at least one of motion estimation information, luminance information, chroma information, and spatial information.

9. The method of claim 1, wherein the scene change comprises an end of a first scene and a start of a second scene.

10. The method of claim 1, wherein the at least one characteristic property comprises at least one of a luminance, a chroma, a texture, edge effects, edge intensity information, a motion of a block, a DC average value of luminance and chroma components, a local variance of each block of a frame, a global variance of blocks in a frame, a variance of a motion-compensated prediction error metric, a magnitude of motion vectors, an average of motion vectors, a variance of motion vectors for a reference frame, illumination change parameters, and a color of a block, a region or a frame.

11. The method of claim 7, wherein adjusting one or more coding parameters further comprising specifying that interior frames in the scene be coded with reference to the at least one of the start frame and the end frame.

12. A method for generating region classifications in a video system, the method comprising:
receiving, at a data processing device, video information that characterizes regions in a sequence of frames;
classifying a region in one or more of the frames in the received video information as one of at least a smooth region, a textured region, and a noisy region at least based on a characteristic of the region, wherein the region is smaller than the frame in which the region appears;
wherein the smooth region is classified by analyzing a characteristic in the region in the one or more frames based on a value of at least one of a variance, an amplitude and frequency coefficient,
wherein the noisy region is classified by analyzing a characteristic in the region in the one or more frames based on a random pattern that is at least temporally uncorrelated to a signal within a scene, and
wherein the textured region is classified by analyzing a characteristic in the region in the one or more frames based on a value of at least one of a variance and a frequency that is greater than the variance and the frequency associated with the smooth region;
adjusting one or more coding parameters based on the classification of the region by,
based upon classifying the region as the smooth region, providing a level of filtering for the region;
based upon classifying the region as the noisy region, performing transform coefficient thresholding for the region;
based upon classifying the region as the textured region, providing a level of filtering for the region; and
coding the region in accordance with the adjusted coding parameters.

13. The method of claim 12, wherein adjusting one or more coding parameters comprises increasing a bit allocation for coding the region.

14. The method of claim 12, wherein adjusting one or more coding parameters comprises reducing an amount of filtering of the region.

15. The method of claim 12, wherein classifying the region comprises classifying the region as a dark region.

16. The method of claim 15, further comprising increasing a bit allocation for coding the dark region.

17. A computer program product, tangibly encoded on a non-transitory computer-readable medium, comprising instructions to cause data processing apparatus to perform video coding operations for generating scene classifications in a video system, the operations comprising:
receiving, at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;

classifying a scene at least based on one or more of the characteristics in the sequence of frames;

adjusting one or more coding parameters based on the classification of the scene; and coding the video information in accordance with the adjusted coding parameters.

18. The product of claim 17, wherein classifying the one or more scenes comprises instructions for classifying the scenes as one or more of a camera zoom scene or a fade scene.

19. The product of claim 17, wherein classifying the one or more scenes comprises instructions for classifying the scenes as a flash scene.

20. The product of claim 17, wherein adjusting the one or more coding parameters comprises instructions for specifying that certain frames be coded as intra-coded frames.

21. The product of claim 17, wherein:
classifying one or more scenes comprises instructions for identifying at least one of a start frame and an end frame of the scene; and
adjusting the one or more coding parameters comprises instructions for specifying that the at least one of the start frame and the end frame be coded as intra-coded frames.

22. The product of claim 18, wherein classifying the one or more scenes comprises instructions for classifying the scenes as a cross-fade scene.

23. The product of claim 19, wherein classifying the scenes as the flash scene comprises instructions for identifying prediction errors between frames preceding the flash scene and frames subsequent to the flash scene.

24. The product of claim 21, wherein the instructions for adjusting one or more coding parameters further comprises instructions for specifying that interior frames in the scene be coded with reference to the at least one of the start frame and the end frame.

25. A computer program product, tangibly encoded on a non-transitory computer-readable medium, comprising instructions to cause data processing apparatus to perform video coding operations for generating region classifications in a video system, the operations comprising:
receiving, at a data processing device, video information that characterizes regions in a sequence of frames;
classifying a region in one or more of the frames in the received video information as one of at least a smooth region, a textured region, and a noisy region at least based on a characteristic of the region, wherein the region is smaller than the frame in which the region appears;
wherein the smooth region is classified by analyzing a characteristic in the region in the one or more frames based on a value of at least one of a variance, an amplitude and frequency coefficient,
wherein the noisy region is classified by analyzing a characteristic in the region in the one or more frames based on a random pattern that is at least temporally uncorrelated to a signal within a scene, and
wherein the textured region is classified by analyzing a characteristic in the region in the one or more frames based on a value of at least one of a variance and a frequency that is greater than the variance and the frequency associated with the smooth region;

adjusting one or more coding parameters based on the classification of the region by,
based upon classifying the region as the smooth region, providing a level of filtering for the region;
based upon classifying the region as the noisy region, performing transform coefficient thresholding for the region; and
based upon classifying the region as the textured region, providing a level of filtering for the region; and
coding the region in accordance with the adjusted coding parameters.

26. The product of claim 25, wherein adjusting one or more coding parameters comprises increasing a bit allocation for coding the region.

27. The product of claim 25, wherein adjusting one or more coding parameters comprises reducing an amount of filtering of the region.

28. The product of claim 25, wherein classifying the region comprises classifying the region as a dark region.

29. The product of claim 28, further comprising instructions for increasing a bit allocation for coding the dark region.

30. A method for generating scene classifications in a video system, the method comprising:
receiving at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;
classifying a scene at least based on one or more of the characteristics in the sequence of frames;
adjusting one or more coding parameters based on the classification of the scene; and
coding the video information in accordance with the adjusted coding parameters, wherein identifying scene changes comprises:
receiving a prediction error metric for the current frame;
determining whether the prediction error metric for the current frame exceeds a threshold; and
based upon determining that the prediction error metric for the current frame exceeds the threshold, classifying the current frame as a scene change.

31. The method of claim 30, further comprising:
based upon indicating that there is a scene change for the current frame, determining whether motion in the current frame is occluded; and
based upon determining that the motion in the current frame is not occluded, indicating that there is a scene change for the current frame.

32. A method for generating scene classifications in a video system, the method comprising:
receiving at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;

classifying a scene at least based on one or more of the characteristics in the sequence of frames;
adjusting one or more coding parameters based on the classification of the scene; and
coding the video information in accordance with the adjusted coding parameters, wherein identifying scene changes comprises:
receiving a prediction error metric for the current frame;
determining whether the prediction error metric for the current frame exceeds a threshold;
based upon determining that the prediction error metric for the current frame does not exceed the threshold, selecting a next frame;
receiving a prediction error metric for the next frame;
determining whether the prediction error metric for the next frame exceeds the threshold; and
based upon determining that the prediction error metric for the next frame exceeds the threshold, classifying the next frame as a scene change.

33. A method for generating scene classifications in a video system, the method comprising:
receiving at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;
classifying a scene at least based on one or more of the characteristics in the sequence of frames;
adjusting one or more coding parameters based on the classification of the scene; and
coding the video information in accordance with the adjusted coding parameters, wherein identifying the scene changes comprises:
receiving a prediction error metric for the current frame;
determining whether the prediction error metric for the current frame is greater than a weighted average of a short term threshold and a long term threshold, wherein the short term threshold comprises a threshold that is based on characteristics of a first group of frames and the long term threshold comprises a threshold that is based on characteristics of a second group of frames, wherein a number of frames in the second group of frames is greater than a number of frames in the first group of frames;
based upon determining that the prediction error metric for the current frame is greater than the weighted average of the short term threshold and the long term threshold, determining whether a difference in prediction error metrics of the current frame and a previous frame exceeds a predetermined threshold; and
based upon determining that the difference in prediction error metrics of the current frame and the previous frame exceeds the predetermined threshold, indicating that there is a scene change.

34. The method of claim 33, further comprising:
updating the short term threshold and the long term threshold;
determining whether there is at least one other frame for which a prediction error metric is available; and
based upon determining that there is at least one other frame for which the prediction error metric is available, identifying whether there is a scene change for that at least one other frame.

35. The method of claim 33, further comprising:
based upon indicating that there is a scene change for the current frame, determining whether motion in the current frame is occluded; and
based upon determining that the motion in the current frame is not occluded, further indicating that there is a scene change for the current frame.

36. A method for generating scene classifications in a video system, the method comprising:
receiving at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;
classifying a scene at least based on one or more of the characteristics in the sequence of frames;
adjusting one or more coding parameters based on the classification of the scene; and
coding the video information in accordance with the adjusted coding parameters,
wherein identifying the scene changes comprises:
receiving a prediction error metric for the current frame;
determining whether the prediction error metric for the current frame is greater than a weighted average of a short term threshold and a long term threshold, wherein the short term threshold comprises a threshold that is based on characteristics of a first group of frames and the long term threshold comprises a threshold that is based on characteristics of a second group of frames, wherein a number of frames in the second group of frames is greater than a number of frames in the first group of frames; and
based upon determining that the prediction error metric for the current frame is not greater than the weighted average of the short term threshold and the long term threshold, indicating that there is not a scene change.

37. The method of claim 36, further comprising:
updating the short term threshold and the long term threshold;
determining whether there is at least one other frame for which a prediction error metric is available; and
based upon determining that there is at least one other frame for which the prediction error metric is available, identifying whether there is a scene change for that at least one other frame.

38. A computer program product, tangibly encoded on a non-transitory computer-readable medium, comprising instructions to cause data processing apparatus to perform video coding operations for generating scene classifications in a video system, the operations comprising:
receiving, at a data processing device, video information that characterizes a sequence of frames;
identifying, with the data processing device, scene changes within the sequence of frames based on a correlation between one or more characteristics of a current frame with one or more characteristics of one or more reference frames, wherein a scene comprises a sequence of frames that share at least one characteristic property, wherein a scene change comprises transition from a first characteristic property to a second characteristic property;

classifying a scene at least based on one or more of the characteristics in the sequence of frames;

adjusting one or more coding parameters based on the classification of the scene; and coding the video information in accordance with the adjusted coding parameters, wherein identifying the scene changes comprises:

receiving a prediction error metric for the current frame;

determining whether the prediction error metric for the current frame is greater than a weighted average of a short term threshold and a long term threshold, wherein the short term threshold comprises a threshold that is based on characteristics of a first group of frames and the long term threshold comprises a threshold that is based on characteristics of a second group of frames, wherein a number of frames in the second group of frames is greater than a number of frames in the first group of frames;

based upon determining that the prediction error metric for the current frame is greater than the weighted average of the short term threshold and the long term threshold, determining whether a difference in prediction error metrics of the current frame and a previous frame exceeds a predetermined threshold; and based upon determining that the difference in prediction error metrics of the current frame and the previous frame exceeds the predetermined threshold, indicating that there is a scene change.

* * * * *